US011175724B2

(12) United States Patent
Singh et al.

(10) Patent No.: US 11,175,724 B2
(45) Date of Patent: Nov. 16, 2021

(54) METHOD AND ELECTRONIC DEVICE FOR ENABLING AT LEAST ONE BATTERY MANAGEMENT FUNCTION FOR MANAGING BATTERY USAGE

(71) Applicant: Samsung Electronics Co., Ltd., Gyeonggi-do (KR)

(72) Inventors: Amitoj Singh, New Delhi (IN); Varad Arya, Uttar Pradesh (IN); Shashank Shekhar, Patna (IN); Ishani Ghosh, New Delhi (IN); Tasleem Arif, Noida (IN); Manoj Kumar, New Delhi (IN); Prakhar Avasthi, Uttar Pradesh (IN); Abhishek Jain, Delhi (IN); Supriya Manna, Kolkata (IN); Munwar Khan, Gurgaon (IN); Nitesh Goyal, Uttar Pradesh (IN)

(73) Assignee: Samsung Electronics Co., Ltd

( * ) Notice: Subject to any disclaimer, the term of this patent is extended or adjusted under 35 U.S.C. 154(b) by 88 days.

(21) Appl. No.: 15/909,573

(22) Filed: Mar. 1, 2018

(65) Prior Publication Data
US 2018/0253135 A1 Sep. 6, 2018

(30) Foreign Application Priority Data
Mar. 1, 2017 (IN) .............................. 201641028055

(51) Int. Cl.
*G06F 1/32* (2019.01)
*G06F 1/329* (2019.01)
(Continued)

(52) U.S. Cl.
CPC ............ *G06F 1/329* (2013.01); *G06F 1/3212* (2013.01); *H04W 52/0261* (2013.01); *Y02D 10/00* (2018.01); *Y02D 30/70* (2020.08)

(58) Field of Classification Search
None
See application file for complete search history.

(56) References Cited

U.S. PATENT DOCUMENTS 6,236,326 B1 * 5/2001 Murphy ................ H04M 1/006
340/636.1
6,697,953 B1 * 2/2004 Collins ................. G06F 1/3203
713/320
(Continued)

FOREIGN PATENT DOCUMENTS

JP 5345775 11/2013

OTHER PUBLICATIONS

Indian Examination Report dated Dec. 21, 2020 issued in counterpart application No. 201641028055, 5 pages.

*Primary Examiner* — Danny Chan
(74) *Attorney, Agent, or Firm* — The Farrell Law Firm, P.C.

(57) ABSTRACT

A method of battery management of an electronic device, the electronic device, and a non-transitory computer readable recording medium are provided. The method includes detecting, by the electronic device, that a battery management criterion is met, enabling at least one of a plurality of battery management functions, in response to detecting that the battery management criterion is met, and performing at least one action corresponding to the enabled at least one of the plurality of battery management functions.

18 Claims, 49 Drawing Sheets

(51) Int. Cl.
*H04W 52/02* (2009.01)
*G06F 1/3212* (2019.01)

(56) References Cited

U.S. PATENT DOCUMENTS

| | | | | |
|---|---|---|---|---|
| 8,515,499 B1* | 8/2013 | Stekkelpak | ........... | G06F 1/3212 455/566 |
| 8,768,419 B2 | 7/2014 | Sivaraman et al. | | |
| 9,086,875 B2 | 7/2015 | Harrat et al. | | |
| 2007/0094519 A1* | 4/2007 | Yamamoto | ........... | G06F 1/3203 713/300 |
| 2007/0188144 A1* | 8/2007 | Hara | ............. | G06F 1/3203 320/132 |
| 2008/0052545 A1* | 2/2008 | Finkelstein | ........... | G06F 1/3228 713/300 |
| 2009/0253469 A1* | 10/2009 | Herczog | ............. | G06F 1/3203 455/573 |
| 2010/0317408 A1* | 12/2010 | Ferren | .................... | G06F 1/3265 455/566 |
| 2011/0098087 A1* | 4/2011 | Tseng | ................ | H04M 1/72457 455/557 |
| 2012/0288139 A1* | 11/2012 | Singhar | .................. | G06F 1/3265 382/103 |
| 2012/0324260 A1* | 12/2012 | Kezuka | ................ | H04N 21/485 713/320 |
| 2014/0104082 A1* | 4/2014 | Nakamura | ............ | G06F 1/3265 340/995.15 |
| 2014/0302833 A1 | 10/2014 | Jin et al. | | |
| 2015/0019889 A1 | 1/2015 | Banerjee et al. | | |
| 2015/0061988 A1* | 3/2015 | Galu, Jr. | ................ | G06F 1/3265 345/102 |
| 2015/0100813 A1 | 4/2015 | Han et al. | | |
| 2015/0293575 A1* | 10/2015 | Hampson | .............. | G06F 1/3212 713/323 |
| 2016/0247437 A1* | 8/2016 | Choi | ....................... | G06F 1/3212 |
| 2017/0115722 A1* | 4/2017 | Chen | ..................... | G06F 1/3212 |

\* cited by examiner

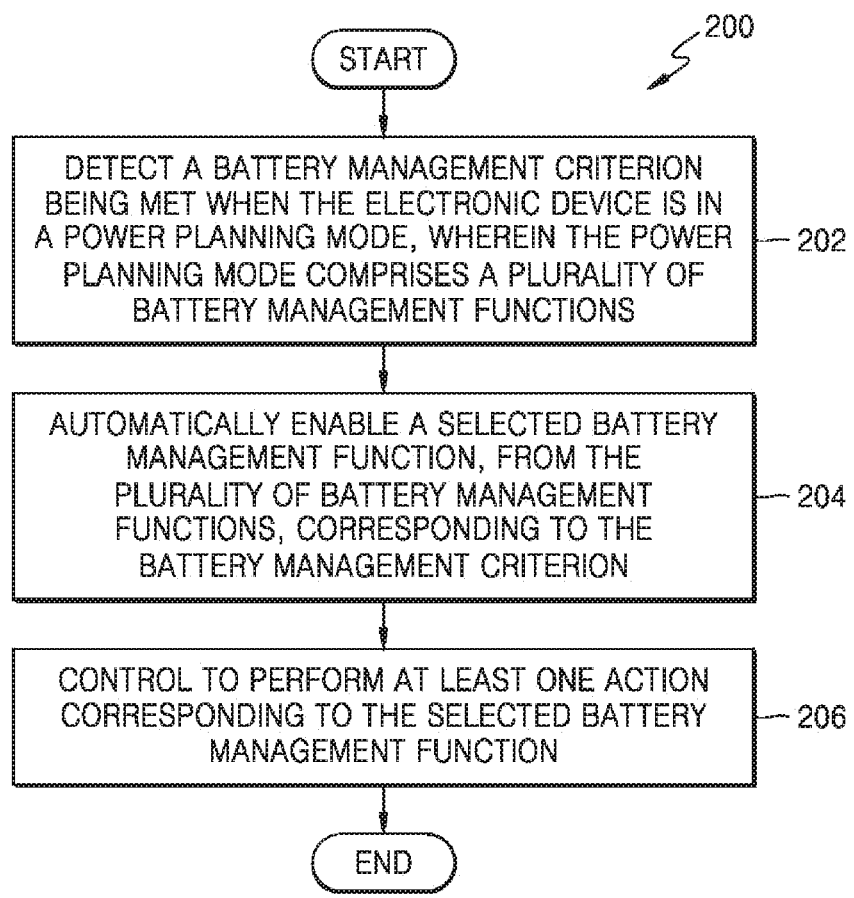

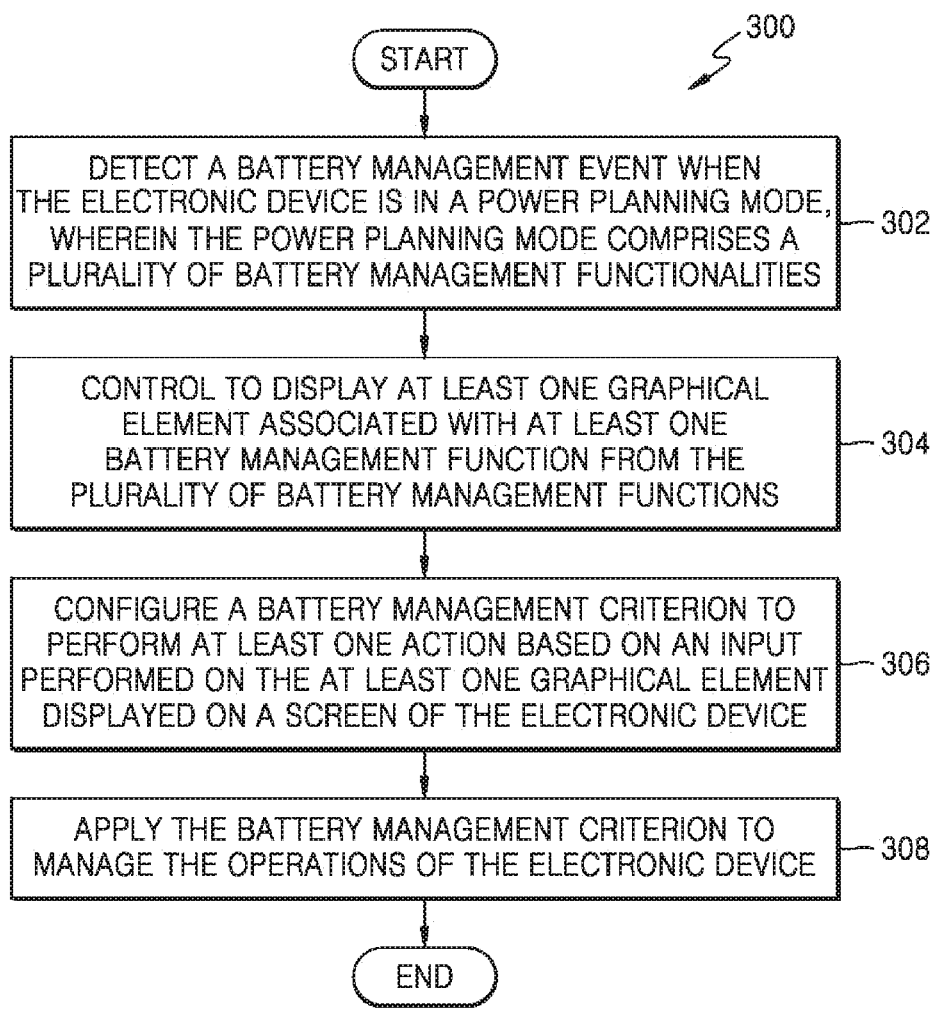

METHOD AND ELECTRONIC DEVICE FOR ENABLING AT LEAST ONE BATTERY MANAGEMENT FUNCTION FOR MANAGING BATTERY USAGE

CROSS-REFERENCE TO RELATED APPLICATION

This application is based on and claims priority under 35 U.S.C. § 119(a) to Indian Patent Application No. 201641028055, filed on Mar. 1, 2017 in the Indian Patent Office, the disclosure of which is incorporated by reference herein in its entirety.

BACKGROUND

1. Field

The present disclosure relates generally to a battery management system (BMS), and more particularly, to a method and electronic device for managing battery usage and various operations thereof.

2. Description of Related Art

In general, mobile devices (e.g., an electronic device, a smart phone, a mobile phone, tablet computers, personal digital assistants (PDAs), etc.) are integral in satisfying user requirements. Such requirements may be with respect to mobile computing operations, transmission of data, voice, video, etc., to a targeted entity (i.e., another mobile device), communication needs, gaming, and several other personal purposes (i.e., using a camera, recording, etc.). As a mobile device is very integral to a user's daily life, similarly, a battery is a vital item of the mobile device. A battery supplies power to all integral parts (i.e., a central processing unit (CPU), a random access memory (RAM), a display, etc.) of a mobile device for performing operations for which the parts are configured and further managing operations of the mobile device. There are various types of batteries available (e.g., lithium polymer batteries, lithium ion batteries, nickel cadmium batteries, etc.) but they all suffer from limited lifetimes.

The above information is presented as background information only to assist with the understanding of the present disclosure. No determination has been made, and no assertion is made, as to whether any of the above might be applicable as prior art with regard to the present disclosure.

SUMMARY

In accordance with an aspect of the present disclosure, a method of managing battery of an electronic device is provided.

In accordance with an aspect of the present disclosure, a method of battery management of an electronic device is provided. The method includes detecting, by the electronic device, that a battery management criterion is met, enabling at least one of a plurality of battery management functions, in response to detecting that the battery management criterion is met, and performing at least one action corresponding to the enabled at least one of the plurality of the battery management functions.

In accordance with another aspect of the present disclosure, provided is an electronic device with a battery management function. The electronic device includes a processor configured to detect that a battery management criterion is met, enable at least one of a plurality of battery management functions, in response to detecting that the battery management criterion is met, and perform at least one action corresponding to the enabled at least one of the plurality of the battery management functions.

In accordance with another aspect of the present disclosure, provided is a non-transitory computer readable recording medium having recorded thereon a program for executing a method for battery management of an electronic device. The method includes detecting, by the electronic device, that a battery management criterion is met; enabling at least one of a plurality of battery management functions, in response to detecting that the battery management criterion is met; and performing at least one action corresponding to the enabled at least one of the plurality of the battery management functions.

BRIEF DESCRIPTION OF THE DRAWINGS

The above and other aspects, features, and advantage of certain embodiments of the present disclosure will be more apparent from the following description taken in conjunction with the accompanying drawings, in which:

FIG. 2 is a flowchart of a method of managing battery usage and operations of an electronic device, according to an embodiment of the present disclosure;

FIG. 3 is a flowchart of a method of managing battery usage and operations of an electronic device, according to an embodiment of the present disclosure;

DETAILED DESCRIPTION

Figure 1:
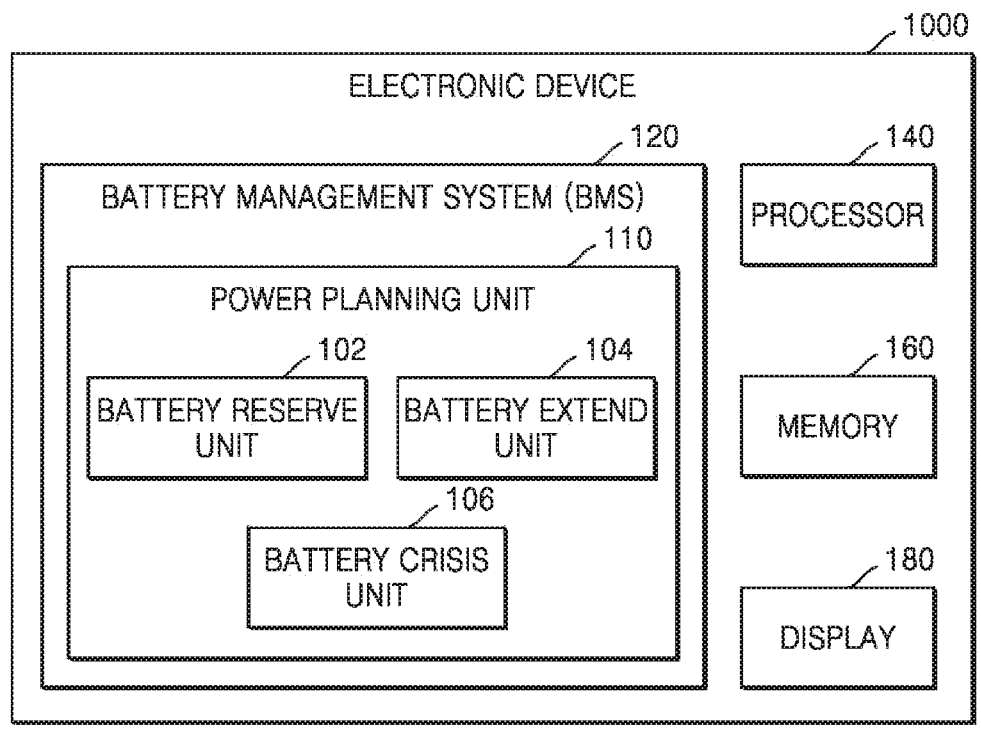
FIG. 1 is a block diagram of an electronic device configured to manage battery usage, according to an embodiment of the present disclosure.

The following description with reference to the accompanying drawings is provided to assist in a comprehensive understanding of various embodiments of the present disclosure. The present disclosure includes various details to assist in that understanding but these are intended to be regarded as merely exemplary. Accordingly, those of ordinary skill in the art will recognize that various changes and modifications of the various embodiments described herein may be made without departing from the scope of the present disclosure as defined by the claims and their equivalents. In addition, descriptions of well-known functions and constructions may be omitted for clarity and conciseness.

The terms used in the present disclosure are not intended to be limited to their dictionary meanings, but, are merely used to facilitate understanding of the present disclosure. Accordingly, it should be apparent to those of ordinary skill in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is indicated that the recited characteristic, parameter, or value need not be achieved exactly, but that deviations or variations, including for example, tolerances, measurement error, measurement accuracy limitations and other factors known to those of ordinary skill in the art, may occur in amounts that do not preclude the effect the characteristic was intended to provide.

The various embodiments of the present disclosure disclose a method of selecting a capture configuration based on scene analysis. In the following detailed description of the various embodiments of the disclosure, reference is made to the accompanying drawings which show by way of illustration certain embodiments in which the present disclosure may be practiced. These various embodiments are described in sufficient detail to enable those of ordinary skill in the art to practice the present disclosure, and it is to be understood that other various embodiments may be utilized and that changes may be made without departing from the scope of the present disclosure. The following detailed description is, therefore, not intended to be taken in a limiting sense, and the scope of the present disclosure is defined only by the appended claims and their equivalents.

The present disclosure may refer to "an," "one" or "some" various embodiment(s). This does not necessarily imply that each reference is to the same embodiment(s) or that the feature only applies to a single embodiment. Single features of different various embodiments may also be combined to provide other various embodiments.

As used herein, the terms "1st", "first", "2nd", and "second" may use corresponding components regardless of importance or order and are used to distinguish one component from another without limiting the components.

As used herein, the singular forms "a," "an" and "the" are intended to include the plural forms as well, unless expressly stated otherwise. It will be further understood that the terms "includes," "comprises," "including" and "comprising" when used in the present disclosure, indicate the presence of stated features, integers, operations, elements and/or components, but do not preclude the presence or addition of one or more other features, integers, operations, elements, components, and/or groups thereof. As used herein, the term "and/or" includes any and all combinations and arrangements of one or more of the associated listed items.

Unless otherwise defined, all terms used herein have the same meanings as commonly understood by one of ordinary skill in the art to which the present disclosure pertains. It will be further understood that terms, such as those defined in commonly used dictionaries, should be interpreted as having meanings that are consistent with their meanings in the context of the relevant art and are not intended to be interpreted in an idealized or overly formal sense unless expressly so defined herein.

Embodiments of the present disclosure provide a method of selecting camera capture configurations based on scene analysis. Although various embodiments are described in the present disclosure, they are not intended to limit the scope of the present disclosure.

The various embodiments herein and the various features, advantages, and details thereof are described more fully below with reference to the accompanying drawings. Descriptions of well-known components and processing techniques are omitted so as to not unnecessarily obscure the various embodiments herein. The examples used herein are intended merely to facilitate an understanding of ways in which the various embodiments herein may be practiced and to further enable those of ordinary skill in the art to practice the present disclosure. Accordingly, the various embodiments are not intended to limit the scope of the present disclosure.

Prior to describing the embodiments in detail, definitions of key terms used herein are provided. Unless defined otherwise, all terms used herein have the same meanings as commonly understood by those of ordinary skill in the art to which the present disclosure pertains.

Power planning mode allows a user to easily make the battery lifetime last according to needs. Thus, the power planning mode allows a user to control and plan according to operations of an electronic device and use the electronic device to a maximum without severely restricting normal usage thereof.

Reserve battery is a blanket reservation of battery for important situations. The ability to reserve a portion of a battery in low power mode. The allocation may be adjusted day by day according to certain needs.

Extend battery life (battery mileage) is a user-defined extension of battery life. This provides an easy way to set a battery to last until a certain time. A phone manages various settings like screen brightness, resolution, background applications (apps) and data consumption accordingly in the background. Users may also be notified if their usage is excessive and the battery is in danger of running out.

Battery crisis provides an emergency call forwarding option at critical battery levels when the battery runs out so that a phone goes into a mode that displays the most important contacts and time instead of going blank. A user also has the ability to forward calls to nearby phones with sufficient battery power or to a preset contact.

Despite the incredible adoption rate of smartphones, user experience has been, and still remains, severely limited by the phone battery life. It has been observed that in day to day usage, the user often misses out on important calls due to exhaustion of the battery capacity.

There exists several methods of managing the power of the battery (i.e., battery usage) but all those methods involve limited user defined operations. For example, when the battery level is critical, the user may enable a power saving mode or the mobile device may automatically enable the power saving mode when a threshold is met. The mobile device may automatically limit (or terminate) operations of applications running in the mobile device, which are consuming high battery power, in the power saving mode. The power saving mode may terminate all applications or the user may continue using the particular application but with limited resources. Thus, the user has no control in managing/planning the power usage for one or more applications accordingly, without compensating for the performance of the applications and further increases the stress and emotional burden on the user during the battery depletion state (i.e., low battery, zero battery, etc.).

In yet another conventional method, the user may opt to install various third party applications in order to save the power of the battery. The issue with this scenario is that it involves complicated manual controls.

Accordingly, embodiments described herein provide a method of managing operations of an electronic device. The method includes detecting, by the electronic device, that a battery management criterion is met when the electronic device is in a power planning mode, where the power planning mode includes a plurality of battery management functions. Further, the method includes automatically enabling, by the electronic device, a selected battery management function, from the plurality of battery management functions, corresponding to the battery management criterion. Furthermore, the method includes performing, by the electronic device, at least one action corresponding to the selected battery management function.

The proposed power planning mode allows the user of the electronic device to pre-plan the remaining battery usage/capacity according to his/her requirements, i.e., organization and set up for future battery power management.

The proposed method allows the user to pre-plan the remaining battery power capacity for managing the operations of the electronic device, reserve a portion of the remaining battery capacity for selected application(s) only, extend the usage of the remaining battery capacity at different extend levels, where each extend level is configured to perform a dedicated action predefined by the electronic device or user.

Embodiments herein provide another method of managing operations of an electronic device. The method includes detecting a battery management event when the electronic device is in a power planning mode, where the power planning mode includes a plurality of battery management functions. Further, the method includes displaying at least one graphical element associated with at least one battery management function from the plurality of battery management functions. Furthermore, the method includes configuring a battery management criterion to perform at least one action based on an input performed on the at least one graphical element displayed on a screen of the electronic device and applying the battery management criterion to manage the operations of the electronic device.

Embodiments are described below with reference to the accompanying drawings, and more particularly to FIGS. 1 through 26, where similar reference characters denote corresponding features consistently throughout the figures.

FIG. 1 is a block diagram of an electronic device 1000 configured to manage battery usage, according to an embodiment of the present disclosure.

Referring to FIG. 1, the electronic device 1000 may be, for example, a laptop computer, a desktop computer, a mobile phone, a smart phone, a PDA, a tablet computer, a phablet, a consumer electronic (CE) device, a dual display device, an edge display, or any other electronic device. In an embodiment, the electronic device 1000 may be a wearable device such as, for example, a smart watch, a smart bracelet, smart glasses, etc. The electronic device 1000 may be an Internet of Things (IoT) device. The electronic device 1000 may include (or, be associated with) a display 180 (e.g., a cathode ray tube (CRT) display, a liquid crystal display (LCD), an organic light-emitting diode (OLED), a light-emitting diode (LED), etc.,) being interfaced with a processor 140 (e.g., a central processing unit (CPU), a graphics processing unit (GPU), a hardware chipset, etc.) communicatively connected to a memory unit 160 (e.g., a volatile memory and/or a non-volatile memory); where the memory 160 includes storage locations configured to be addressable through the processor 140, a BMS 120, connected to the processor 140, including a power planning unit 110; where the processor 140 may be configured to generate a data to be displayed onto the display 180. The BMS 120 may be implemented as one or more hardware processors. The BMS 120 may include a power planning unit 110. The power planning unit 110 may comprise a battery reserve unit 102, battery extend unit 104 and battery crisis unit 106 which may be implemented as at least one hardware processor.

The BMS 120 may be configured to detect that a battery management criterion is met when the electronic device 1000 is in a power planning mode associated with the power planning unit 110. The battery management criterion may be defined by the user/automatically defined by the BMS 120. The battery management criterion includes, for example, a battery reserve criterion, a battery extend criterion, and a battery crisis criterion.

The battery reserve criterion may be, e.g., a threshold limit (15%, 20%, etc.) of a battery level at which a battery reserve function is enforced/applied. The battery extend criterion may be, for example, a certain level (i.e., mid-level, critical level, etc.) of the remaining battery capacity at which a battery extend function is enforced. Further, the battery crisis criterion may be, for example, zero battery level, completely discharged battery, low level battery, completely exhausted battery, etc., at which a battery crisis function may be enforced.

The battery reserve unit 102 may be configured to perform actions, for example, actions associated with selected application(s) of the electronic device 1000. The applications may be a message application, a call application, and any other application associated with the electronic device 1000 (e.g., which the user may access during the enforcement of the battery reserve function). The action may be accessing only the call application and the message application when the battery reserve criterion is met.

In an embodiment, the battery reserve unit 102 may be configured to perform an action such as activating a display of at least one selected portion of the display 180 of the electronic device 1000 while deactivating a display of remaining portion of the display 180 of the electronic device 1000. The action may be allowing the user to select (i.e., crop by way of an input such as a gesture, touch, tap etc.) the display portion of the display 180 for user viewing. Thus, the unselected display portion of the display 180 may be deactivated (i.e., trimmed). The action may be pre-defined by the user and may be automatically applied by the battery reserve unit 102 when the battery reserve criterion is met.

The battery extend unit 104 may be configured to perform one or more actions when a battery extend criterion is met. The actions may include boosting the remaining battery capacity to one or more levels. Further, the battery extend unit 104 may be configured to provide a plurality of battery extend levels, where each of a battery extend level is configured to provide an estimated time period relative to a current state of the battery of the electronic device 1000. The one or more levels may be defined by the user according to the user's requirements. In an embodiment, the one or more battery extend levels may be defined by the battery extend unit 104. The time period in each battery extend level is estimated based on at least one of an estimated time of arrival of a user of the electronic device 1000 to a location, a context of a user of the electronic device 1000, content displayed on the electronic device 1000, a context of the electronic device 1000, a usage pattern of the electronic device 1000, and the current state of the battery of the electronic device 1000.

In an embodiment, the battery extend unit 104 may be configured to monitor the current state of the battery (i.e., the remaining capacity of the battery), power usage (a charging rate, a discharging rate, etc.) of the battery, motion of the electronic device 1000 by aid of sensor(s) (i.e., a motion sensor) and notify a user to enable/disable the battery extend function accordingly.

The battery crisis unit 106 may be configured to allow a user to perform actions such as, for example, forwarding of service(s) (e.g., call forwarding service, message forwarding service, etc.) associated with at least one data item (e.g., contact number from the contact application, a secondary electronic device from a paired/synchronized (synch) history of the electronic device 1000, a secondary electronic device in proximity to the electronic device 1000, etc.) of the electronic device 1000 to the secondary electronic device. The secondary electronic device may be paired with the electronic device 1000. In an embodiment, the secondary electronic device may be an authenticated electronic device. The secondary electronic device may not be paired with the electronic device 1000. The secondary electronic device may be similar to the electronic device 1000.

The display 180 may be controlled to display an indication on the display screen of the electronic device 1000 indicating active state of each of the battery management function in the electronic device 1000. The indication may be a graphical representation on a graphical element of the applications indicating that the battery management function (i.e., battery reserve, battery extend, and battery crisis) is enabled with respect to the applications. Further, the indication may also indicate the remaining battery capacity/level allocated (e.g., reserved) with respect to the applications.

In an embodiment, the indication may also indicate a remaining battery status.

In an embodiment, the display 180 may be configured to display at least one battery management function from the plurality of battery management functions on the display screen of the electronic device 1000, wherein each of the battery management function displays at least one graphical element to configure the battery management criterion. Further, the BMS 120 may allow the processor 140 to configure the battery management criterion based on the input (e.g., touch, swipe, gesture, etc.) performed on the at least one graphical element displayed on the display screen of the electronic device 1000, as described below with reference to FIG. 4B.

In an embodiment, the BMS 120 may be configured to detect a battery management event when the electronic device 1000 is in a power planning mode, the power planning mode includes a plurality of battery management functions. For example, the battery management event includes a battery charging event, a battery discharging event, etc. Further, the BMS 120 may be configured to perform at least one action based on the input performed on the at least one graphical element displayed on the display 180 of the electronic device 1000. The BMS 120 may also be configured to automatically apply the battery management criterion to manage the operations of the electronic device 1000, as described below with reference to FIGS. 6A to 6D.

The memory 160 may include one or more non-transitory computer-readable storage media. The memory 160 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 160 may be considered a non-transitory storage medium. The term "non-transitory" may indicate that the storage medium is not embodied in a carrier wave or a propagated signal. However, the term "non-transitory" is not intended to be interpreted that the memory 160 is non-movable. The memory 160 may be configured to store a greater amount of information than the memory. In certain examples, a non-transitory storage medium may store data that may, over time, change (e.g., in RAM or cache). The memory 160 may be configured to store user defined battery management functions, one or more battery management criterion, a user usage pattern of the electronic device 1000, etc.

FIG. 2 is a flowchart 200 of a method of managing battery usage and operations of the electronic device 1000, according to an embodiment of the present disclosure.

Referring to FIG. 2, in step 202, the electronic device 1000 detects that the battery management criterion is met when the electronic device 1000 is in the power planning mode, where the power planning mode includes a plurality of battery management functions. For example, in the electronic device 1000, as illustrated in FIG. 1, the BMS 120 may be configured to detect that the battery management criterion is met when the electronic device 1000 is in the power planning mode, and the power planning mode includes the plurality of battery management functions.

In step 204, the electronic device 1000 automatically enables a selected battery management function, from the plurality of battery management functions, corresponding to the battery management criterion. For example, as illustrated in FIG. 1, the BMS 120 may be configured to automatically enable the selected battery management function, from the plurality of battery management functions, corresponding to the battery management criterion.

In step 206, the electronic device 1000 performs the at least one action corresponding to the selected battery management function. For example, as illustrated in FIG. 1, the BMS 120 may be configured to perform the at least one action corresponding to the selected battery management function.

The various actions, acts, blocks, operations, etc., in the flowchart 200 may be performed in the order presented, in a different order, or simultaneously. Further, in an embodiment, some of the actions, acts, blocks, operations, and the like may be omitted, added, modified, skipped, etc., without departing from the scope of the present disclosure.

FIG. 3 is a flowchart 300 of a method of managing battery usage and operations of the electronic device 1000, according to an embodiment of the present disclosure.

Referring to FIG. 3, in step 302, the electronic device 1000 detects the battery management event when the electronic device 1000 is in the power planning mode, where the power planning mode includes the plurality of battery management functions: For example, in the electronic device 1000, as illustrated in FIG. 1, the BMS 120 may be configured to detect the battery management event when the electronic device 1000 is in the power planning mode, where the power planning mode includes the plurality of battery management functions.

In step 304, the electronic device 1000 displays the at least one graphical element associated with the at least one battery management function among the plurality of battery management functions. For example, in the electronic device 1000, as illustrated in FIG. 1, the display 180 may be controlled to display the at least one graphical element associated with the at least one battery management function from the plurality of battery management functions.

In step 306, the electronic device 1000 configures the battery management criterion to perform the at least one action based on the input performed on the at least one graphical element displayed on the display screen of the electronic device 1000. For example, in the electronic device 1000, as illustrated in FIG. 1, the BMS 120 may configure or set the battery management criterion to perform the at least one action based on the input performed on the at least one graphical element displayed on the display screen of the electronic device 1000.

In step 308, the electronic device 1000 applies the battery management criterion to manage the operations of the electronic device 1000. For example, in the electronic device 1000, as illustrated in FIG. 1, the BMS 120 may be configured to apply the battery management criterion to manage the operations of the electronic device 1000.

The various actions, acts, blocks, operations, etc., in the flowchart 300 may be performed in the order presented, in a different order, or simultaneously. Further, in an embodiment, some of the actions, acts, blocks, operations, and the like may be omitted, added, modified, skipped, and the like without departing from the scope of the present disclosure.

Figure 4A:
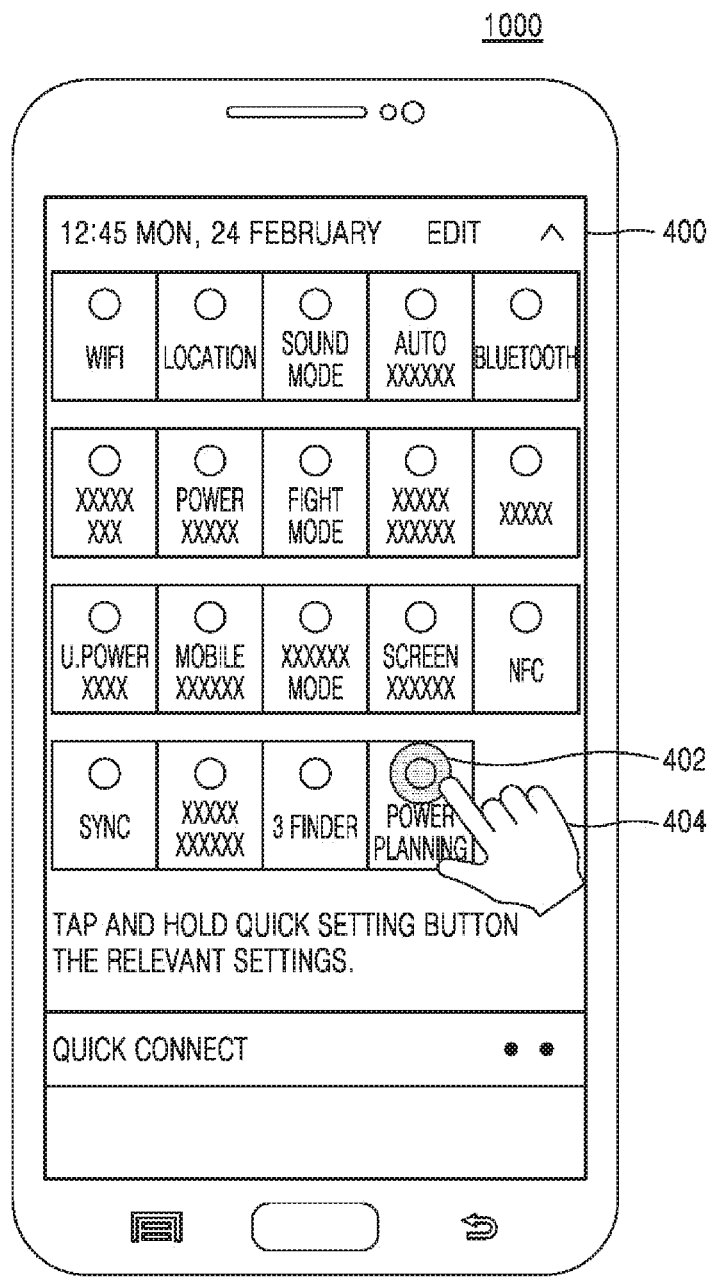
FIGS. 4A and 4B are illustrations of various graphical elements of a notification panel in which a BMS allows a user to enable a power planning mode, according to an embodiment of the present disclosure.
Figure 4B:
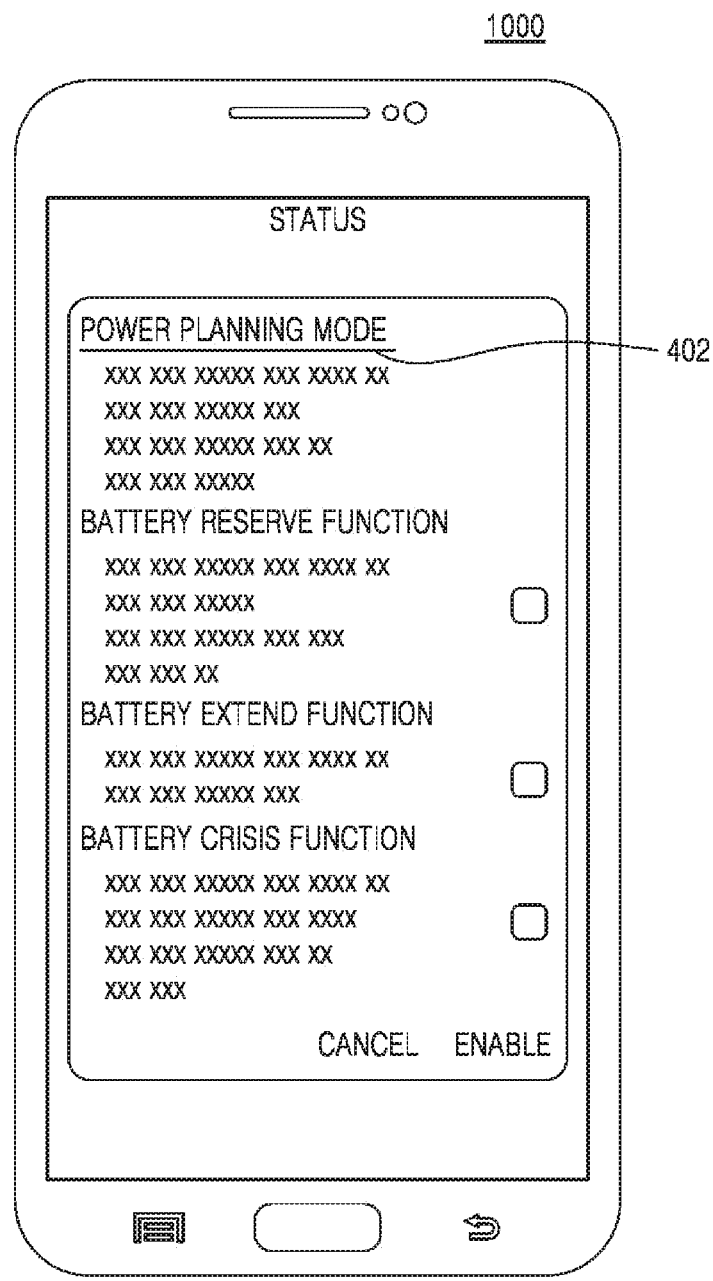

FIGS. 4A and 4B are illustrations of various graphical elements of a notification panel 400 in which the BMS 120 allows a user to enable a power planning mode 402, according to an embodiment of the present disclosure.

Referring to FIG. 4A, the BMS 120 may be configured to allow a user of the electronic device 1000 to enable the power planning mode 402 directly from the notification panel 400. The BMS 120 allows the user, by way of an input 404, to enable the power planning mode 402 from the notification panel 400.

In an embodiment, if any of the functions of the power planning mode 402 were previously enabled by the user, the configuration is saved by the memory unit 160. Thus, the power planning mode 402 will be in an active state if any of the functions were enabled by the user. For example, the active state of the power planning mode 402 may be indicated by way of a conventional means. The memory 160 may auto-save the configuration, although the user may enable/disable the auto-save function of the memory unit 160.

Referring to FIG. 4B, the power planning mode 402 includes the battery management functions, i.e., battery reserve function, battery extend function, and battery crisis function, which are described below with reference to FIGS. 5 to 25.

Figure 5:
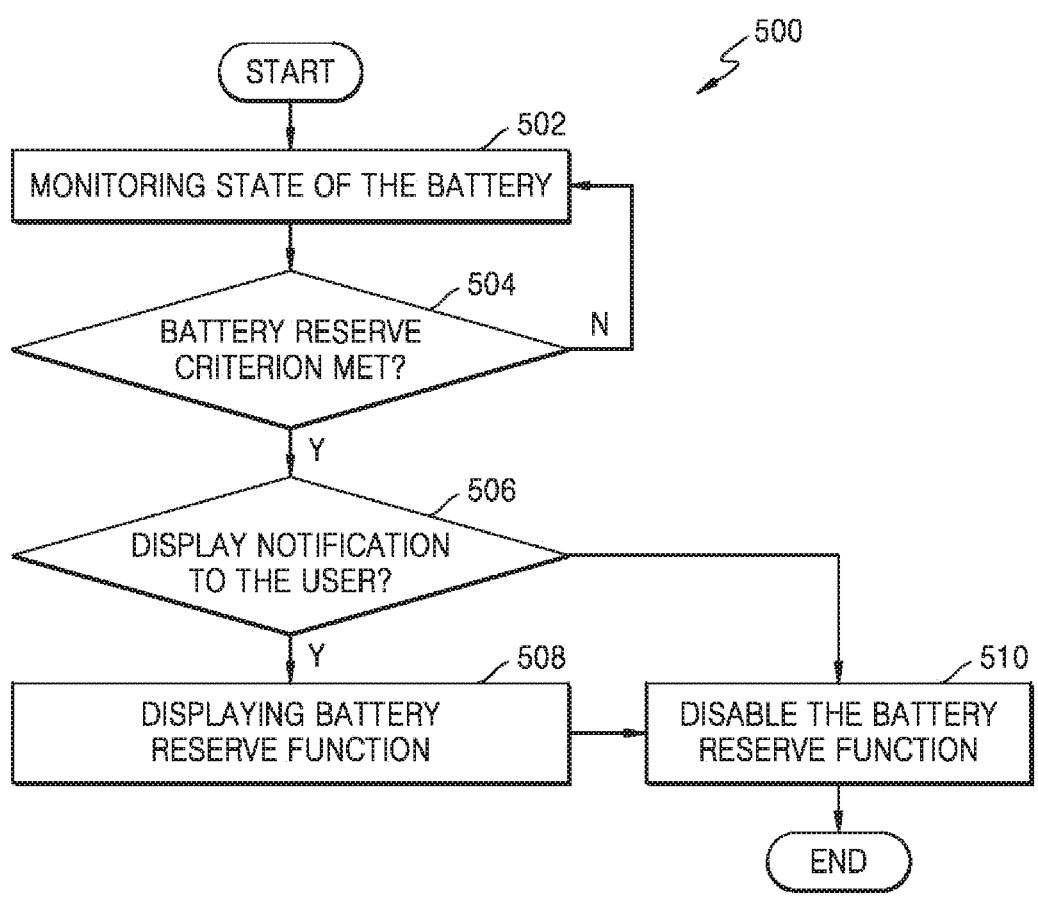
FIG. 5 is a flowchart of a method of a battery reserve unit, according to an embodiment of the present disclosure.

Battery Reserve Scenarios:

FIG. 5 is a flowchart 500 of a method performed by the battery reserve unit 102, according to an embodiment of the present disclosure.

Referring to FIG. 5, in step 502, the battery reserve unit 102 may be configured to monitor the state of the battery (i.e., remaining battery capacity (mAh), battery reserve criterion, etc.). In an embodiment, monitoring of the state of the battery may include, for example, determining the battery usage at different intervals by calculating a rate of discharging interval, computing different cycles of charging and discharging intervals, etc.

In an embodiment, the battery reserve unit 102 may be configured to monitor the state of a battery (i.e., battery utilization in mAh) by calculating, based on power-sipper types namely applications associated with the electronic device 1000, a display screen, an original equipment manufacturer (OEM), a cell, etc. For individual apps, calculations are based on a user identity (ID) (UID) and on CPU usage duration, frequency, foreground time, wireless fidelity (Wi-Fi) data usage, mobile data usage, wake locks acquired, etc. Thus, the battery drainage of power-sippers may be given as a function of dependent parameters.

For example, battery drainage of any app may be given by: "App=F (CPU time, CPU frequency, GPU time, GPU frequency, wake locks, Wi-Fi data, mobile data), where "F is a Function of the given parameters."

Similarly Voice call drainage is calculated as:

Phone usage=$F$(phone duration)

LCD drainage as:

Screen=$F$(screen-on duration)

Cell standby drainage as:

Cell standby=$F$(radio signal strength,radio signal scanning)

All the above functions "F" may be linear multipliers of a constant value for the given drainage type, which may be predetermined before a dynamic voltage restorer (DVR) phase of the electronic device 1000 in hardware power testing. For example, electronic device 1000 usage in mAh=phone duration in hr*radio.active, where radio.active is a constant defined for the electronic device 1000.

Some sample constants are provided below in Table 1.

TABLE 1

| Drainage type | Identifier | Value |
| --- | --- | --- |
| Voice call | radio.active | 250 |
| Screen (LCD/OLED) | screen.on | 71 |
| GPS | gps.on | 1 |
| Audio | dsp.audio | 44 |
| Idle current | cpu.idle | 4 |
| CPU at 1200 MHz speed | cpu.active | 577 (at 1200 MHz) |

Power consumption due to a voice call may be broken into the following components: process consumption due to CPU cycles, dependent on the CPU frequency and usage-time, and wake locks. Similarly, hardware utilization due to LCD/OLED, digital signal processor (DSP), audio devices-microphone and speakers, and radio interface usage (second generation (2G)/third generation (3G)/fourth generation (4G)).

A typical voice call in an operating system of the electronic device 1000 may be run by 5-6 processes; using battery statistics (stats), each process's current consumption may be determined in terms of its CPU usage (including frequency) and utilization of other hardware components. The sum total of these current consumptions may be attributed to a voice call. The following processes are major current consumers during a call: system server, phone, process media, media server, etc.

Thus, the battery reserve unit 102 provides the battery consumption for the above processes as well as hardware usage (radio and audio) to determine accurate power consumption figures. Thus, the battery reserve unit 102 may be configured to determine the drainage due to voice call as: Drainage due to voice call=Drainage due to radio+Drainage due to audio+Drainage of the mentioned processes=radio.active*phone duration+dsp.audio*phone duration+(F (CPU duration, CPU frequency, and wake locks) for each process).

Further, the battery reserve unit 102 may be configured to monitor (e.g., observe) percentage of battery as the electronic device 1000 is in use. When the battery reaches the battery reserve criterion (set by the user/system), the battery reserve function may be enabled.

Once the electronic device 1000 detects a battery low event, the electronic device 1000 may automatically enable an ultra power saving (UPS) without allowing a user to customize (i.e., edit the applications which should be executed without compensating in their performance (i.e., CPU cycle, RAM cycle, etc.)). Thus, the proposed method allows the user to customize the operations of the electronic device 1000 by configuring the user-defined applications to operate when the electronic device 1000 is in the power planning mode and when the battery reserve criterion is met.

In step 504, the battery reserve unit 102 may be configured to determine that the battery reserve criterion is met in response to determining the state of the battery. If in step 504, the battery reserve unit 102 determines that the battery reserve criterion is met then in step 506, the display 180, connected to the BMS 120, may be configured to determine whether a notification (e.g., a graphical element indicating the battery reserve criterion, a pop-up message indicating the battery reserve criterion, or any other means of notifying the user about the battery reserve criterion) may is displayed to notifying that the reserve criterion is met.

If, in step 504, the battery reserve unit 102 determines that the battery reserve criterion is not met then the battery reserve unit 102 may loop back to perform the method described in step 502. If the display 180, in step 506, displays the notification to the user then in step 508 the BMS 120 provides the notification that the battery reserve function is enabled for selected applications (e.g., reserve battery is enabled and value is set at 15% level of the battery specific for only calling (incoming, outgoing, or both)). If the display 180, in step 506, fails to display the notification to the user then in step 510 the BMS 120 provides the notification that the battery reserve function is disabled.

FIGS. 6A to 6D are illustrations of graphical elements indicating various power planning functions of a power planning mode in which the battery reserve unit 102 allows a user to enable the battery reserve function, according to an embodiment of the present disclosure.

The user of the electronic device 1000 may enable the power planning mode from the notification panel 400 (i.e., notification panel used interchangeably) of the electronic device 1000 by performing various actions (i.e., a gesture input such as a touch, a scroll, a swipe, a slide, etc.) on various graphical elements. Where the user enables the power planning mode (for the first time), the power planning unit 110, connected to the display 180, switches the display screen to the graphical elements indicating various power planning functions of the power planning mode, as shown in FIG. 6A.

Figure 6A:
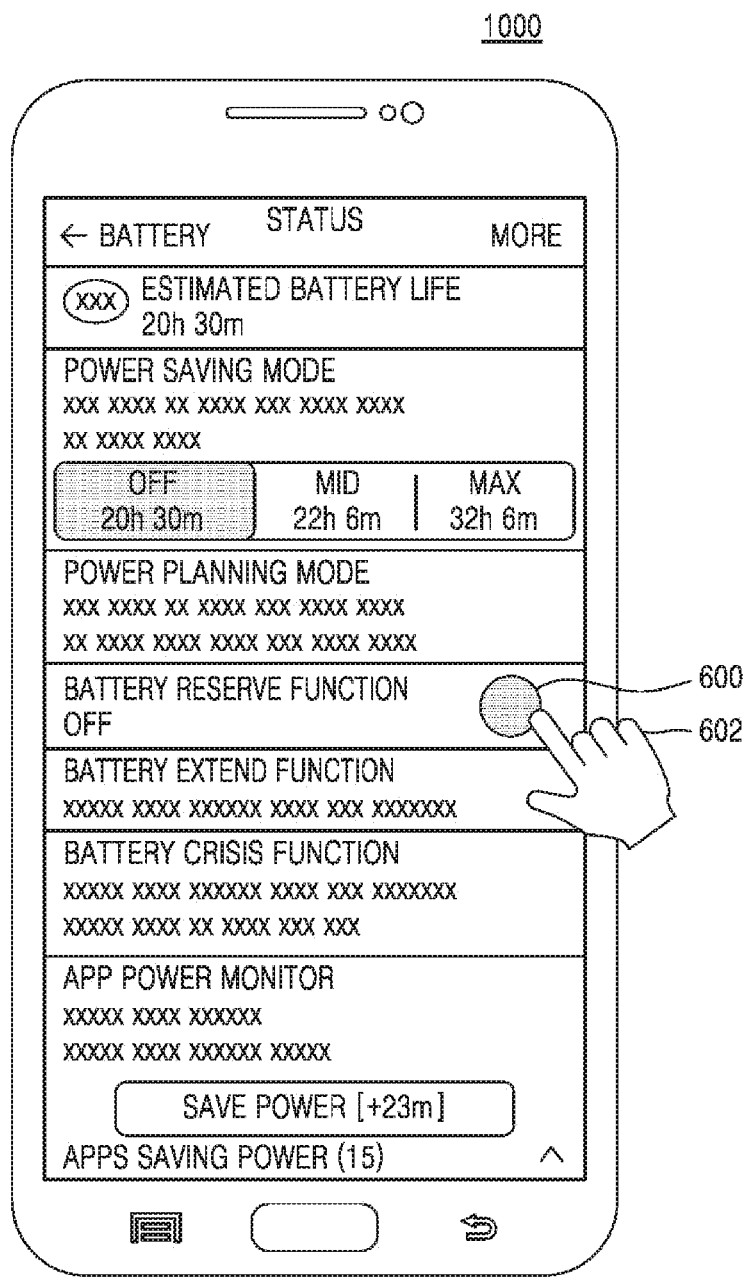
FIGS. 6A, 6B, 6C, and 6D are illustrations of graphical elements indicating various power planning functions of a power planning mode in which a battery reserve unit is configured to enable a battery reserve function, according to an embodiment of the present disclosure.

Referring to FIG. 6A, the battery reserve unit 102 detects an input 602 on a graphical element 600 to select the battery reserve function from the plurality of battery management functions of the power planning mode. The input 602 may be, for example, a touch, a slide, a swipe, a gesture, etc.

Figure 6B:
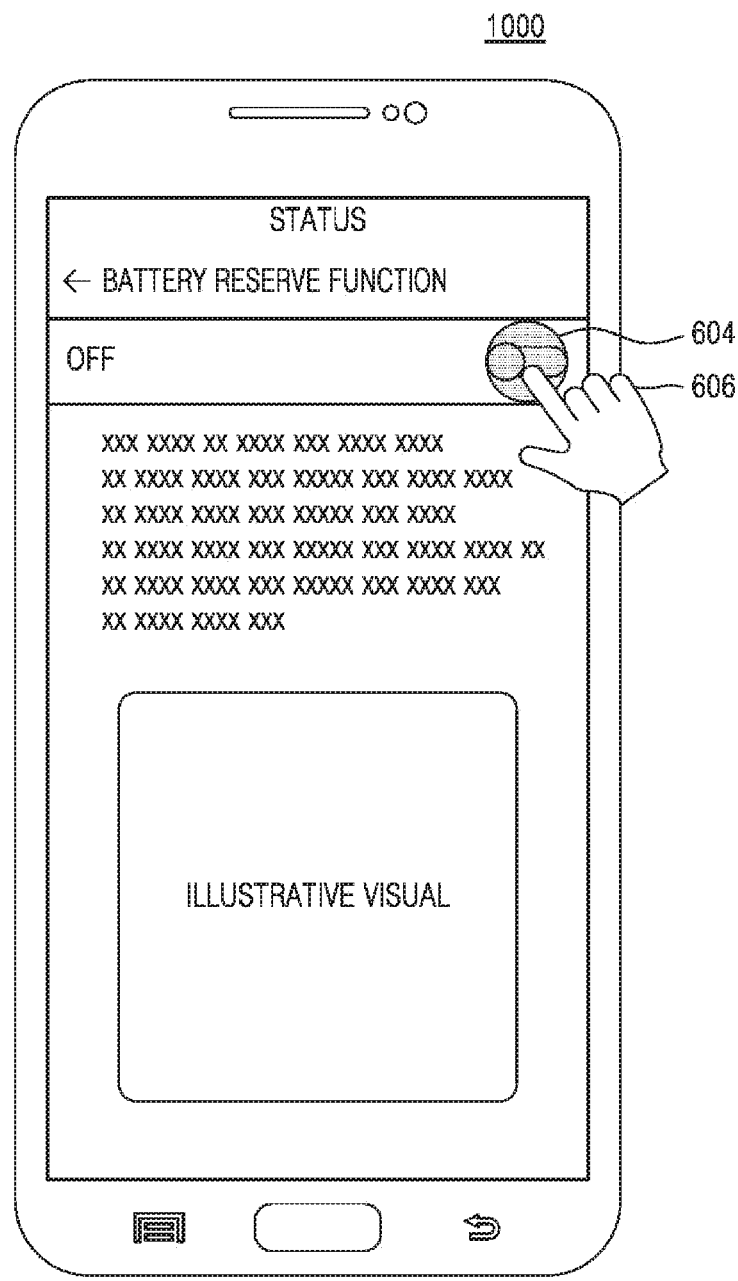

Referring to FIG. 6B, in response to the input 606 on a graphical element 604, the display 180 may be configured to display a user interface (UI) allowing the user to enable the battery reserve function in order to reserve a portion of the remaining battery capacity/level for selected applications. In an embodiment, the battery reserve unit 102 may be configured to automatically enable the battery reserve function (i.e., if the battery reserve unit 102 identifies any stored configuration related to battery reserve function).

The battery reserve unit 102 may allow the user to plan the battery usage and reserve the portion of remaining battery capacity for selected applications. Thus, the method aids the user in reducing anxiety concerning a low battery, as the battery always has certain power reserved for the selected applications. The battery reserve unit 102 allows the user to select the applications to be accessed during the active state of the battery reserve function.

Figure 6C:
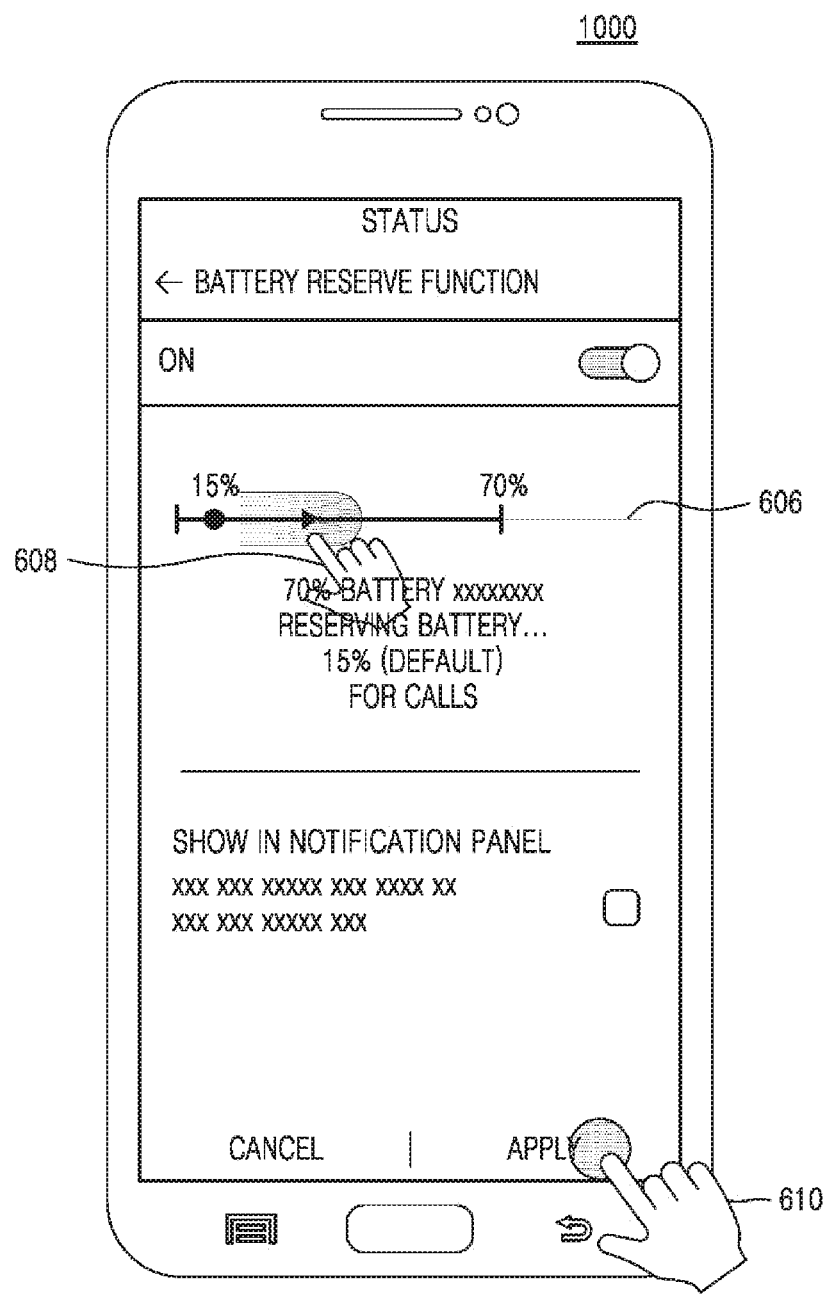

Referring to FIG. 6C, once the battery reserve unit 102 is enabled, the display 180 may be configured to detect an input 608 on a graphical element 606 to configure/set the battery reserve criterion (e.g., 5%, 10%, 15%, 20%, . . . , 100%). Once the battery reserve unit 102 detects that the battery reserve criterion (e.g., 15%) is met, then the BMS 120 may be configured to automatically enable a maximum power saving mode and allow only the selected applications (e.g., calls and messages) to operate.

Figure 6D:
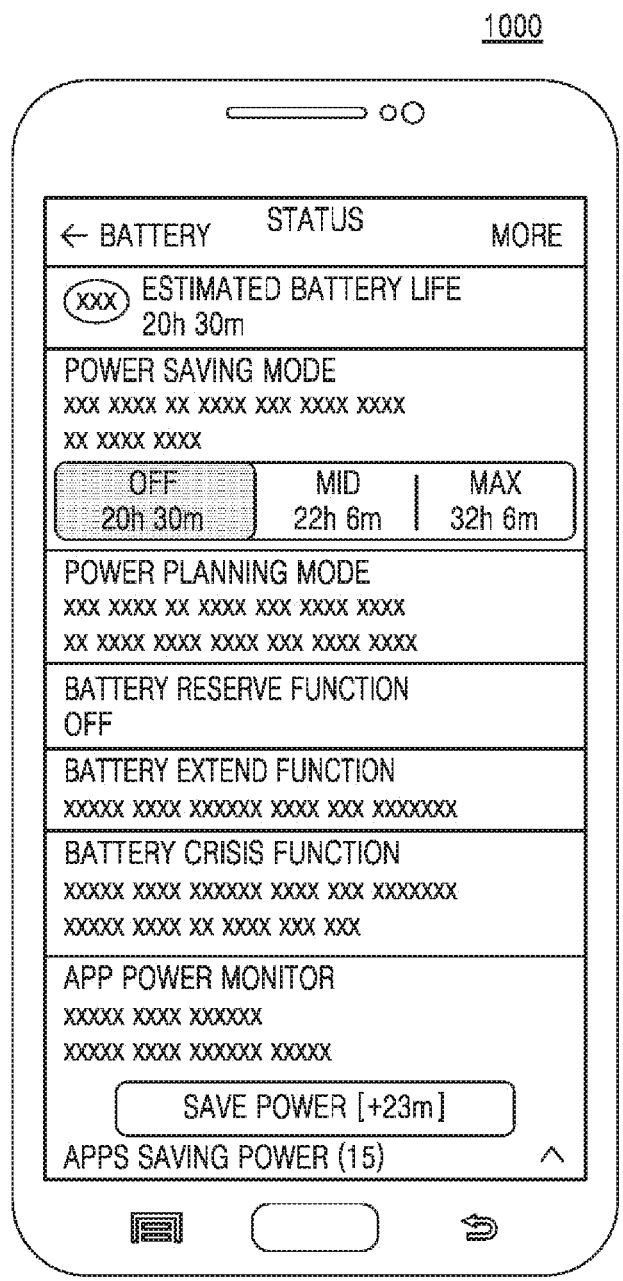

Referring to FIG. 6D, the display 180 displays the UI illustrating that the battery reserve function is enabled for calls only. The battery reserve criterion may be set to 15%.

The memory 160 may be configured to store the battery reserve criterion (e.g., 15%) and configured to apply the battery reserve criterion automatically in a successive iteration of the user once the power planning is enabled.

Figure 7:
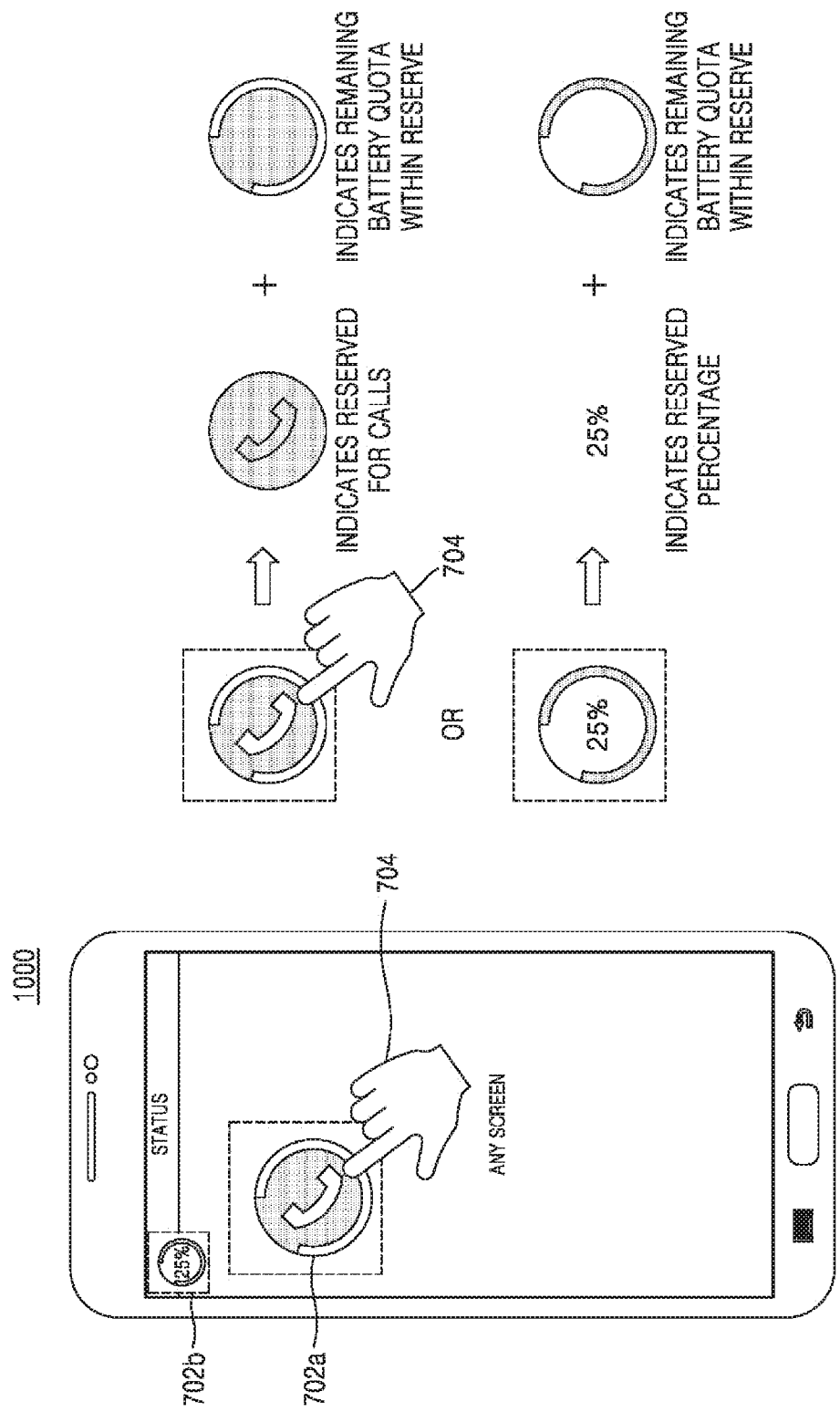
FIG. 7 is an illustration of various graphical elements of an application, indicating an active state of a reserve battery function, according to an embodiment of the present disclosure.

FIG. 7 is an illustration of various graphical elements indicating an active state of a reserve battery function, according to an embodiment of the present disclosure.

Referring to FIG. 7, the display 180 may be configured to display a status of the reserve battery function at the display portion (e.g., a status bar, an icon of an application selected to be accessed, a lock screen portion, or any portion of the display screen) of the display screen. The status indicates the battery reserve criterion configured for one or more application (e.g., a call application, a message application, etc.). Further, the status indicating remaining battery reserved quota for the call application is displayed by the icon of the applications, icon of the battery, etc. An example of a graphical user interface (GUI) (i.e., including the graphical elements, icon, or the like) of the call application icon 702a is shown in FIG. 7. Further, an example of a GUI indicator 702b for indicating the battery reserve criterion/remaining battery reserved quota in the status bar is shown in FIG. 7.

In an embodiment, the method allows the user to adjust (e.g., using an input 704 on the graphical element—the call application icon 702a) the reserve battery criterion directly from the graphical element (i.e., the call application icon 702a) of the selected application (i.e., a call application). In an embodiment, the display 180 may allow the user to perform the action (i.e., an input) on any of the graphical elements of the application (702a/702b) to directly navigate into the various graphical elements of the power planning mode (as shown in FIG. 7).

In an embodiment, the non-reserved battery capacity (i.e., apart from the reserved battery capacity) may always be shown as a percentage of its capacity. The display 180 may display the non-reserved battery capacity as being lower if more of the battery is consumed by the battery reserve function. Further, the call reserve may be shown in terms of hours for clarity of how long the battery power may last.

FIGS. 8A to 8D are illustrations of various graphical elements in which the battery reserve unit 102 is configured to allow the user to manage the battery reserve function directly from the notification panel, according to an embodiment of the present disclosure.

Figure 8A:
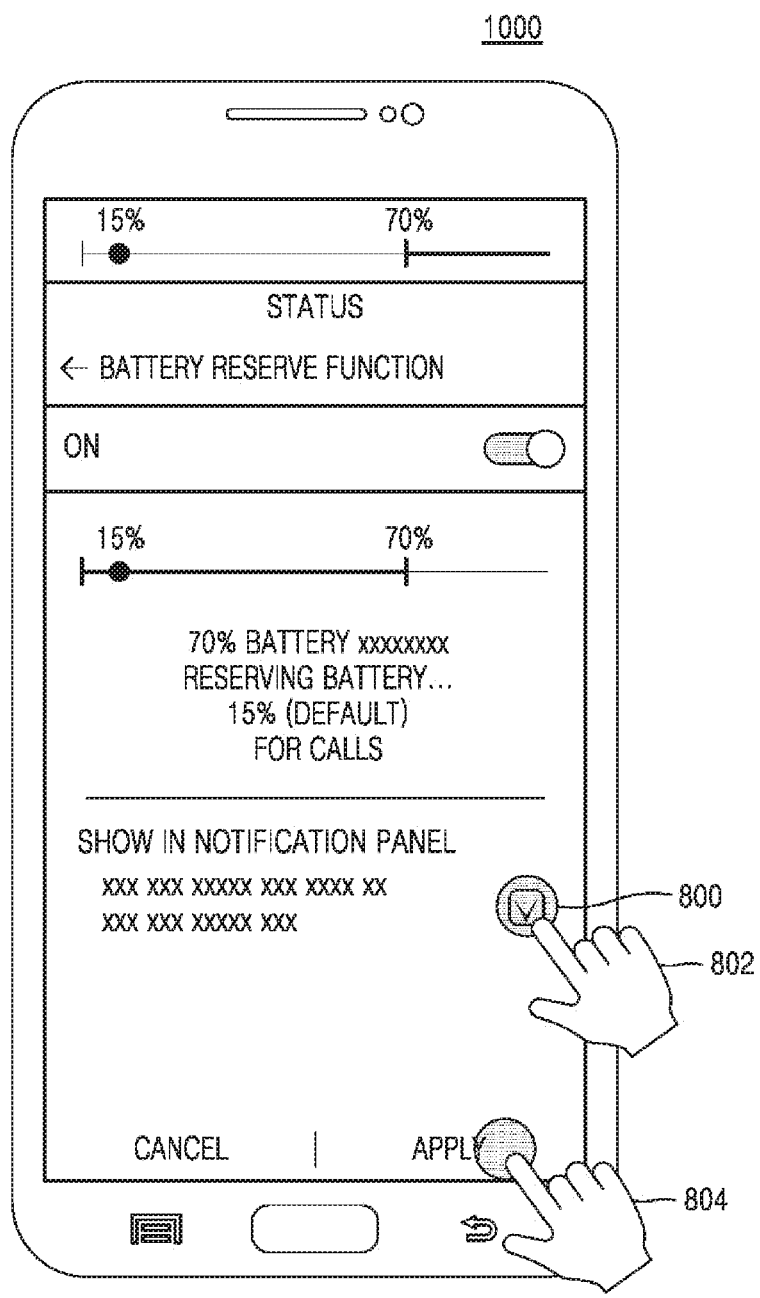
FIGS. 8A, 8B, 8C, and 8D are illustrations of various graphical elements in which a battery reserve unit is configured to manage a battery reserve function directly from a notification panel, according to an embodiment of the present disclosure.

Referring to FIG. 8A, a graphical element of the battery reserve function is illustrated in which the battery reserve unit 102 is configured to detect an input 802 and 804 (e.g., a slide gesture on a graphical element 800) to manage the battery reserve function directly from the notification panel. Thus, the battery reserve unit 102 allows the user to view the settings slider in the notification panel (i.e., a reserve battery slider indication).

Figure 8B:
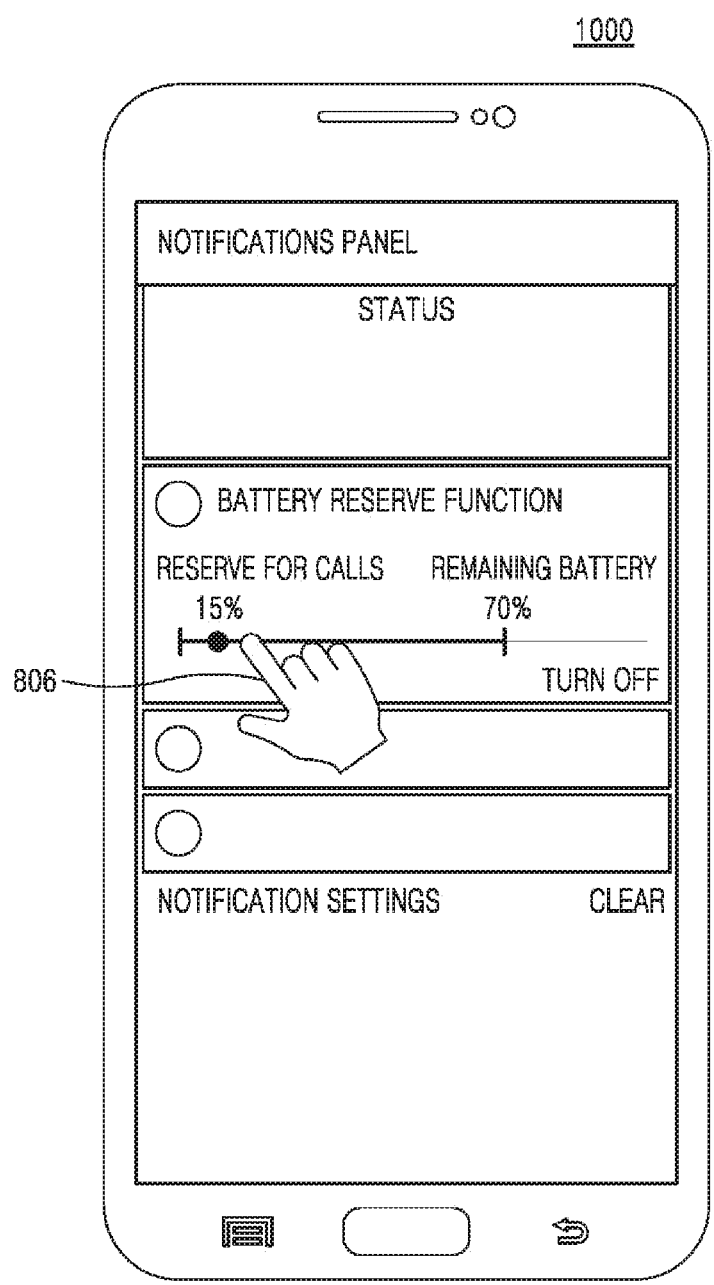

Referring to FIG. 8B, the battery reserve unit 102 allows the user to configure/alter the battery reserve criterion directly from the notification panel of the electronic device 1000. The user provides an input 806 to configure the battery reserve criterion. For example, the battery reserve criterion indication (in a percentage) may be viewed directly from the notification panel.

Figure 8C:
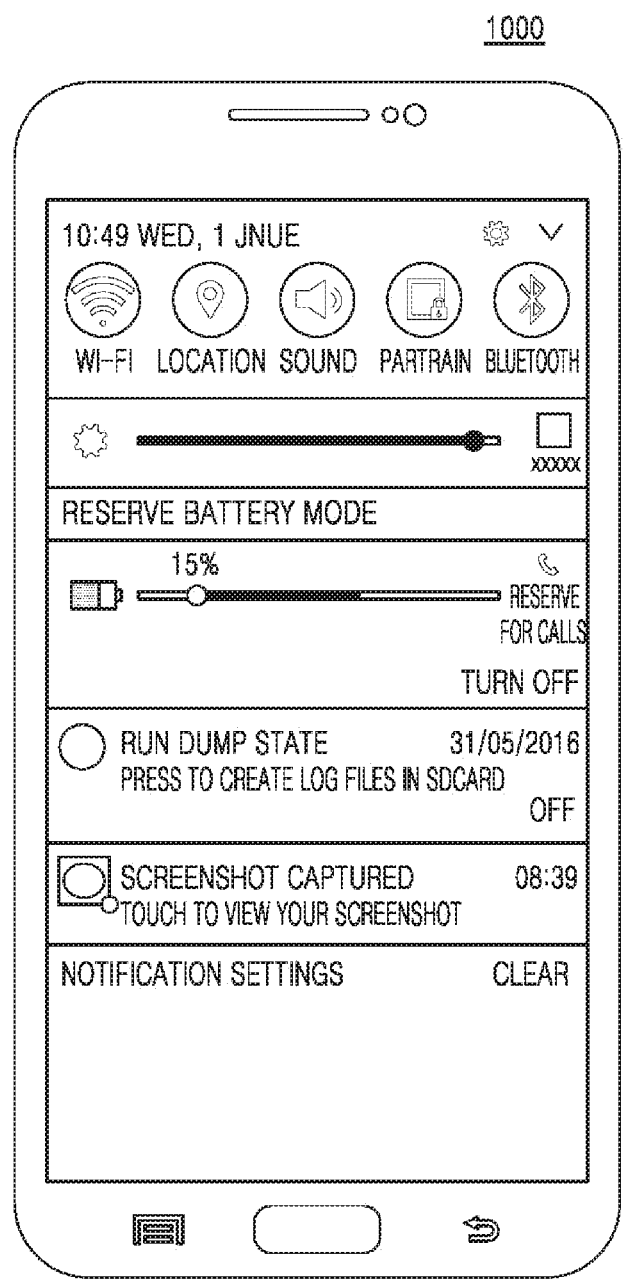

Referring to FIG. 8C, the graphical element illustrates the configuration (e.g., a battery reserve criterion configuration of the battery reserve function for the application (i.e., a call application)). The battery reserve unit 102 may allow the user to disable the battery reserve function directly from the notification panel.

Figure 8D:
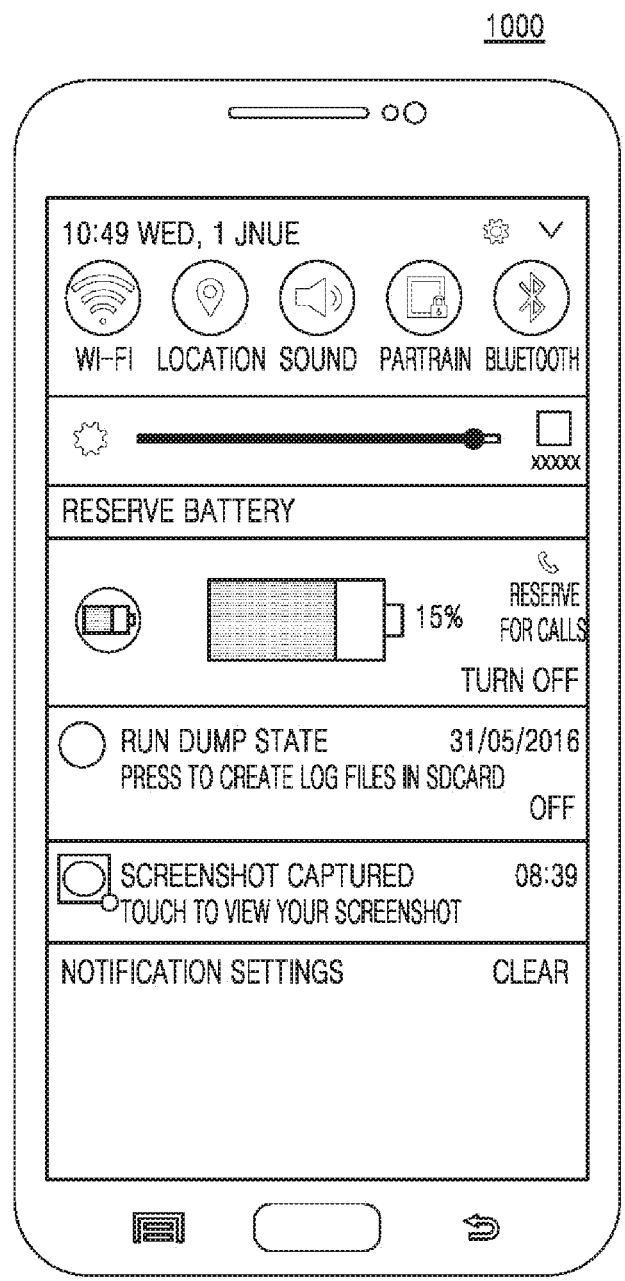

Referring to FIG. 8D, an alternate graphical element illustrating the configuration (e.g., a battery reserve criterion configuration of the battery reserve function is illustrated.

The battery reserve unit 102 may be configured to allow a user to alter the battery reserve function directly from the notification panel.

FIGS. 9A to 9D are illustrations of various graphical elements in which the battery reserve unit 102 detects a battery management event and enables the battery reserve function, according to an embodiment of the present disclosure.

Figure 9A:
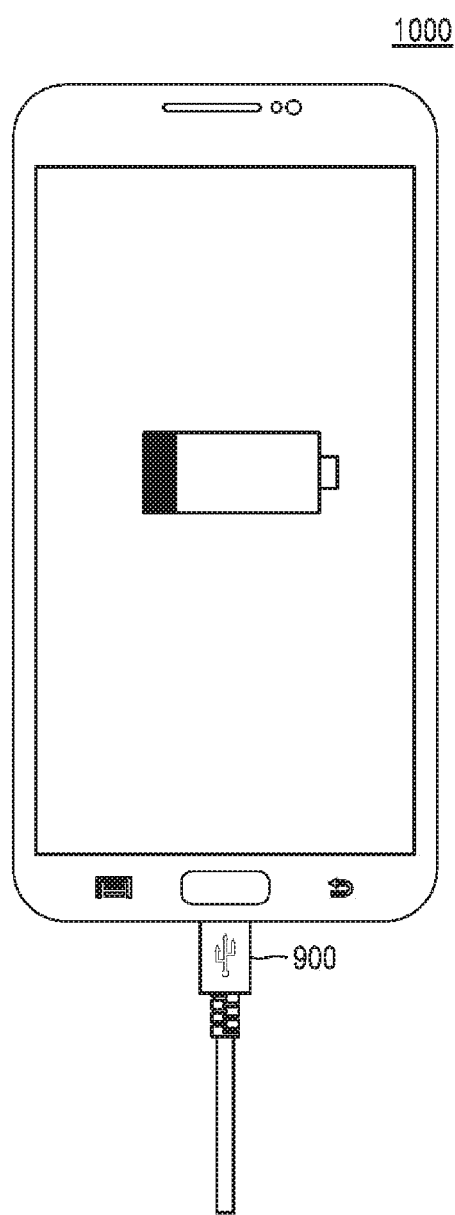
FIGS. 9A, 9B, 9C, and 9D are illustrations of various graphical elements in which a battery reserve unit detects a battery management event and enables a battery reserve function, according to an embodiment of the present disclosure.
Figure 9B:
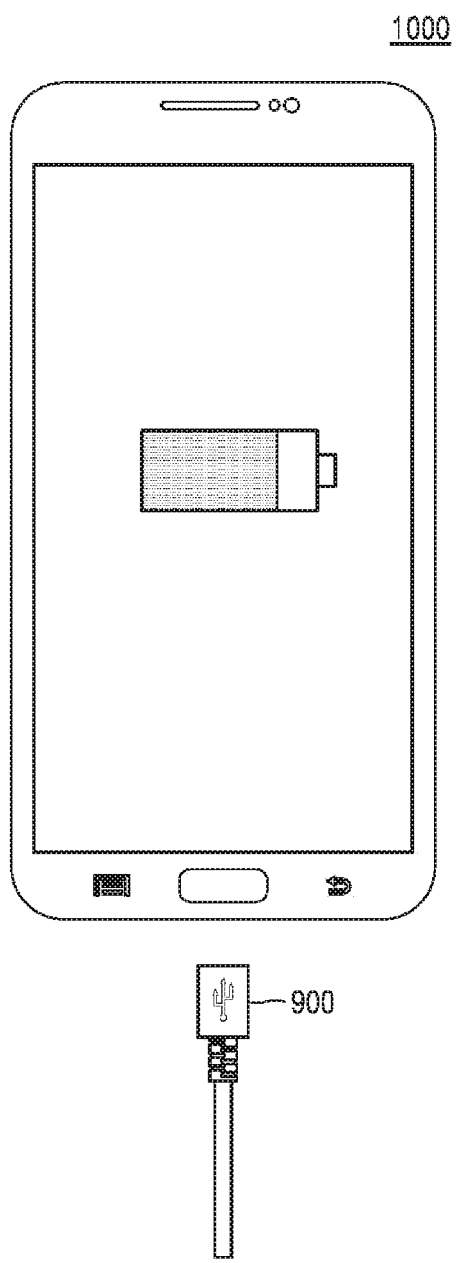

Referring to FIGS. 9A and 9B, where the battery reserve function is disabled and the electronic device 1000 is placed for charging (e.g., by plugging in a charging cable 900 of a charger), as shown in FIG. 9A. For example, the remaining battery capacity may be 5% and the user may have plugged the charging cable 900 into a charging port of the electronic device 1000 to charge the battery. During the course of charging the battery, if the user unplugs the charging cable 900, as shown in FIG. 9B, the battery reserve unit 102, monitoring the state of the battery level, may be configured to notify (i.e., at any portion of the display screen) the user that the charger is unplugged at i.e., 50%.

Figure 9C:
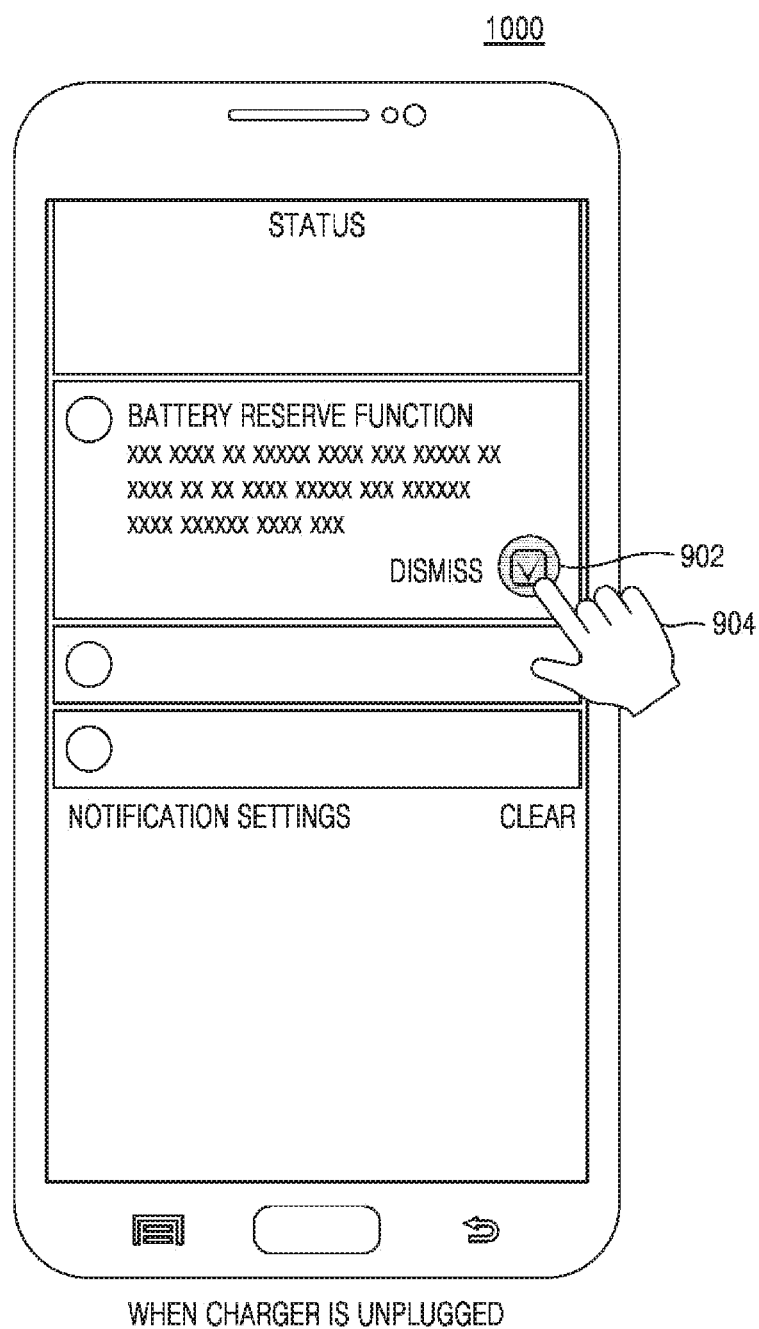
Figure 9D:
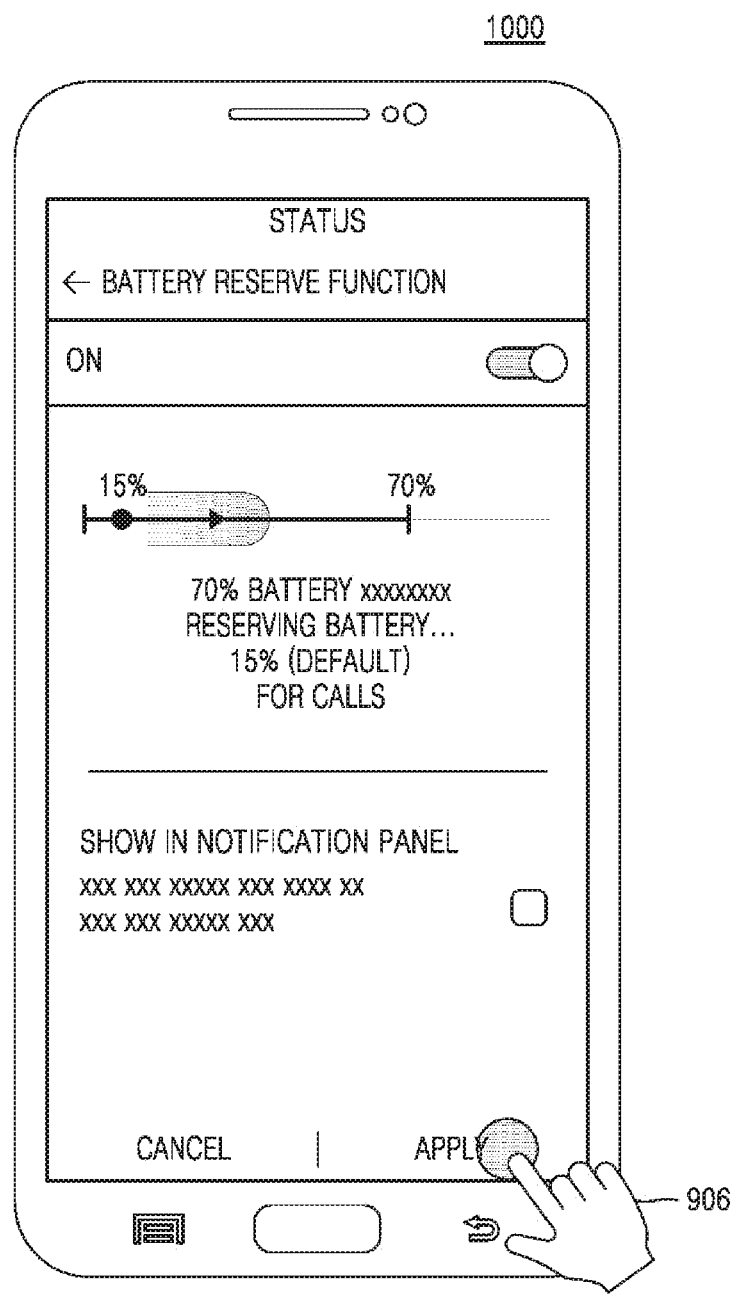

Referring to FIGS. 9C and 9D, along with the notification of the charger being unplugged, the battery reserve unit 102 is further configured to notify the user to enable the battery reserve function. The battery reserve unit 102 provides a single notification during the charger plug-in event and charger-unplug event (e.g., multiple notifications are not provided). As shown in FIG. 9C, the battery reserve unit 102 detects an input 904 on a graphical element 902 to enable the battery reserve function and to adjust the battery reserve criterion, as shown in FIG. 9D.

In an embodiment, the notification may be scheduled by the user of the electronic device 1000. The battery reserve unit 102 may dynamically enable the battery reserve function in response to detecting the battery management event.

Figure 10A:
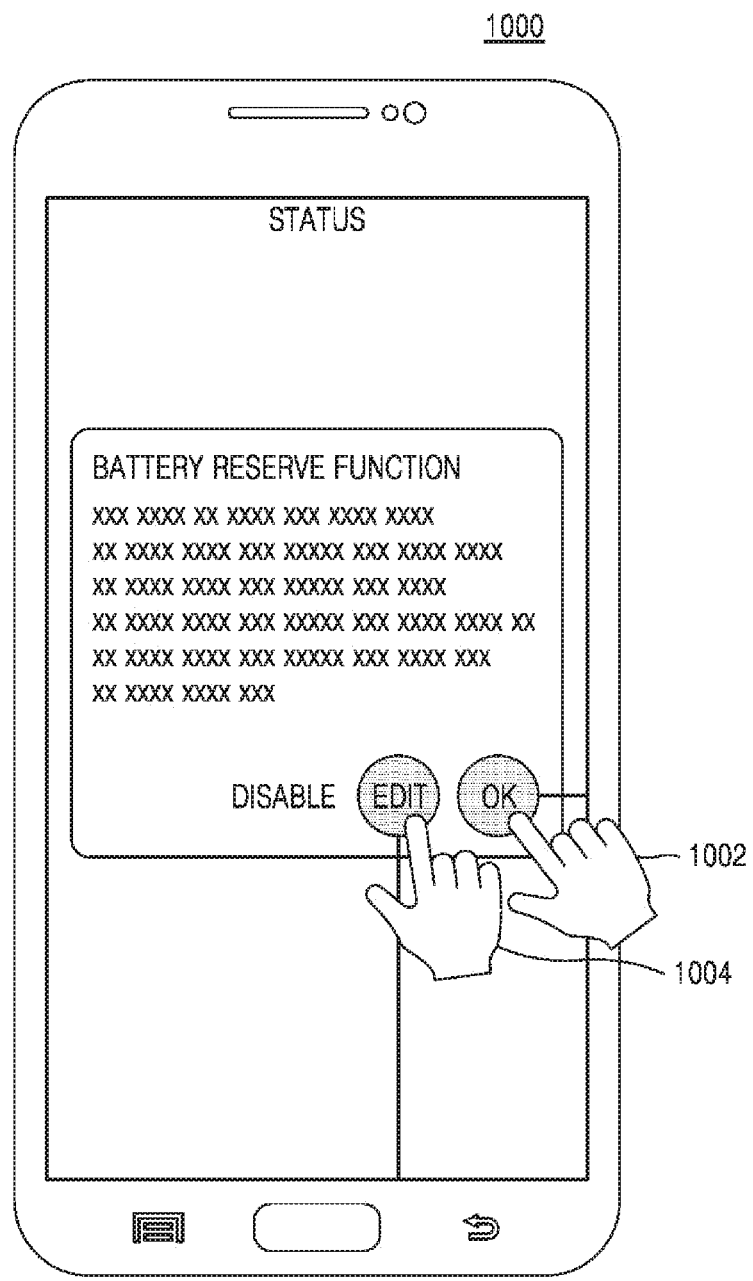
FIGS. 10A, 10B, and 10C are illustrations of various graphical elements for configuring a battery reserve criterion for applications associated with an electronic device, according to an embodiment of the present disclosure.
Figure 10B:
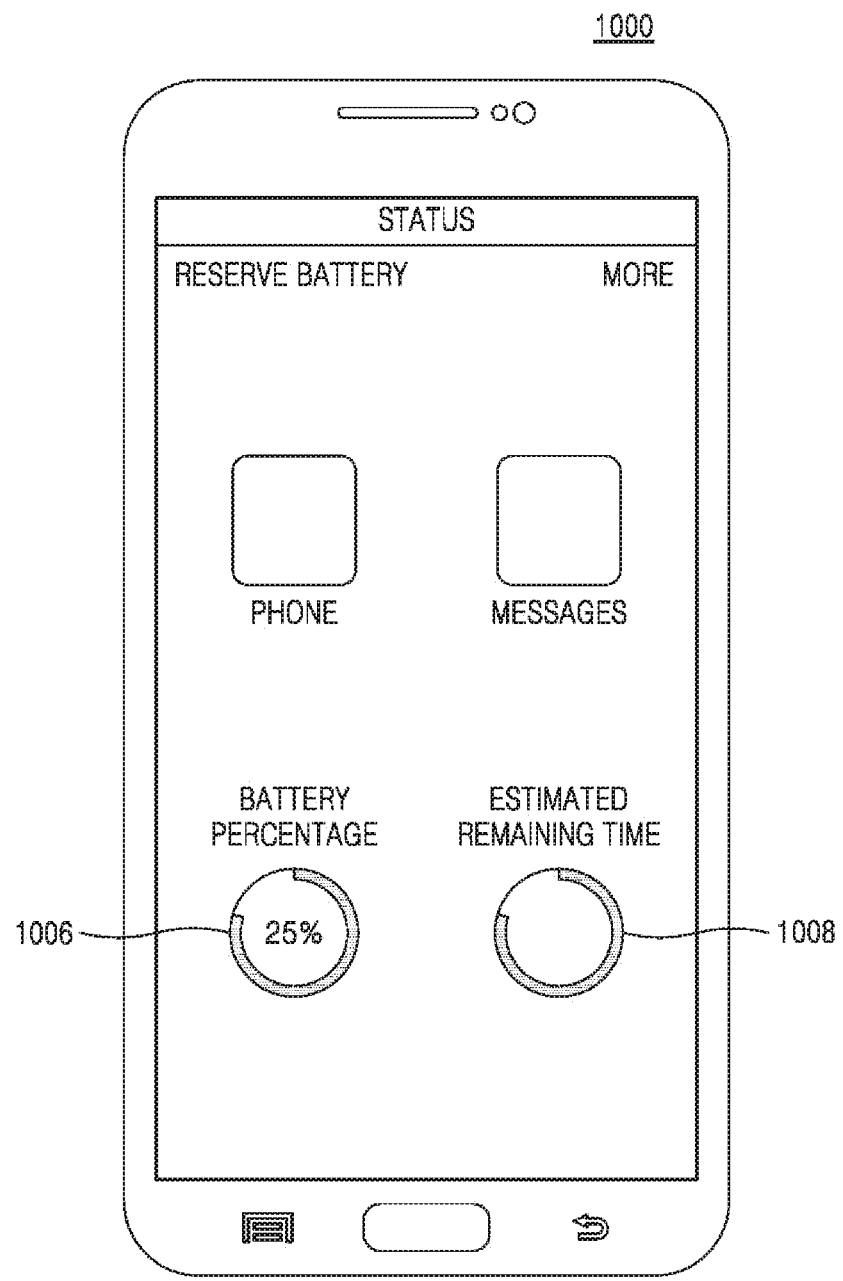
Figure 10C:
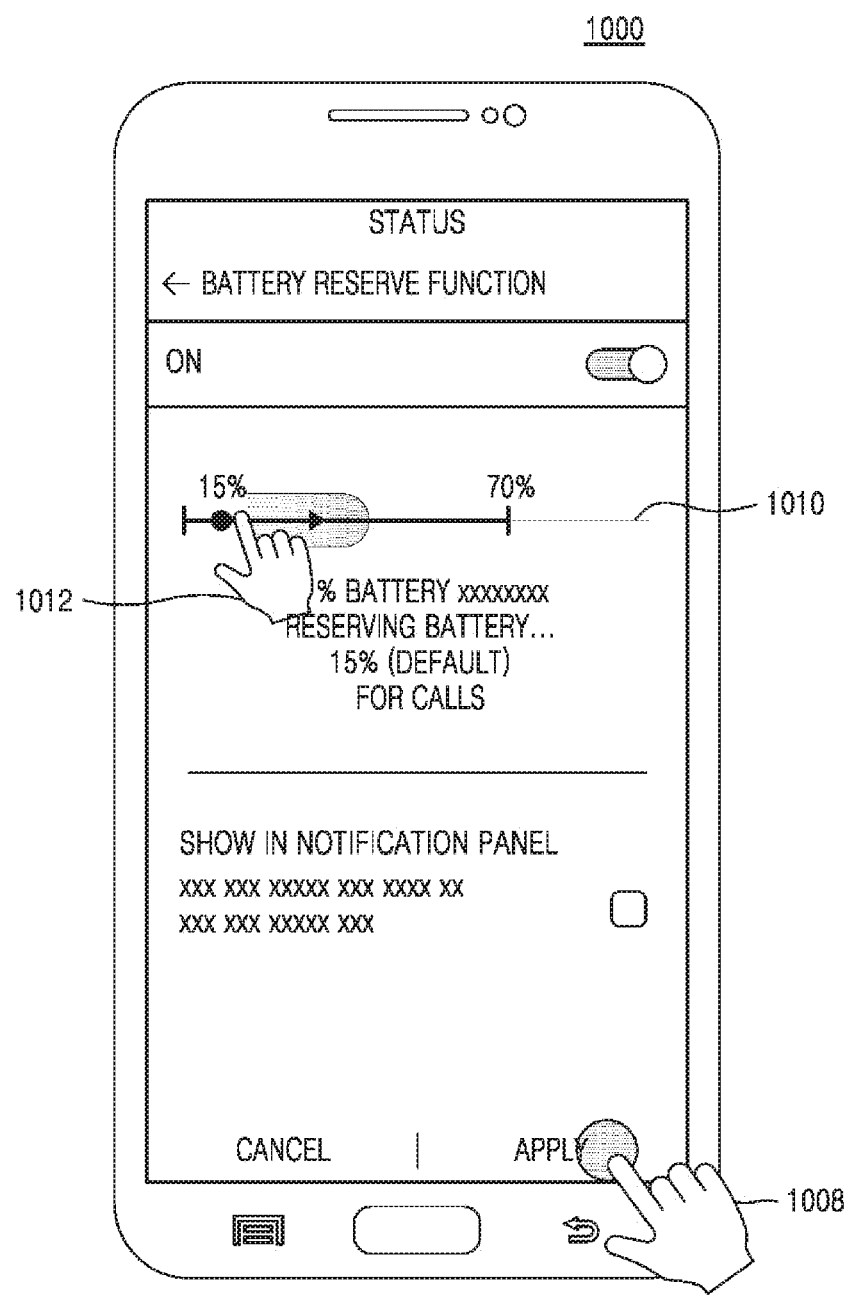

FIGS. 10A to 10C are illustrations of various graphical elements for configuring a battery reserve criterion for applications associated with the electronic device 1000, according to an embodiment of the present disclosure.

Referring to FIG. 10A, the battery reserve criterion may be pre-configured by the user or automatically configured by the processor 140. When the processor 140 detects that the remaining battery capacity (i.e., a remaining battery capacity apart from the battery reserved quota) is approaching the battery reserve criterion (e.g., 15%), then the processor 140 may be configured to provide a notification to the user that the remaining battery capacity is approaching the battery reserve criterion. When the battery level reaches the battery reserve criterion, then the battery reserve function may be automatically enabled. The battery reserve unit 102 may be configured to provide one or more options to the user i.e., the options such as, for example, editing the battery reserve criterion, disabling the battery reserve function, and continuing to operate in the battery reserve function.

Referring to FIG. 10B, when the battery reserve unit 102 detects an input 1002 to continue (i.e., OK) with the battery reserve function, the BMS 120 automatically invokes the maximum power saving mode, as illustrated in FIG. 10B. A graphical element 1006 (in percentage) illustrating the remaining reserve battery capacity and a graphical element 1008 indicating estimated remaining time for reserve battery capacity (e.g., estimated remaining time for calls and message services in accordance with the battery reserve criterion).

In an embodiment, the battery reserve unit 102 may allow the user to configure/alter (by providing an input) the battery reserve criterion directly from the graphical element 1006 and the estimated remaining time directly from the graphical element 1008. The input may be a sliding gesture, a scroll gesture, a tap gesture, etc.

Referring to FIGS. 10A and 10C, if the battery reserve unit 102 detects an input 1004 to edit the battery reserve criterion, then the UI illustrating a graphical element 1010 (e.g., Edit) allows the user to edit (by way of an input 1012) the battery reserve criterion, as illustrated in FIG. 10C.

In an embodiment, when the battery reserve unit 102 detects that the battery reserve criterion is exceeded (e.g., 16% or 20%), the battery reserve unit 102 may automatically disable the battery reserve function.

Figure 11A:
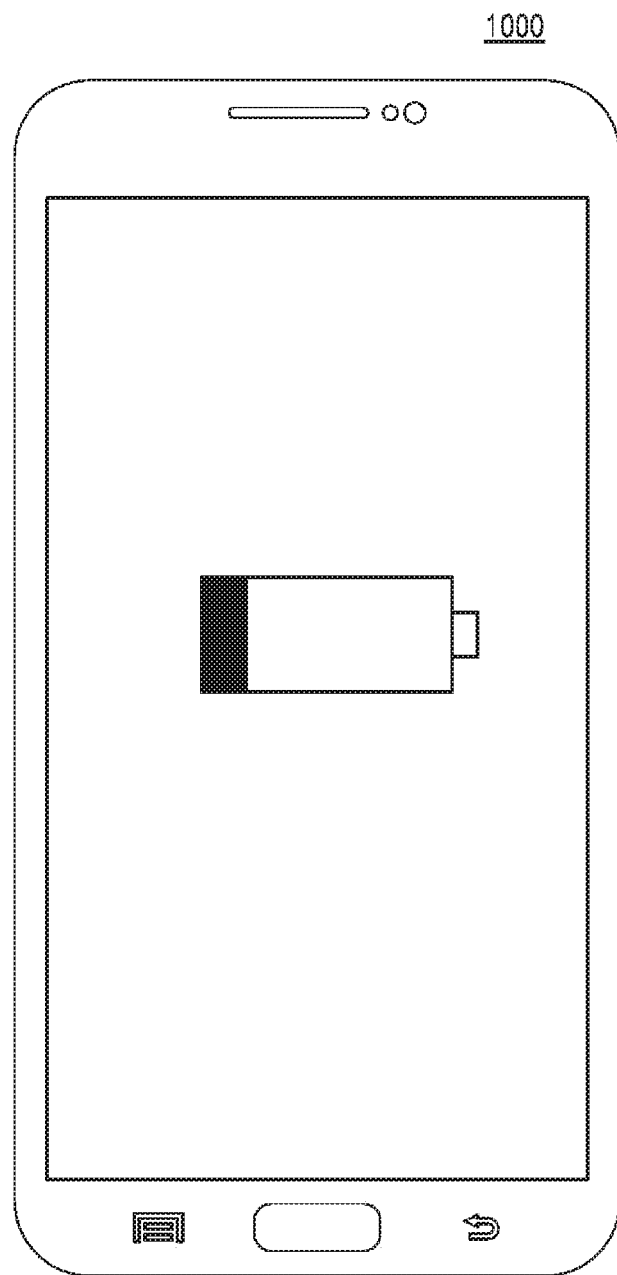
FIGS. 11A, 11B, and 11C are illustrations of various graphical elements in which a battery reserve unit allows a user to activate and de-active a portion of display screen, according to an embodiment of the present disclosure.
Figure 11B:
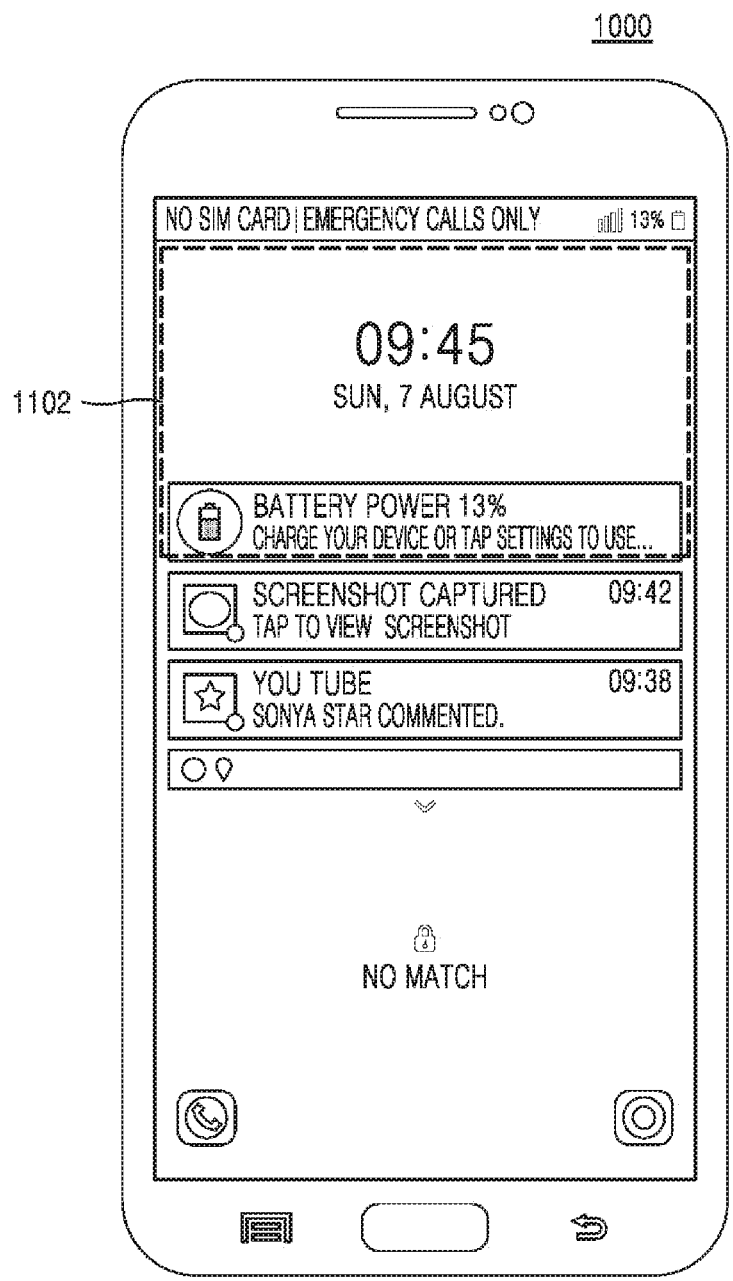
Figure 11C:
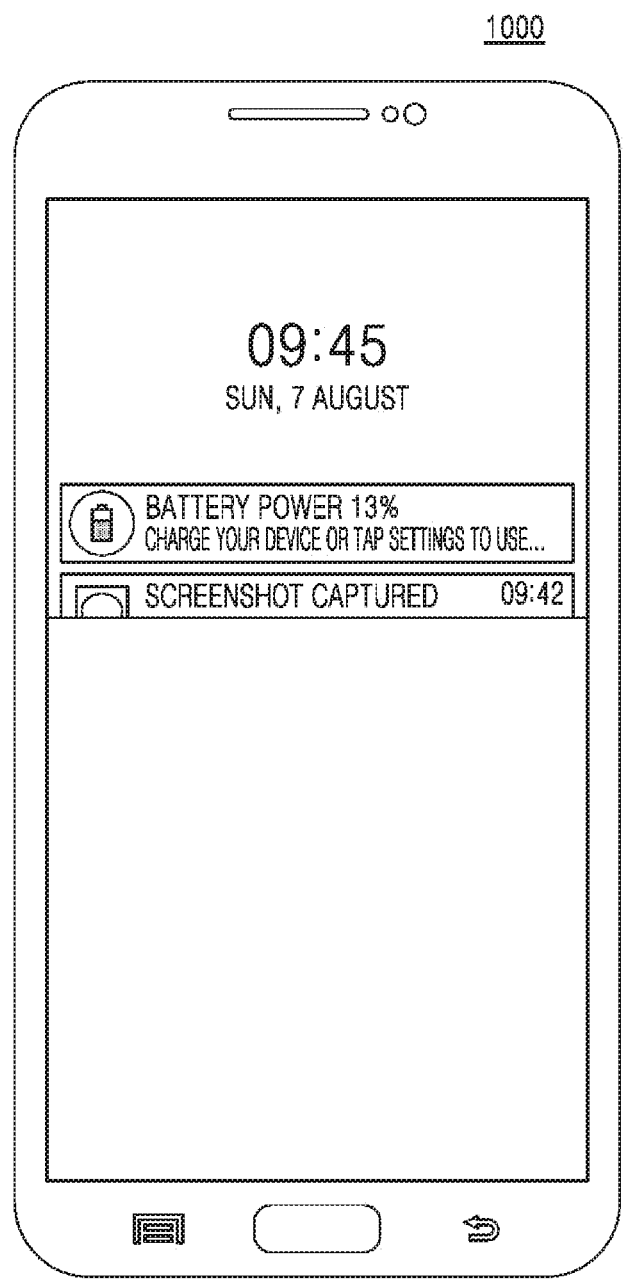

FIGS. 11A to 11C are illustrations of various graphical elements in which the battery reserve unit 102 allows a user to scale down a portion of a display screen, according to an embodiment of the present disclosure.

Referring to FIGS. 11A to 11C, when the battery reserve unit 102 detects that the battery reserve criterion is met (as illustrated in FIG. 11A), then the battery reserve unit 102, connected to the display 180, may detect an input 1102 (as illustrated in FIG. 11B) to select the display portion of the display screen, where the selected display portion (e.g., a color display) of the display screen is cropped (as illustrated in FIG. 11C) to conserve the remaining battery capacity. The unselected portion of the display screen may be trimmed. As the color display (pixels associated therewith) of the display screen consumes high battery usage, thus according to the proposed method the color display of the screen to be viewed may be configured/set by the user, when the electronic device 1000 is in the power planning mode.

In an embodiment, the battery reserve unit 102 may automatically identify the display portion of the display screen to be cropped based on several parameters. The parameters such as, for example, a display portion of the display screen consuming high battery usage, a display portion of the display screen frequently used by the user by monitoring a usage pattern, context (e.g., outdoor, environmental condition (e.g., sunny), etc.) of the electronic device 1000, content displayed by the display 180 of the electronic device 1000, and the like.

Figure 12A:
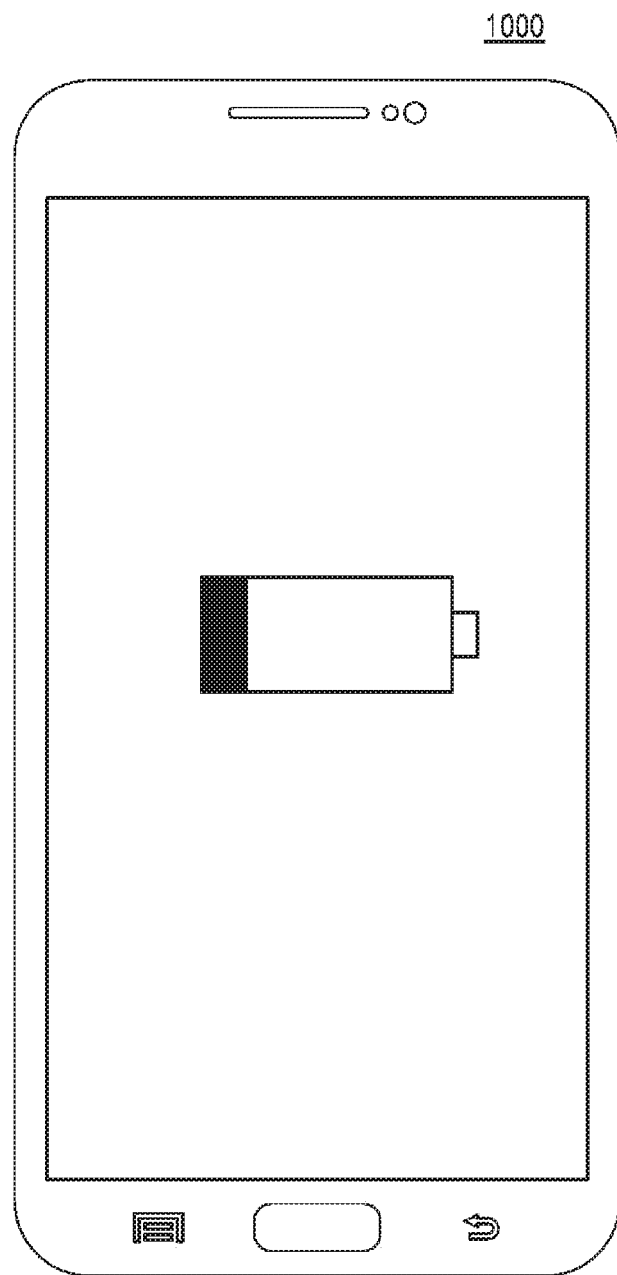
FIGS. 12A, 12B, and 12C are illustrations of various graphical elements in which a battery reserve unit allows a user to scale down a portion of a display screen, according to an embodiment of the present disclosure.
Figure 12B:
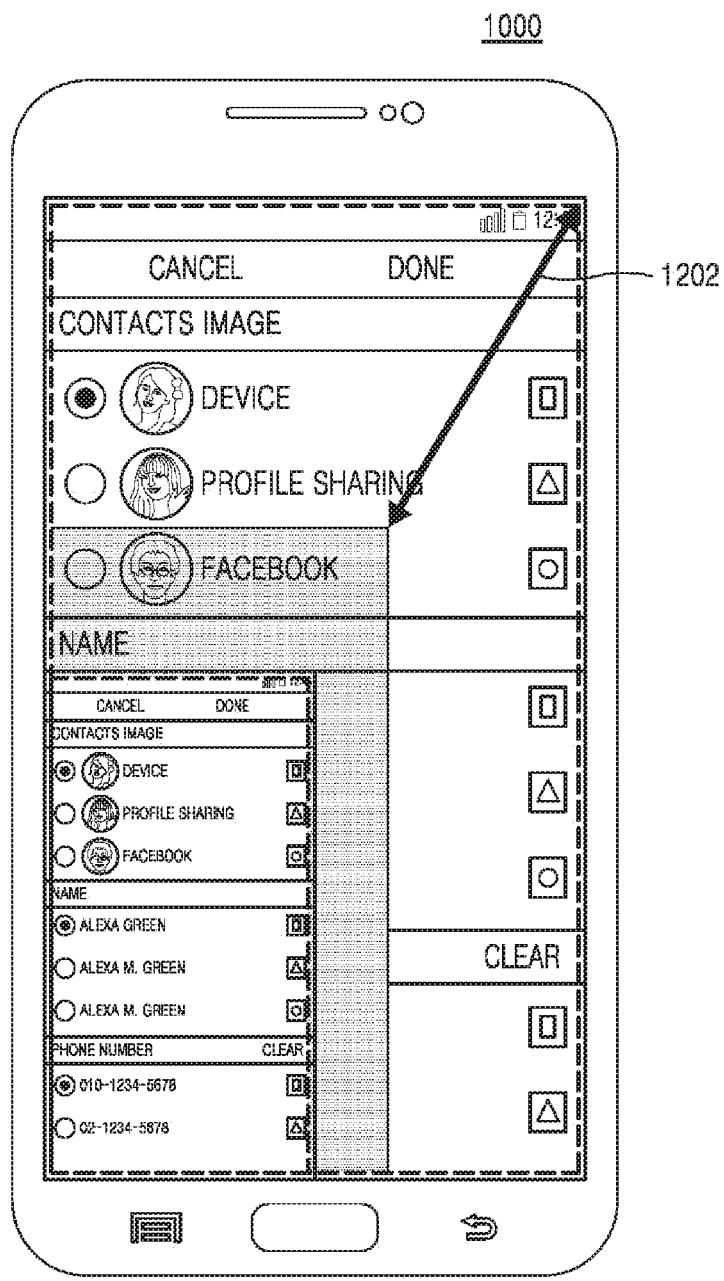
Figure 12C:
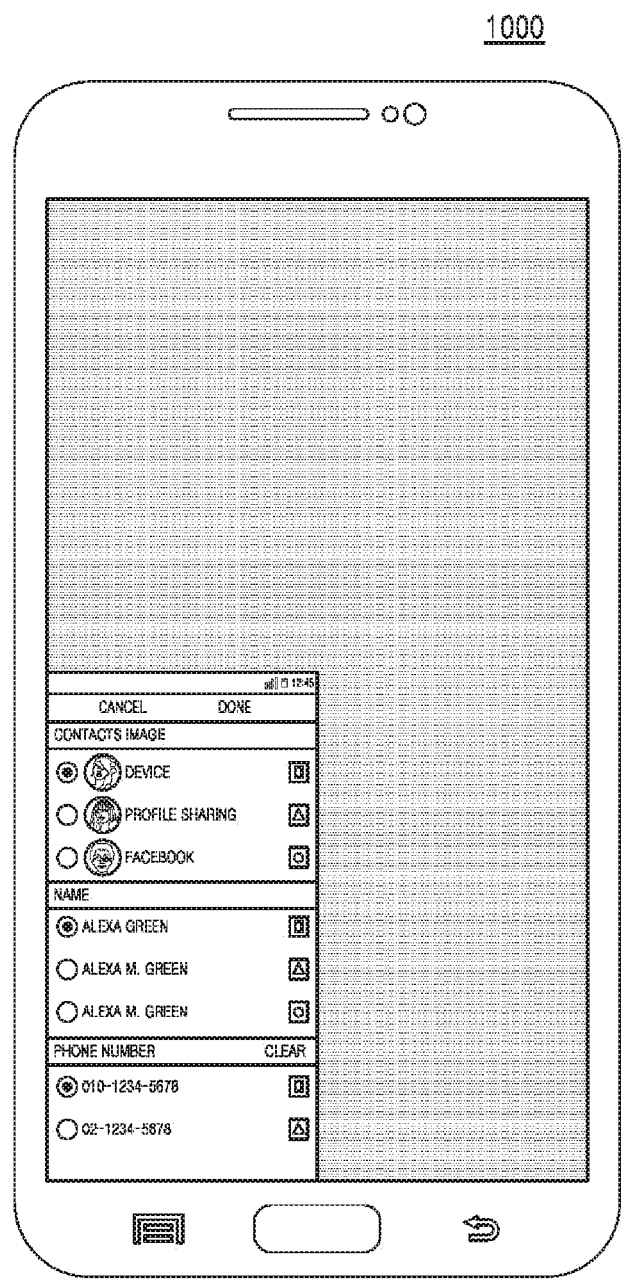

FIGS. 12A to 12C are illustrations of an example of managing a display portion of a display screen when a reserve battery criterion is met, according to an embodiment of the present disclosure.

Referring to FIGS. 12A to 12C, once the battery reserve criterion is met (as illustrated in FIG. 12A), the battery reserve unit 102 may be configured to detect an input to pin any portion of the display screen or take a screenshot of the display screen for any important page (e.g., a contact, messages, mail etc.) for optimizing the display during critical battery usage (e.g., important calls, messages, mail, etc.). The battery reserve unit 102 may allow the user to scale down display of the display screen and an important area is highlighted (by providing an input 1202, a gesture, a touch, etc., as illustrated in FIGS. 12B and 12C). Further, the content on the display screen may be displayed in lower color density (e.g., gray scale) for optimization or uniformly colored (as per the user). Thus, the battery reserve unit 102 allows the user to operate the display screen by retaining the original size of the display screen while displaying only a selective area.

Figure 13:
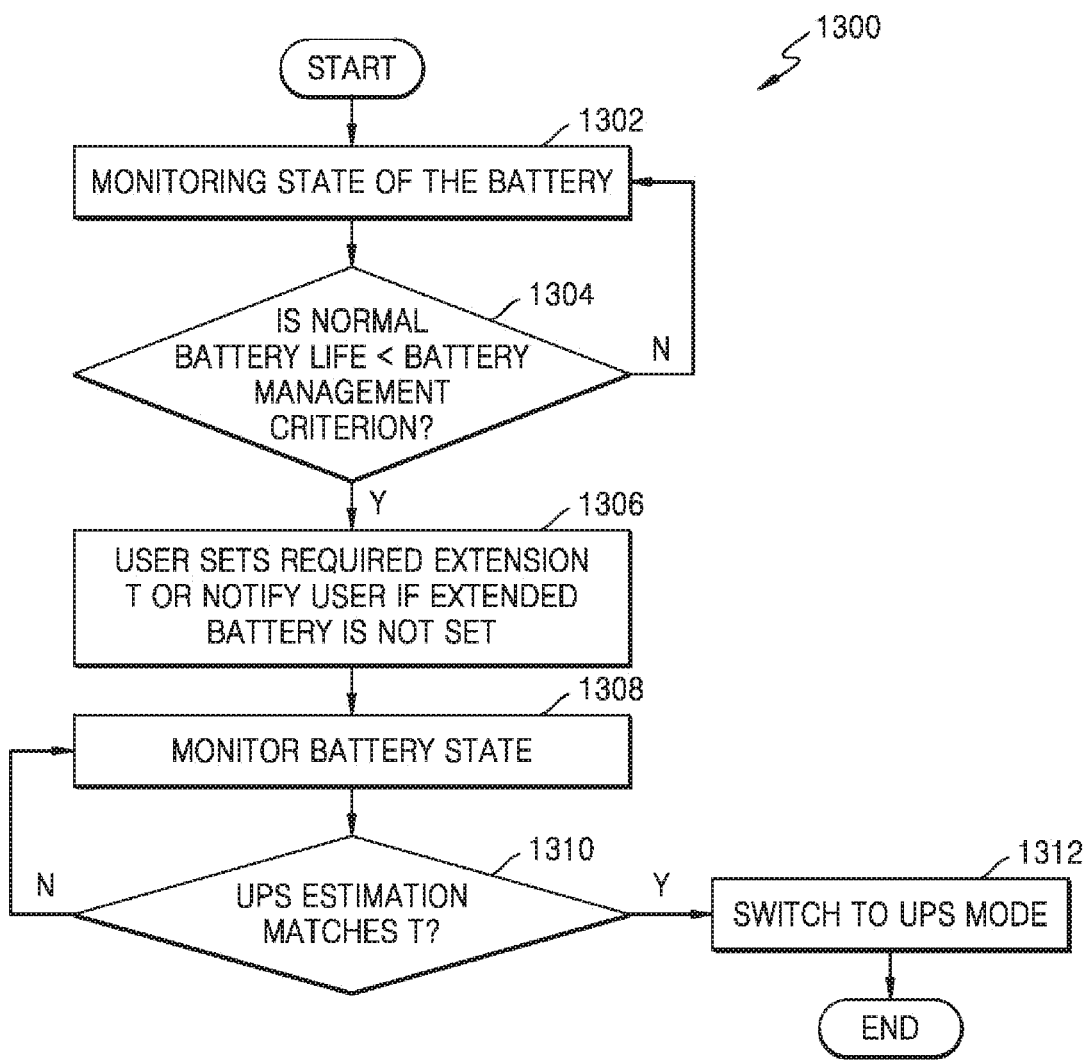
FIG. 13 is a flowchart of a method of a battery extend unit, according to an embodiment of the present disclosure.

Battery Extend Scenarios:

FIG. 13 is a flowchart 1300 of a method of various operations performed by the battery extend unit 104, according to an embodiment of the present disclosure.

Referring to FIG. 13, in step 1302, the battery extend unit 104 may be configured to monitor the state of the battery. Further, in step 1304, the battery extend unit 104 may be configured to determine whether the battery life is less than the battery management criterion. If, in step 1304, the battery extend unit 104 determines that the battery life is less than the battery management criterion then, in step 1306, the battery extend unit 104 provides a notification to a user to set his/her required extension time "T" or notify the user if extended battery is not set. If, in step 1304, the battery extend unit 104 determines that the battery life is greater than the battery management criterion then the battery extend unit 104 loops back to perform the method described in step 1302.

Further, yet again, in step 1308, the battery extend unit 104 may be configured to monitor the battery state. The battery extend unit 104 monitors the battery state by the techniques described below.

Battery standby time estimation may be done by a moving average method for all current power modes. For this method, 2 types of persistent tables are used: (a) a static table containing power mode constants of a device or MODEL_PARAMETERS. A sample table is illustrated below in Table 2.

TABLE 2

| | |
|---|---|
| Avg Duration per level change (in sec) | 900 |
| BASIC (normal) mode (in %) | 100 |
| POWER SAVING mode (in %) | 106 |
| UPS mode (in %) | 235 |
| Power Saving restrict data (in %) | 109 |

(b) dynamic table-update values of each battery-level change and calculations of the moving average. This table is used to learn user patterns and estimate duration based on usage characteristics over a period of 7 days. For example, a sample table is given below as in Table 3.

TABLE 3

| index | Date | Samples | Duration |
|---|---|---|---|
| 1 | 10$^{th}$ May | 10 | 400 |
| 2 | 11$^{th}$ May | 5 | 500 |
| 3 | 12$^{th}$ May | 7 | 450 |
| 4 | 13$^{th}$ May | 8 | 600 |

TABLE 3-continued

| index | Date | Samples | Duration |
|---|---|---|---|
| 5 | 14$^{th}$ May | 11 | 220 |
| 6 | 15$^{th}$ May | 8 | 450 |
| 7 | 16$^{th}$ May | 5 | 600 |

As indicated above, Table 3 consists of 3 columns (excluding the index), the first being "Date" on which a data is taken. The second column indicates the number of samples collected on a date—usually samples are collected at every battery level change and some other system mode changes. In the third column, a moving average of a per battery-level time duration is determined, which is calculated as:

(New duration*mode weightage+samples*previous duration)/(samples+1)

Where mode weightage is a constant based on which mode the device is currently operating in, a new duration is time taken for the device's battery to fall to a current level from its previous level.

Finally, Estimated time in Basic mode=($\Sigma$(samples)i*(duration)i/$\Sigma$ samplesi)×current battery level Similarly, Estimated time in Power saving mode=estimated time in Basic mode*Static value for PS mode and, Estimated time in Ultra Power saving mode=estimated time in Basic mode*Static value for UPS mode.

Also, owing to accuracy issues and battery degradation, estimations for lesser moving average times (e.g., 40% of average (avg) durations) and greater moving average times (e.g., 200% of avg durations) will not be accurate. For such values the upper and lower limits are taken into consideration for calculation of the estimated time. UPS mode will not show estimates in the learning period and when the battery level falls below 5%.

Since Table 2 and Table 3 are persistent in a file system, the method may estimate the time when the electronic device 1000 is powered off.

Further, the electronic device 1000 optimization to extend battery includes two phases.

(1) Coarse-grained approach: A time instance is determined with respect to switching on the power saving (PS) and UPS modes, respectively. When the user sets a time limit, the user may continue to operate in normal mode while the system monitors the estimated battery life at each battery level change for PS and UPS modes. If the user sets a time greater than PS mode estimated life, PS mode will be switched on. When UPS battery life matches the user set value at a particular level, UPS mode will be switched on.

For example, if a current estimated time is 3 hours, the corresponding UPS estimated time shown is 7 hours. Thus, the battery extend unit 104 may allow the user to set the extended time from 3 to 7 hours.

If the user sets the limit at 6 hours from the current time, PS mode will be turned on immediately and the battery extend unit 104 may determine UPS switching time by continuously monitoring battery level change broadcasts by the system. When the UPS time matches the time set by the user, the UPS mode is switched on.

Thus, due to battery estimation inaccuracy, it may be possible that even UPS mode will not be sufficient to contain the power drainage. In such a scenario, the battery extend unit 104 may be configured to provide an alert dialog with maximum time limit, which allows the user to reduce the set limit by some amount.

For example, the following method may be used by the battery extend unit 104 to schedule the activation of each mode:

Let Normal estimated battery life (mileage) at time t be Et
Estimated battery life (mileage) due to PS at time t be Pt
Estimated battery life (mileage) due to UPS at time t be Ut If user extends to S where Et≤S≤Ut

TABLE 4

| Enable PS if | $S > P_t$ |
|---|---|
| Enable UPS at t1 when | $U_{t1} = S_{t1} = S - t1$ |

(2) The battery extend unit 104 will provide notification to the user at the above times (as illustrated in Table 4 above) to enable/disable the battery extend mode. If the user chooses to cancel, Extend battery (Battery Mileage) will be reset. For the UPS enabling dialog box, the user must select the option within a fixed time period (e.g., 15 seconds), or else UPS will be turned on by default. However, this is still a crude way to schedule.

In step 1310, the battery extend unit 104 may be configured to determine whether the UPS estimation matches the battery extend criterion "T". If, in step 1310, the battery extend unit 104 determines that the UPS estimation matches the battery extend criterion "T", then the battery extend unit 104 switches on the UPS mode in step 1312. If, in step 1310, the battery extend unit 104 determines that the UPS estimation does not match the battery extend criterion "T", then the battery extend unit 104 loops back to perform the method in step 1308.

FIGS. 14A to 14D are illustrations of various graphical elements of a power planning mode in which the battery extend unit 104 allows a user to enable a battery extend function, according to an embodiment of the present disclosure.

Figure 14A:
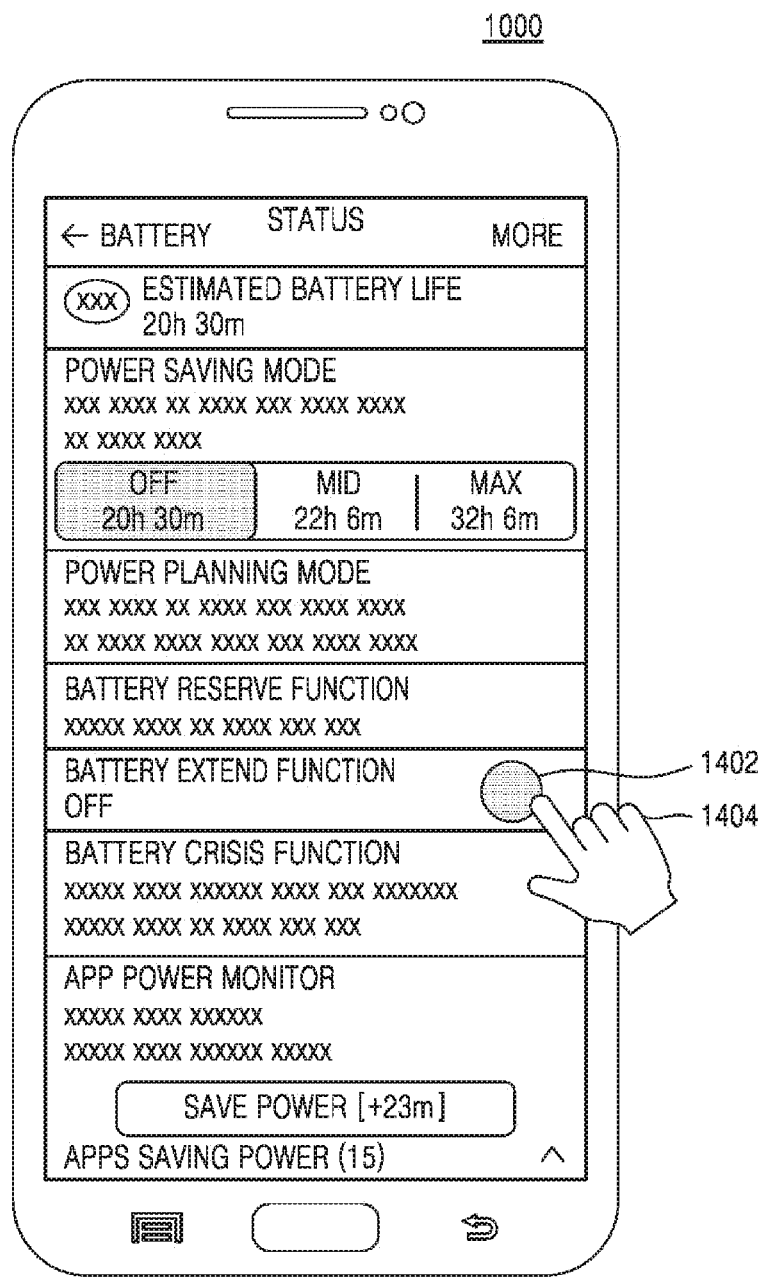
FIGS. 14A, 14B, 14C, and 14D are illustrations of various graphical elements of a power planning mode in which a battery extend unit enables a battery extend function, according to an embodiment of the present disclosure.

Referring to FIG. 14A, the user of the electronic device 1000 may enable the power planning mode from a notification panel of the electronic device 1000 by performing various gestures (e.g., a touch, a slide, a scroll, a swipe, etc.). If the user enables the power planning mode (for the first time), the power planning unit 110, connected to the display 180, switches the display screen including various power planning functions of the power planning mode, as illustrated in FIG. 14A.

The battery extend unit 104 detects an input 1404 on a graphical element 1402 (e.g., a slider) to select the battery extend function from the plurality of battery management functions of the power planning mode. The input 1404 may be a touch, a slide, a swipe, a gesture, etc.

Figure 14B:
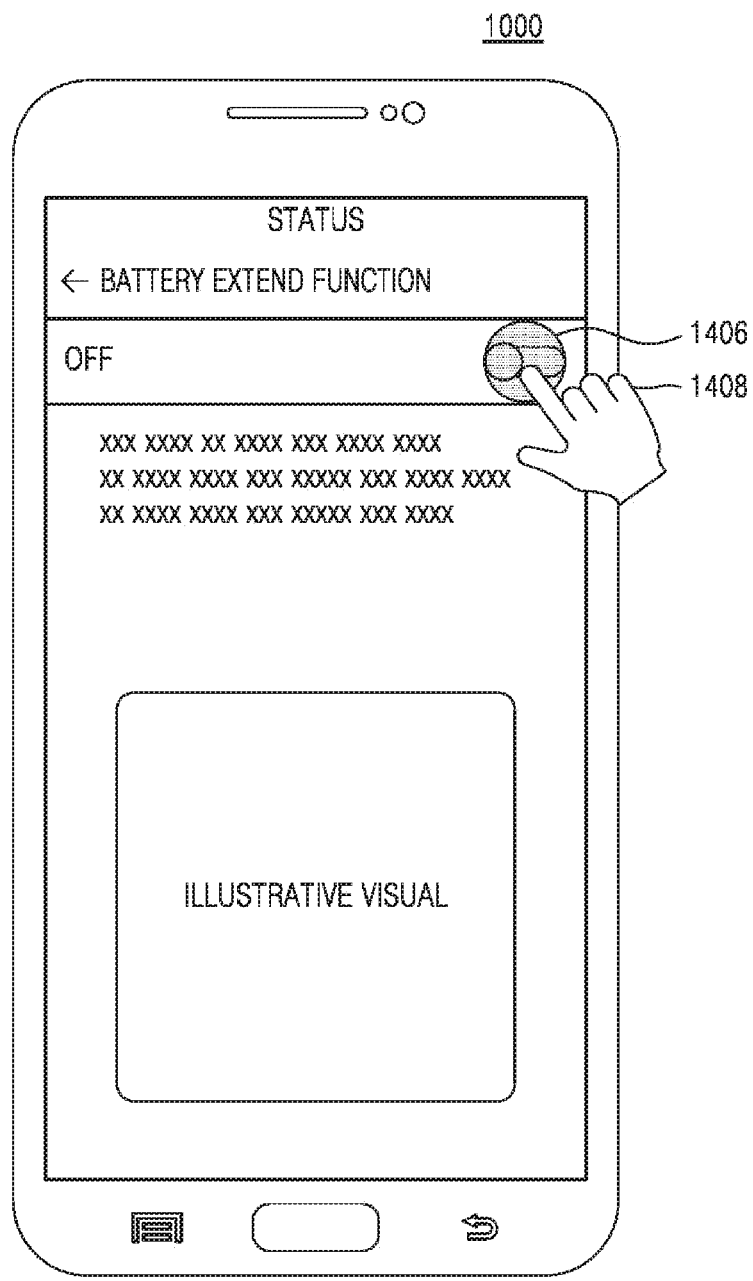

Referring to FIG. 14B, in response to the input 1404, the display 180 may be controlled to display a UI allowing the user to enable (e.g., by way of an input 1408 on a graphical element 1406) the battery extend function (e.g., battery mileage) extending the remaining capacity of the battery to last up to the maximum period of time. The remaining battery capacity will be extended depending on the current state of the battery. In an embodiment, the battery extend unit 104 may be configured to automatically enable the battery extend function (e.g., if the battery extend unit 104 identifies any stored configuration related to the battery extend function).

Figure 14C:
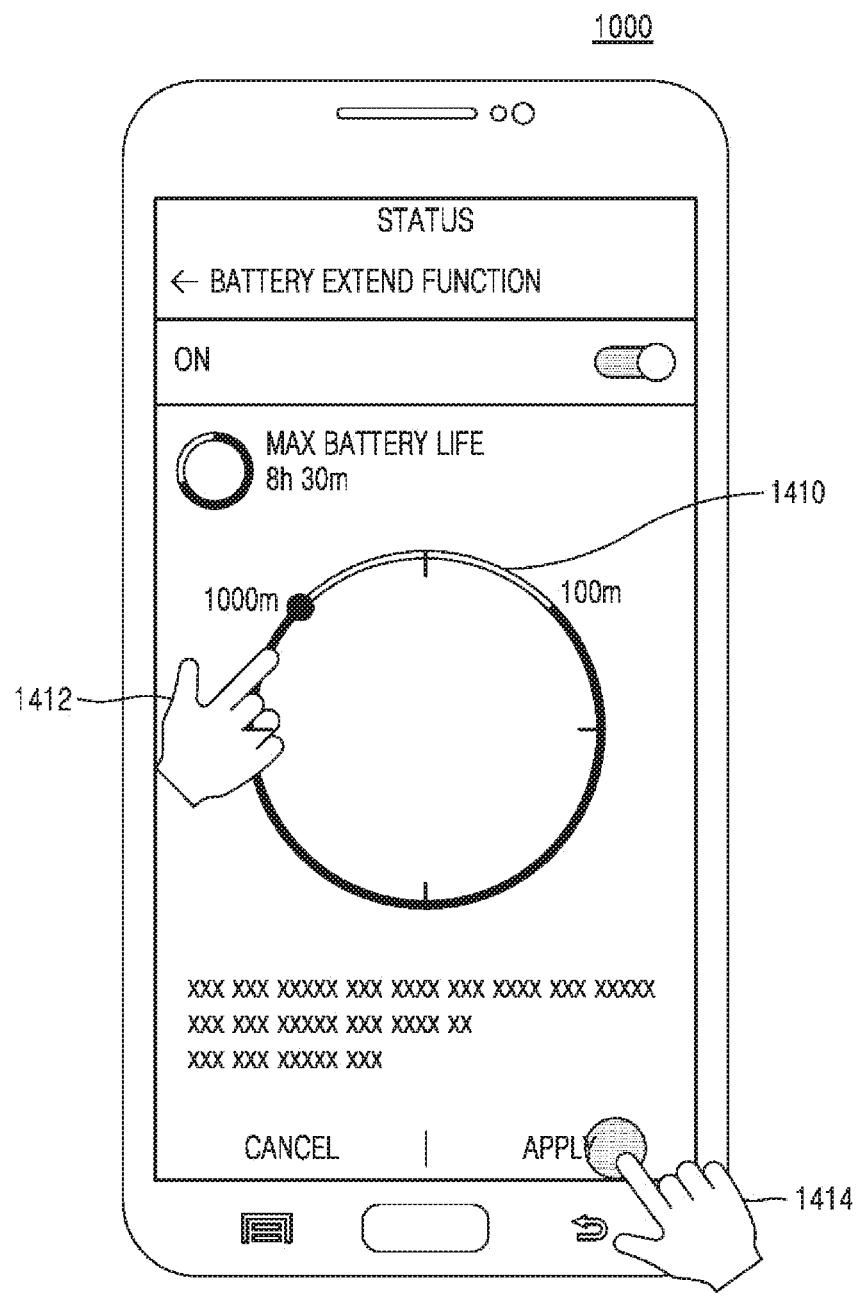

Referring to FIG. 14C, the display 180 may be controlled to detect an input 1412 on a graphical element 1410 to configure/set the battery extend criterion provided by the battery extend unit 104. The battery extend unit 104 may be configured to compute various parameters e.g., current battery usage pattern, estimated time of arrival of the user of the electronic device 1000 to a location, context of the user of the content displayed on the electronic device 1000, context of the electronic device 1000, usage pattern of the electronic device 1000, battery usage pattern, etc., and provide the extended battery mileage time (e.g., battery extend criterion) to the user. Further, the battery extend unit 104 may be configured to detect an input 1414 to apply the battery extend function according to the battery extend criterion configured/set by the user.

Figure 14D:
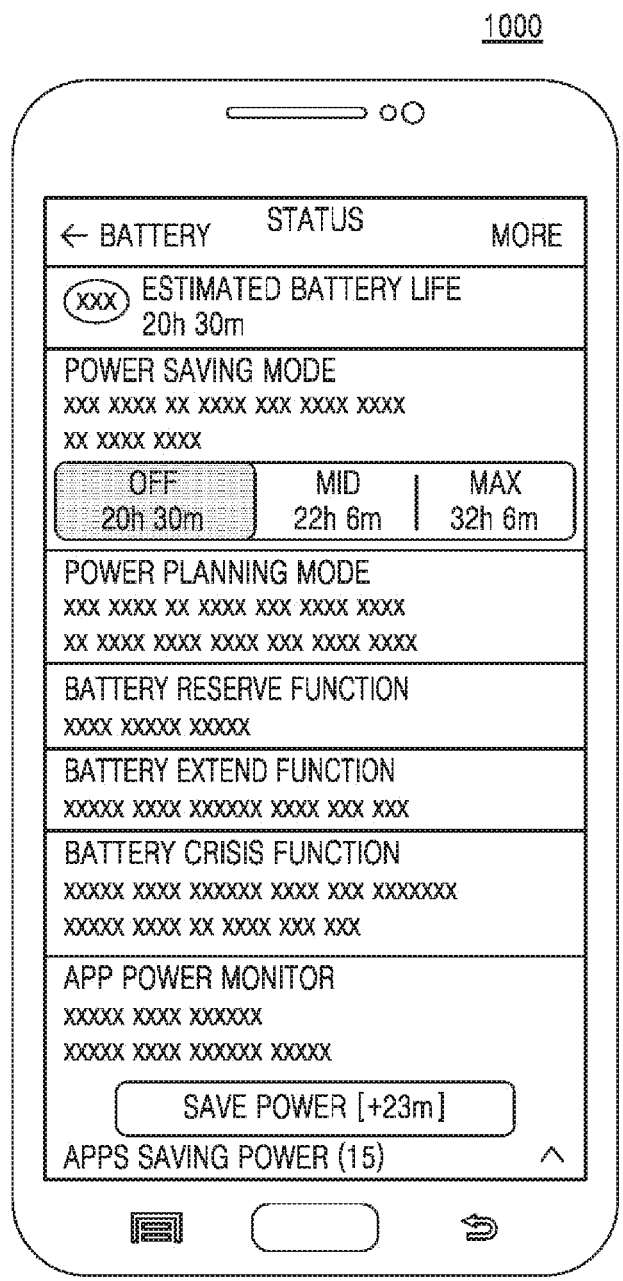

Referring to FIG. 14D, the display 180 is controlled to display the UI illustrating that the battery extend function is enabled and the battery extend criterion.

Figure 15:
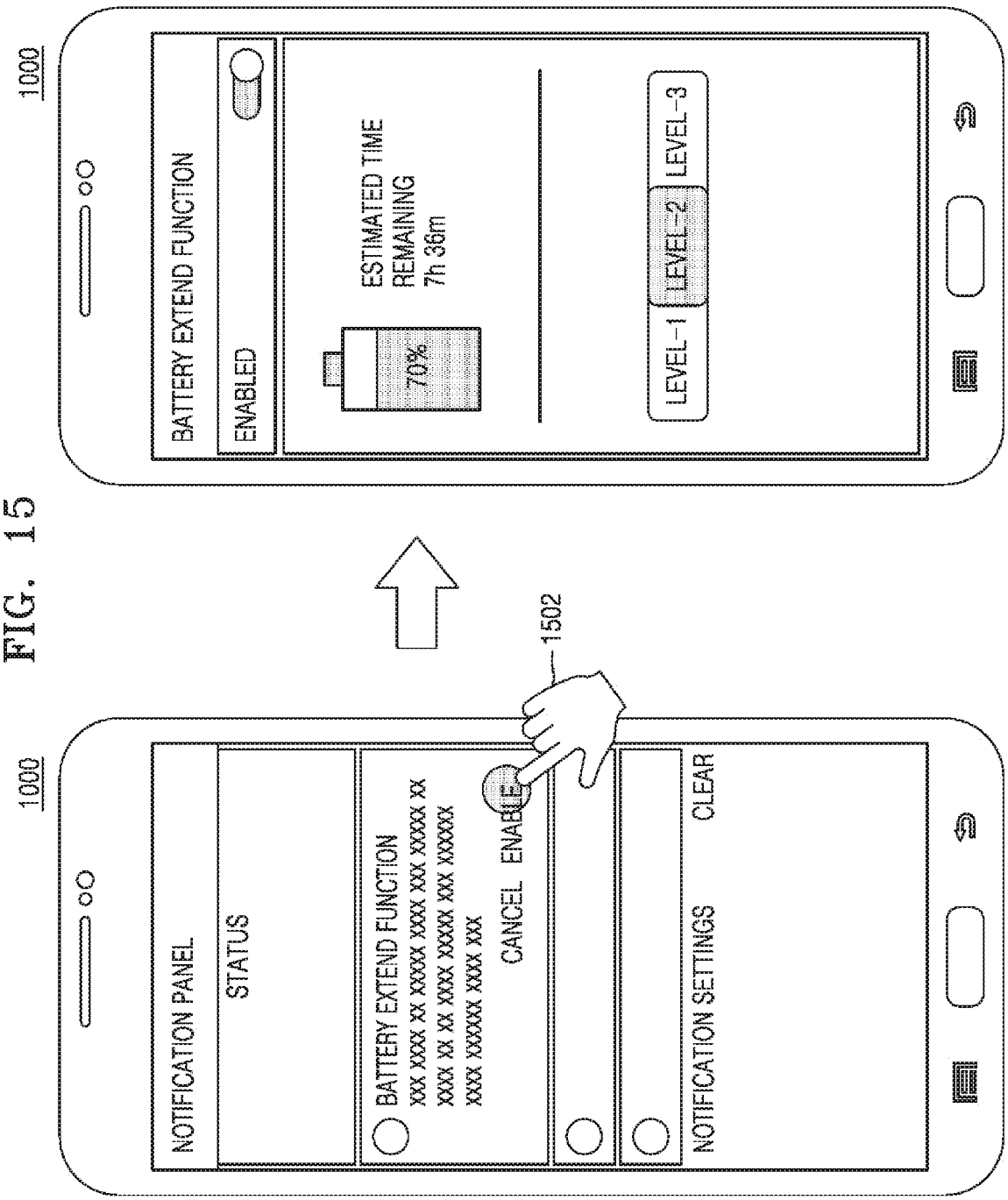
FIG. 15 is an illustrations of various example scenarios for managing a battery discharge rate by a battery extend unit, according to an embodiment of the present disclosure.

FIG. 15 is an illustration of various examples of managing a battery discharge rate by the battery extend unit 104, according to an embodiment of the present disclosure.

The battery extend unit 104 may be configured to monitor the battery usage, for example, when the battery extend unit 104 detects that the capacity of the battery is discharging faster as compared to the average/normal usage rate, then the battery extend unit 104 provides a notification of the current state of the battery (e.g., the battery is discharging at a high rate). The display 180 allows the user to access the notification panel and select (by way of an input 1502) the battery extend function directly from the notification panel.

In response to the input 1502, the display 180 navigates into the display screen where the battery extend unit 104 allows the user to enable (by way of an input) the battery extend function. Further, the battery extend unit 104 provides the plurality of battery extend levels to the user, wherein each battery extend level is configured to provide an estimated time period relative to a current state of the battery of the electronic device 1000.

The battery extend unit 104 allows the user to extend the battery life as needed.

Figure 16A:
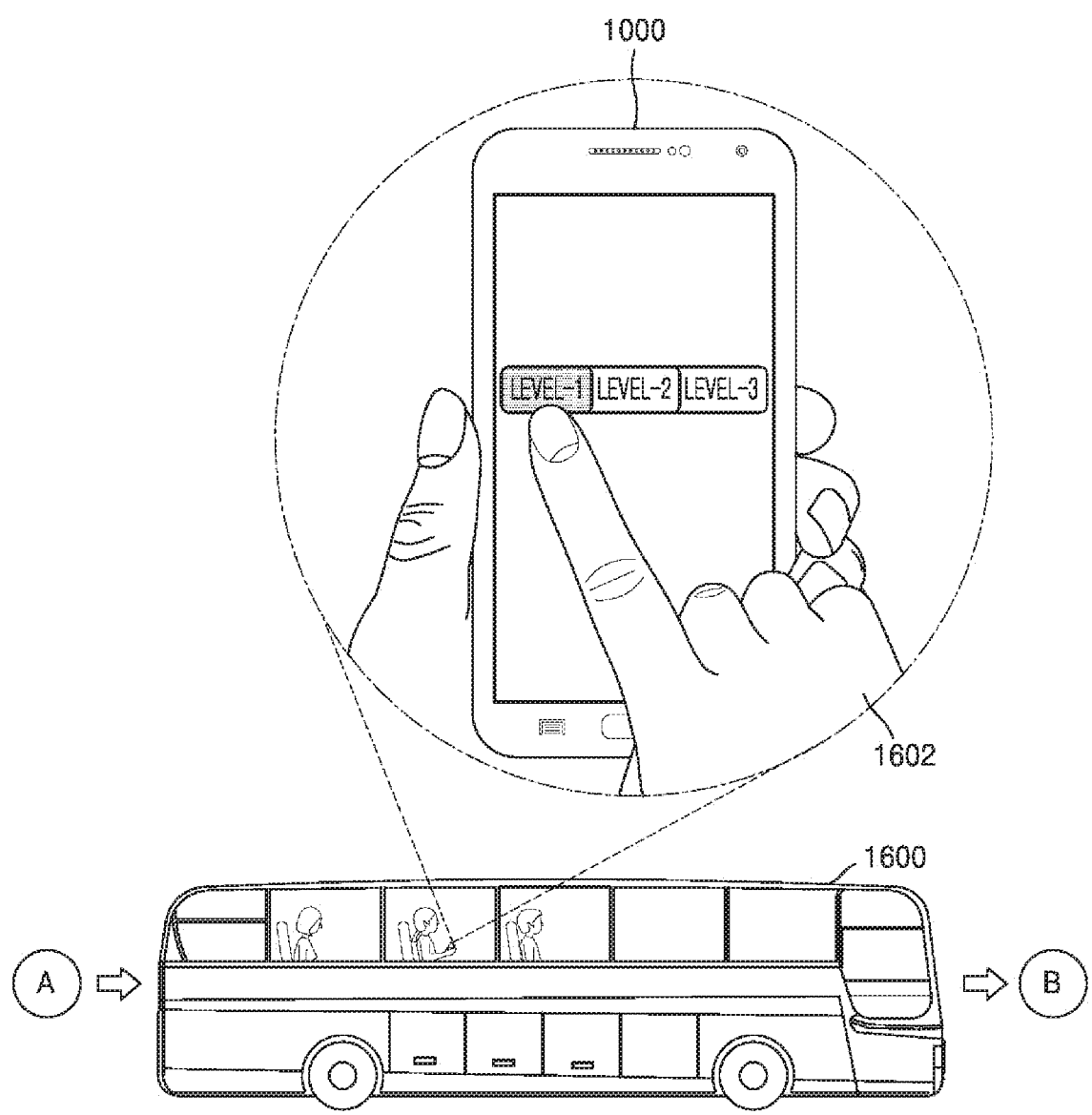
FIGS. 16A, 16B, and 16C are illustrations of an example in which a battery extend unit is configured to alter battery extend criteria (extend levels) based on a user context, according to an embodiment of the present disclosure.
Figure 16B:
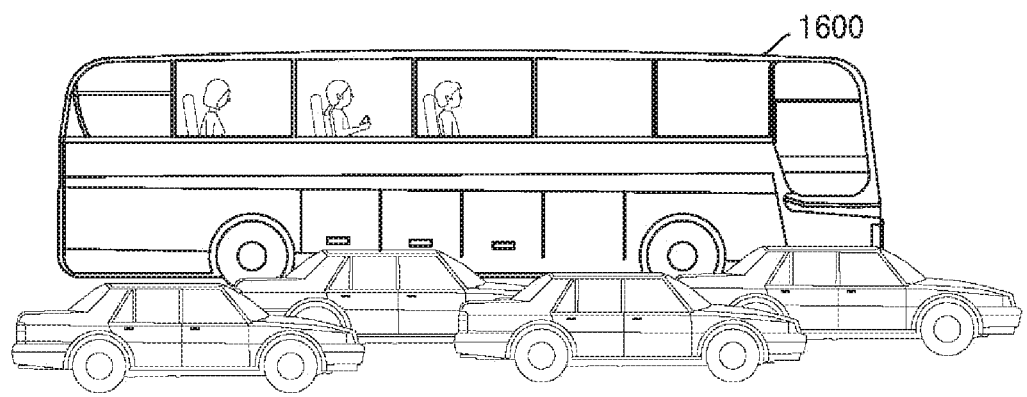
Figure 16C:
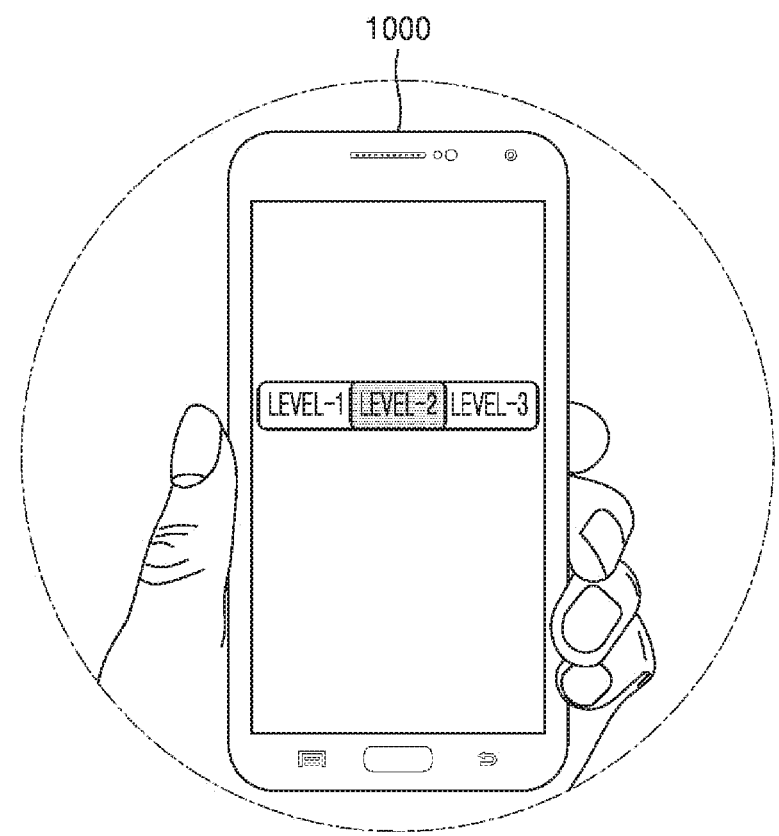

FIGS. 16A to 16C are illustrations of an example scenario in which a battery extend unit 104 is configured to alter a battery extend criterion (extend levels) based on a user context, according to an embodiment of the present disclosure.

Referring to FIG. 16A, the user may be travelling from a location A to a location B by, for example, a vehicle 1600, walking, a cycle, etc. A global positioning system (GPS) connected to the processor 140 may provide GPS coordinates (e.g., maps, routes) along with the estimated time of arrival (ETA) to location B, when the GPS is enabled based on the input provided by the user. Once the processor 140 provides the ETA, the battery extend unit 104 may allow the user to configure/set the battery extend criterion (e.g., Level-1 as illustrated in FIG. 16A) respectively. In an embodiment, the battery extend unit 104 may be configured to automatically adjust the battery extend criterion based on the ETA. Thus, the remaining battery capacity may be extended before placing the electronic device 1000/battery of the electronic device 1000 for charging through charger equipment. The display 180 may be configured to display the battery extend level wise indicator indicating the active battery extend level and remaining battery capacity quota present therein.

Referring to FIG. 16B, in conjunction with FIG. 15, the battery extend unit 104 may be configured to provide a notification to a user in response to determining a change in ETA due to certain obstacles/uncertainties (e.g., traffic conditions, road under construction, etc.) during a journey of the user to location B. The notification such as, for example, a change in the ETA, accordingly sets/alters the battery extend criterion.

Referring to FIG. 16C, in conjunction with FIG. 16B, upon receiving the notification, the battery extend unit 104 may allow the user to increase the battery extend criterion (from Level-1 to Level-2). In an embodiment, the battery extend unit 104 may be configured to automatically (e.g., dynamically) increase the battery extend criterion (e.g., from Level-1 to Level-2).

The proposed battery extend unit 104 may dynamically extend the battery usage based on the ETA determined (at each interval) by the GPS.

Figure 17:
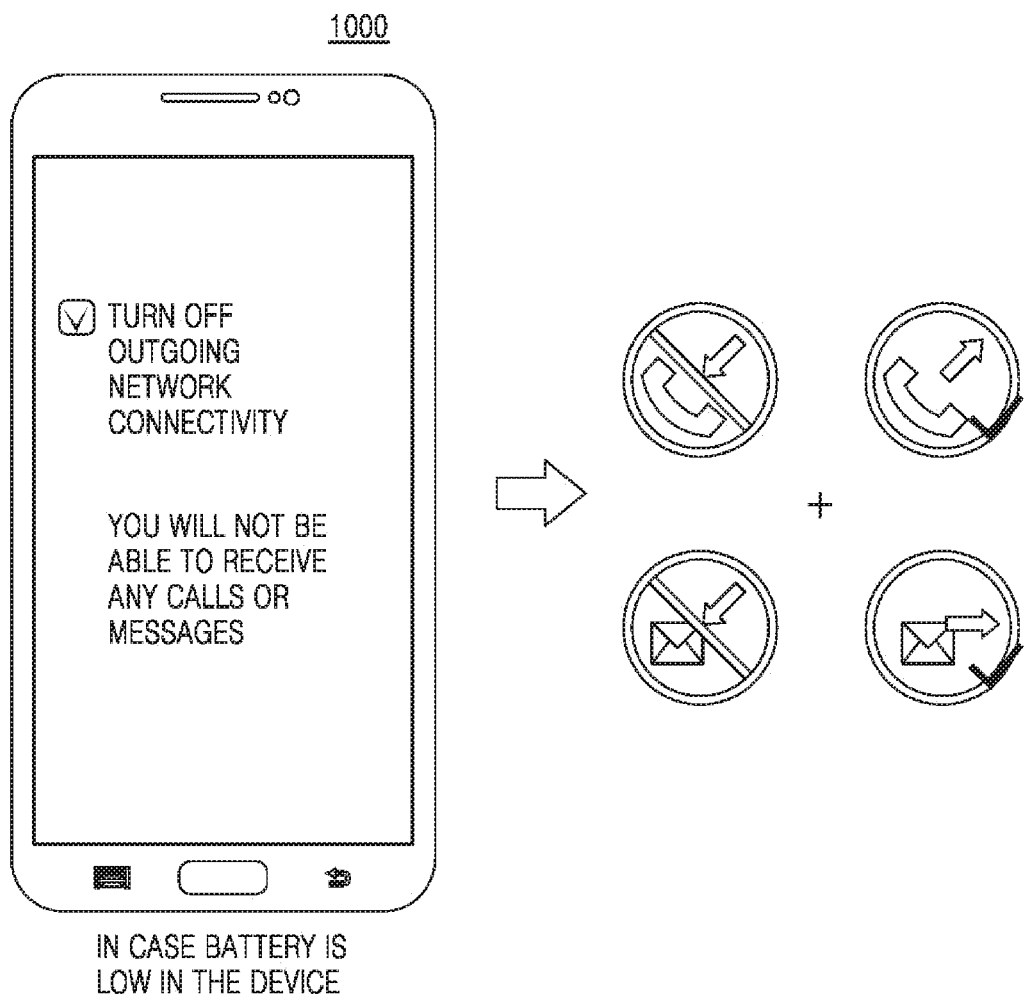
FIG. 17 is an illustrations of a graphical element in which a battery extend unit enables/disables one or more services of one or more applications based on a battery extend criterion, according to an embodiment of the present disclosure.

FIG. 17 is an illustration of a graphical element in which the battery extend unit 104 is configured to enable/disable one or more services of one or more applications based on a battery extend criterion, according to an embodiment of the present disclosure.

Referring to FIG. 17, the battery extend unit 104 allows a user to limit network connectivity to only outgoing, e.g., stop incoming network connectivity, when the battery extend criterion is met (e.g., battery extend set at Level-3). During travel or in remote locations, when the electronic device 1000 is constantly searching for a network, the battery capacity drains. When the battery extend unit 104 detects that the battery extend criterion is met, then the battery extend unit 104 may allow the user to stop incoming network connectivity (thus, saving the battery by avoiding any incoming messages, content, calls, etc.). The outgoing network will be available on demand, when a user places a call or sends a message.

Figure 18:
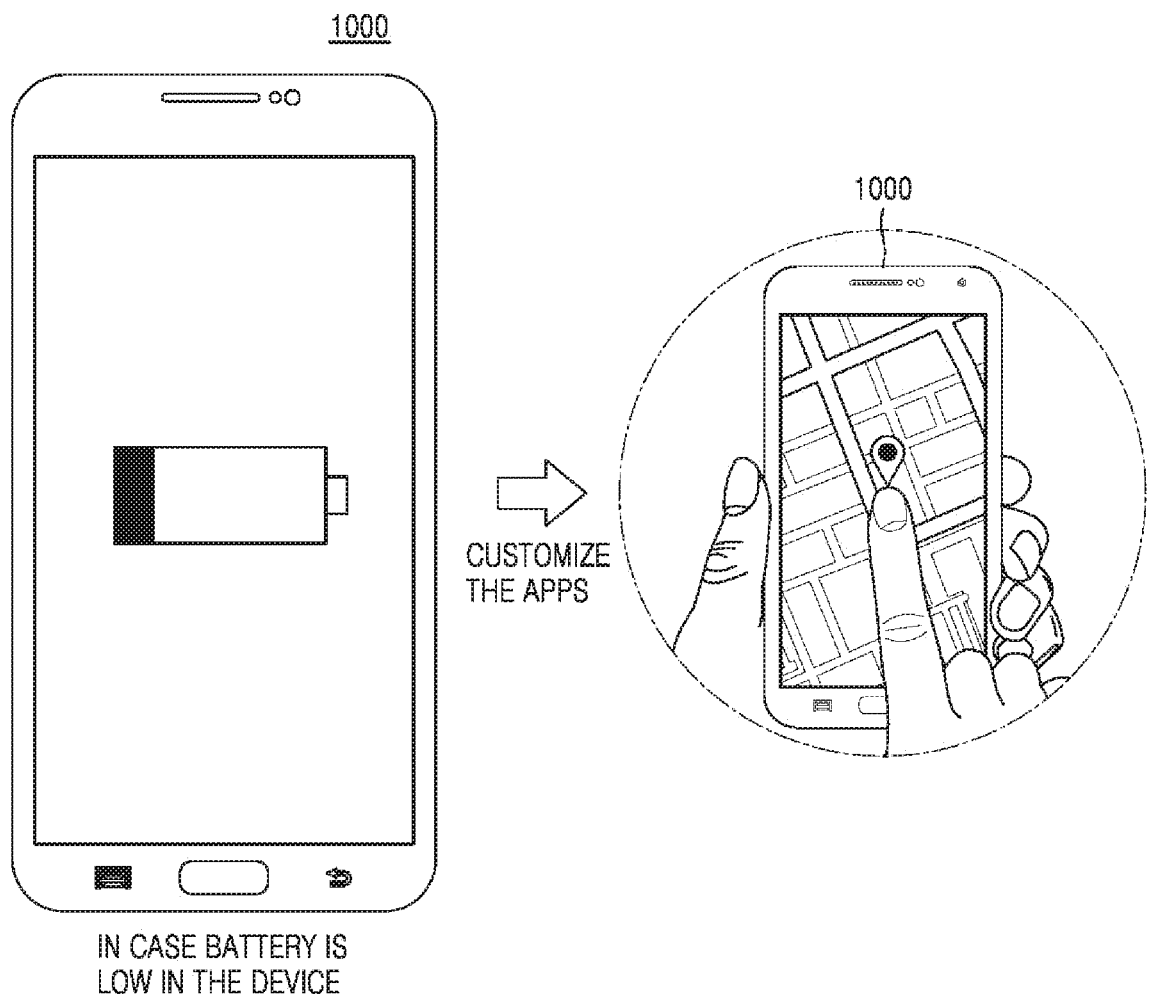
FIG. 18 is an illustrations of a graphical element in which a battery extend unit allows a user to manage priority applications based on a battery extend criterion, according to an embodiment of the present disclosure.

FIG. 18 is an illustration of a graphical element in which the battery extend unit 104 allows a user to manage priority applications based on a battery extend criterion, according to an embodiment of the present disclosure.

Referring to FIG. 18, if the user of the electronic device 1000 is travelling and battery level is low, the battery extend unit 104, which may be monitoring the state of the battery, may allow the user to customize the running apps (e.g., change to grey scale mode, reduce display color density, etc.) while the rest of the apps may automatically be terminated by the battery extend unit 104 except the priority applications. The priority applications may be configured by the user of the electronic device. In an embodiment, the battery extend unit 104 may automatically select the priority applications to operate during this mode based on various parameters such as, for example, content (e.g., an online transaction is ongoing, GPS navigation is ongoing, and the like) of the electronic device 1000, context (e.g., a frequently accessed application when at location B) of the electronic device 1000, battery usage pattern, etc.

In a critical battery, the battery extend unit 104 may allow the user of the electronic device 1000 to select to run only background data/programs for one selected application to save battery and extend the time duration. Thus, other background data/apps/services will halt/become passive/sleep/be killed, etc., if a user is travelling back home at night and wants only maps to run (battery used only for one user selected app) in such an optimized way.

Figure 19:
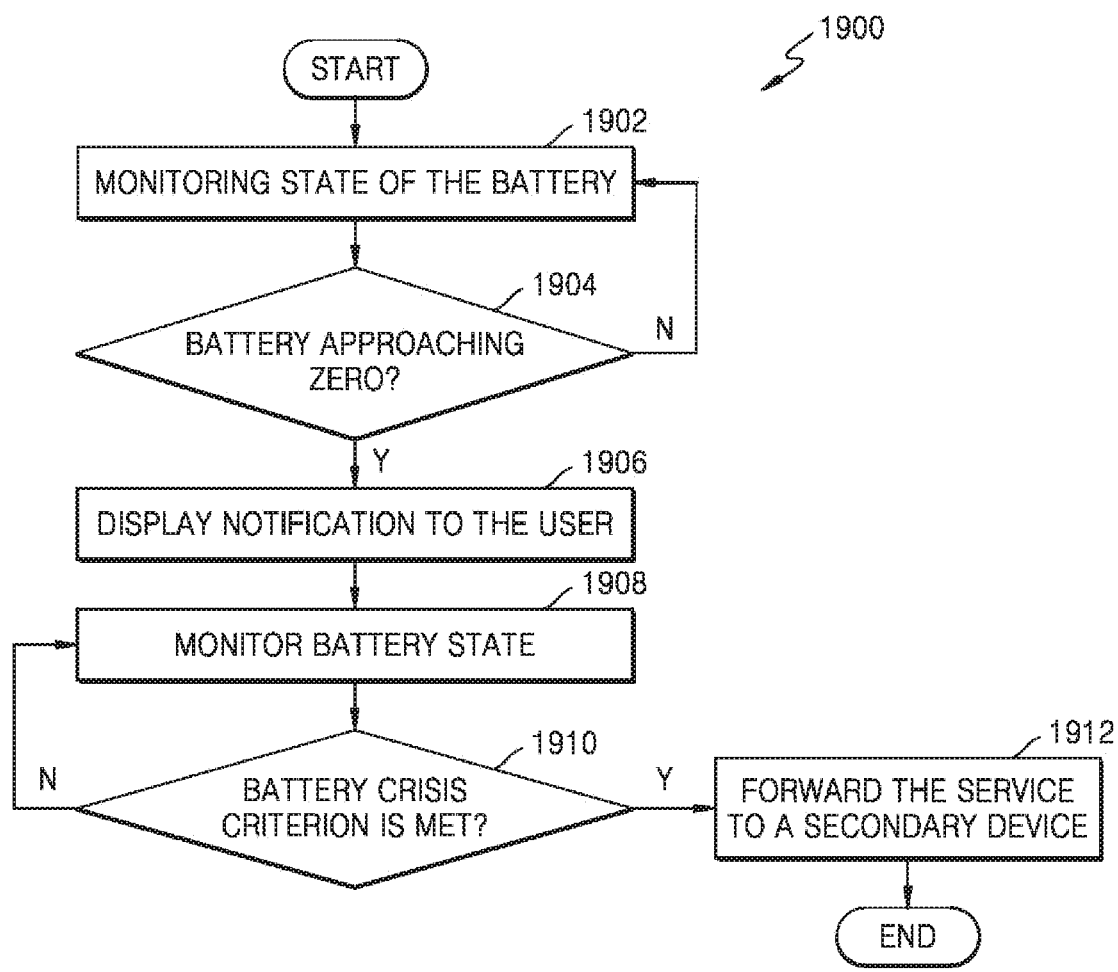
FIG. 19 is a flowchart of a method of a battery crisis unit, according to an embodiment of the present disclosure.

Battery Crisis Scenarios:

FIG. 19 is a flowchart 1900 of a method performed by the battery crisis unit 106, according to an embodiment of the present disclosure.

Referring to FIG. 19, in step 1902, the battery crisis unit 106 may be configured to monitor a state of the battery (e.g., remaining battery capacity (mAh), a battery reserve criterion, etc.). In step 1904, the battery crisis unit 106 may be configured to detect whether the remaining battery capacity has reached a low threshold criterion (e.g., 15%, approaching zero). In step 1906, the battery crisis unit 106 may be configured to provide a notification (e.g., a notification panel, a lock screen, or any portion of the display screen) to the user to set up zero mode call forwarding, in response to detecting, by the battery crisis unit 106, that the remaining battery capacity has reached the low threshold criterion (e.g., 15%).

If in step 1904, the battery crisis unit 106 detects that the remaining battery capacity has not reached the low threshold criterion, then the battery crisis unit 106 loops back to perform step 1902.

In step 1908, the battery crisis unit 106 is configured to monitor the state of the battery. In step 1910, the battery crisis unit 106 may be configured to determine whether the battery crisis criterion (e.g., 5%) is met. If, in step 1910, the battery crisis unit 106 determines that the battery crisis criterion is met, then the battery crisis unit 106 provides a zero mode user notification to set-up forwarding of the services (e.g., a call, messages, etc.), allowing the user to input the data item (e.g., a contact number associated/not associated with the electronic device 1000) if the user has not pre-configured, or else show the contact number to whom the services will be forwarded.

In an embodiment, the battery crisis unit 106 automatically enables the forwarding of the service, when the remaining battery capacity is at 5%, based on the configuration set by the user.

If, in step 1910, the battery crisis unit 106 determines that the battery crisis criterion is not met, then the battery crisis unit 106 loops back to perform step 1908.

In step 1912, the battery crisis unit 106 may be configured to forward the services to the data item. When the service forwarding contact is set up, the battery crisis unit 106 allows the user to provide an option to receive an auto short message service (auto-SMS) indicating the call forwarding activation to the data item. Further, for example, the service such as call forwarding may depend on an operator and balance conditions. The battery crisis unit 106 may enable the electronic device to perform the forwarding action and a secondary device other that the electronic device would receive a call or text message forwarded from the electronic device.

Figure 20A:
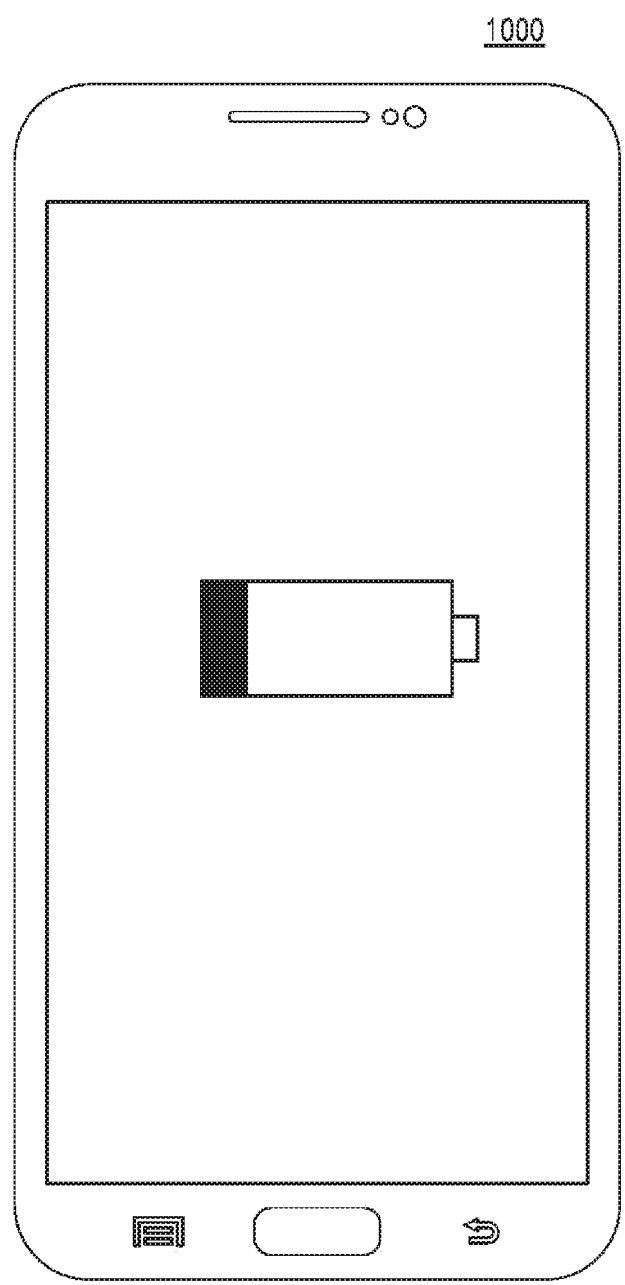
FIGS. 20A, 20B, and 20C are illustrations of a graphical element in which a battery crisis unit allows a user to enable a battery crisis function, according to an embodiment of the present disclosure.
Figure 20B:
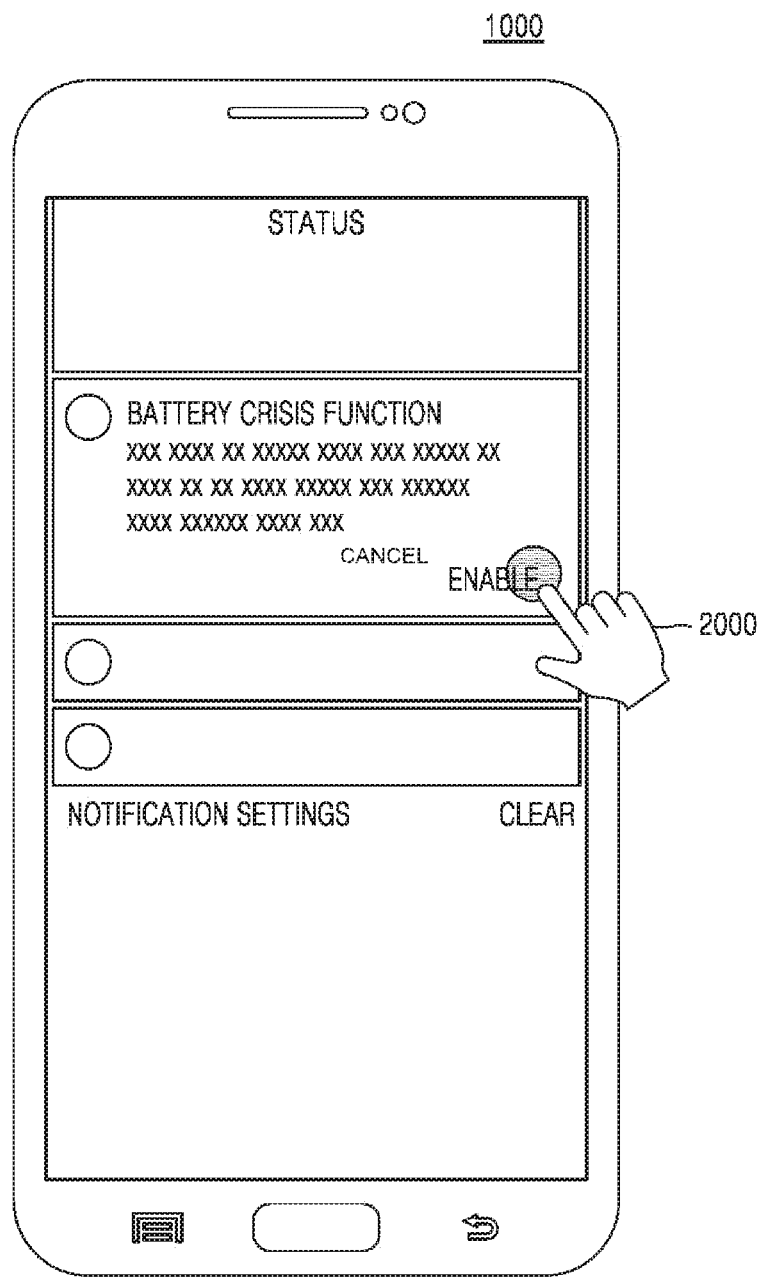
Figure 20C:
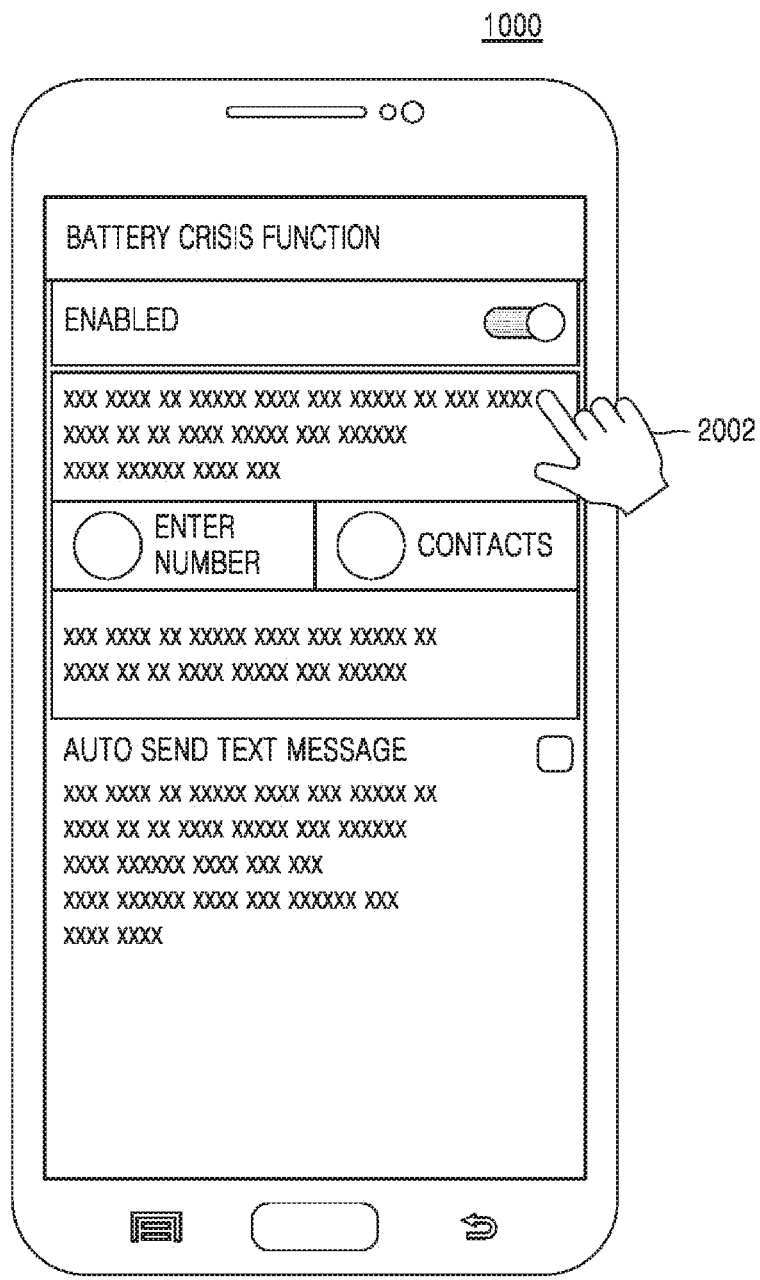

FIGS. 20A to 20C are illustrations of a graphical element in which the battery crisis unit 106 allows a user to enable a battery crisis function, according to an embodiment of the present disclosure.

Referring to FIGS. 20A to 20C, the user of the electronic device 1000 may enable the power planning mode from the notification panel of the electronic device 1000 by performing various gestures (e.g., a touch, a scroll, a swipe, etc.). If the user enables the power planning mode (for the first time), the power planning unit 110, connected to the display 180, navigates the user to the various power planning functions of the power planning mode.

If the battery crisis unit 106, which may be monitoring the state of the battery, detects that the battery of the electronic device 1000 is running out (approaching a zero level) (as illustrated in FIG. 20A), then the battery crisis unit 106 may switch the display screen illustrating a UI of the battery crisis function of the power planning mode (as illustrated in FIG. 20B). The battery crisis unit 106 allows the user to select (by way of an input 2000) the battery crisis function in which the services will be forwarded to the data item (provided) when the battery is completely exhausted (e.g., when the electronic device 1000 is switched off).

Referring to FIG. 20C, once the battery crisis function is enabled (by way of an input 2002) the battery crisis unit 106 may provide an option to the user to edit the data item, choose the data item from contact lists of the electronic device 1000, etc.

Figure 21A:
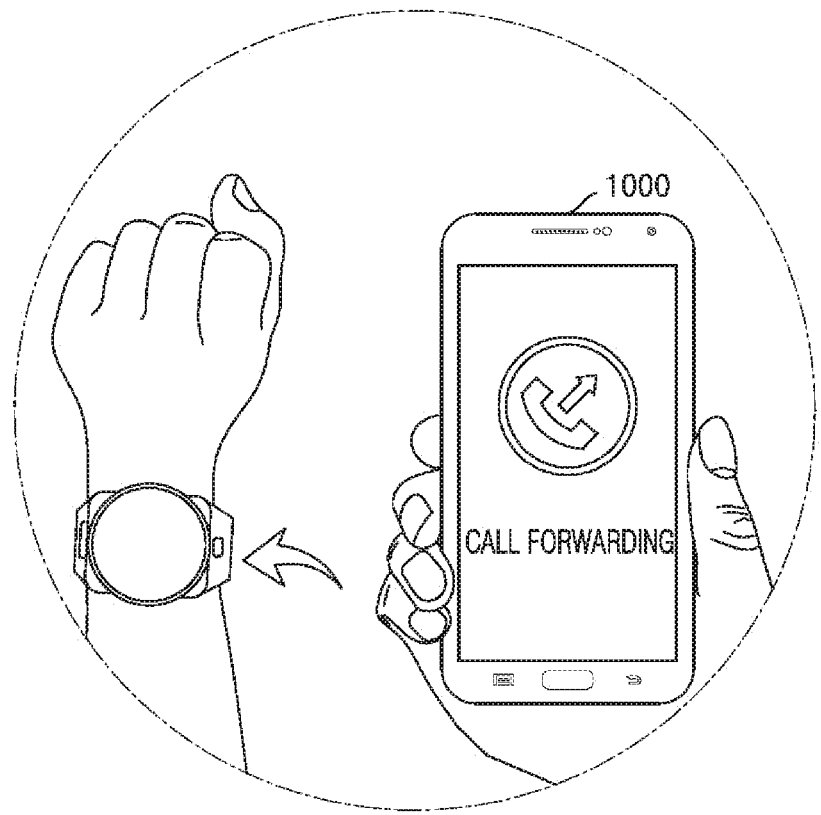
FIGS. 21A, 21B, and 21C are illustrations of various graphical elements of an electronic device and secondary electronic device configured to manage a call forwarding service, according to an embodiment of the present disclosure.
Figure 21B:
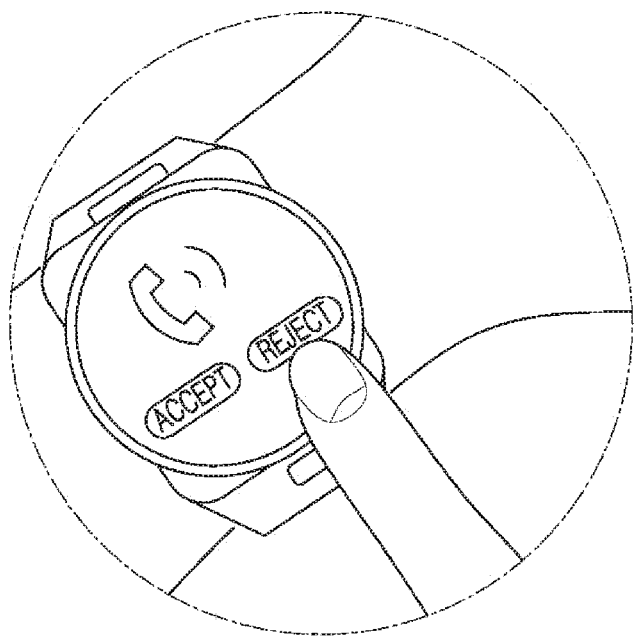
Figure 21C:
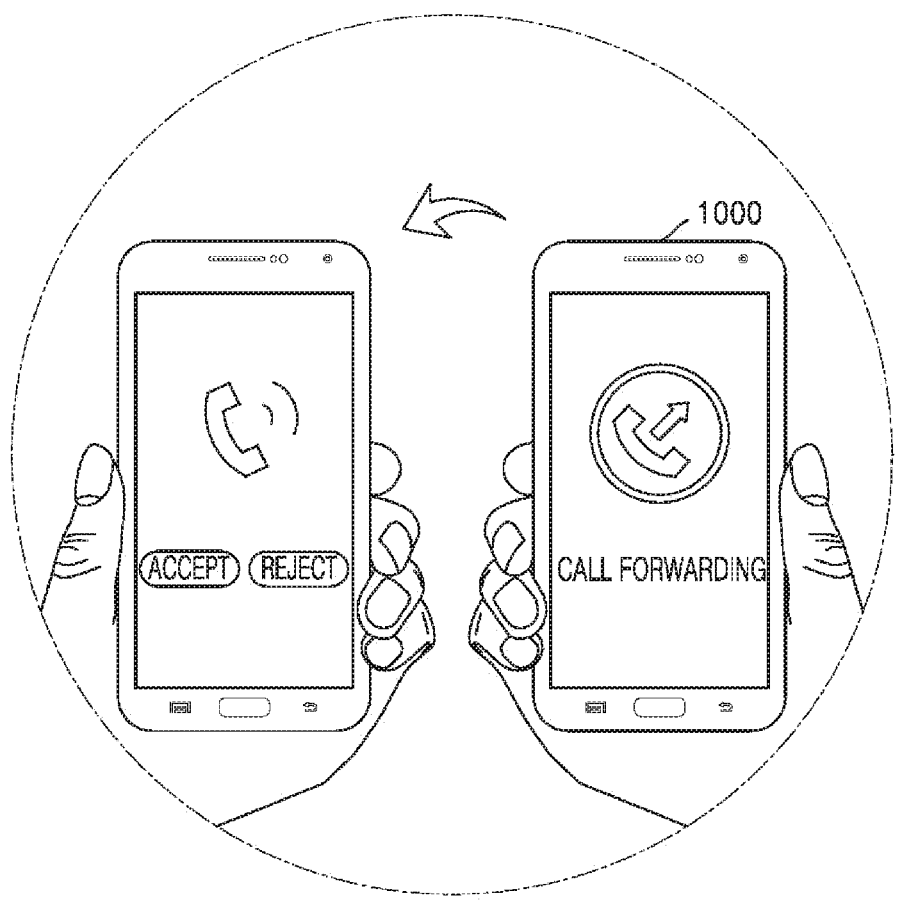

FIGS. 21A to 21C are illustrations of various graphical elements of the electronic device 1000 and a secondary electronic device configured to manage a call forwarding service, according to an embodiment of the present disclosure.

Referring to FIGS. 21A to 21C, when the battery crisis unit 106 enables the battery crisis function in response to detecting that the battery crisis criterion is met, the battery crisis unit 106 automatically starts looking for the secondary electronic device and seeks permission to pair for call forwarding. The battery crisis unit 106, at Level-1, may be configured to search for the secondary electronic device which is paired (primary connected) to the electronic device 1000, for example, a wearable device, IoT devices, etc. In an embodiment, the primary connected devices are authenticated electronic devices. Further, at Level-2, the battery crisis unit 106 may be configured to search for the secondary devices belonging to the other users (e.g., friends, family members) by exploring the paired history. Furthermore, at Level-3, the battery crisis unit 106 may be configured to search for the secondary electronic device (e.g., a landline) by exploring the paired history.

If none of the above battery crisis criteria (e.g., Level-1, Level-2, and Level-3, other personal devices and known people around) are met, the battery crisis unit 106 may still forward an urgent call by sharing a contact number (landline/mobile) of an unknown user on his/her prior approval, for example, when shopping alone in a crowded mall where the user may receive a call on a shop owner's landline or on a fellow shopper's mobile phone.

Referring to FIG. 21A, the battery crisis unit 106 allows the user to perform an action (input to forward) for a call forward request to the secondary electronic device at Level 1.

Further, if the secondary electronic device denies the call forwarding request (as illustrated in FIG. 21B), the battery crisis unit 106 may be configured to receive the response request from the secondary electronic device (as illustrated in FIG. 21C).

Figure 22A:
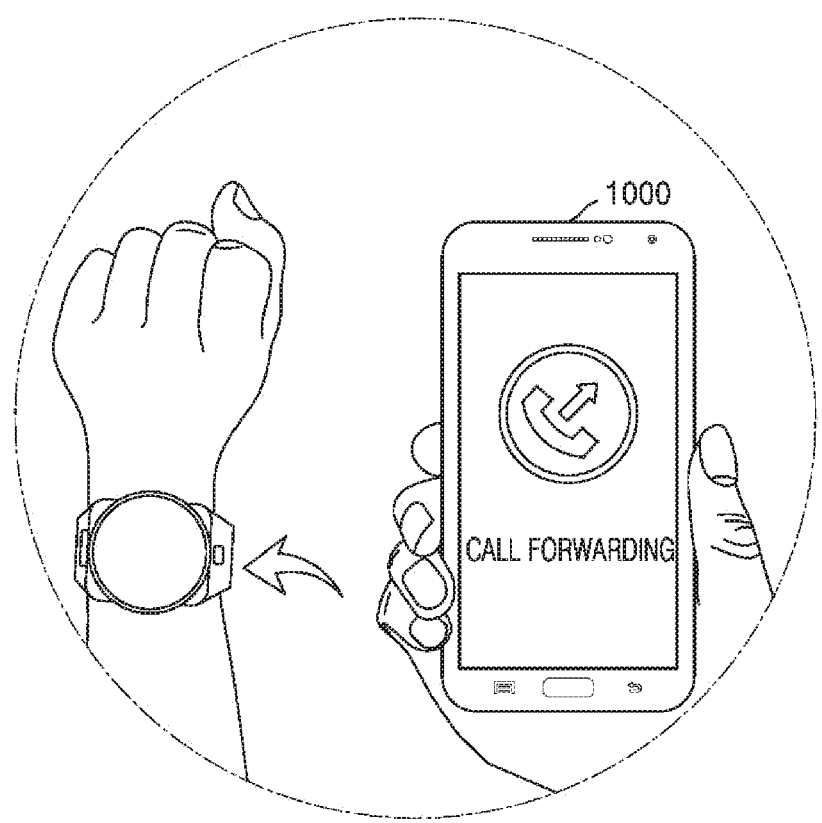
FIGS. 22A, 22B, and 22C illustrate an example in which a battery crisis unit is configured to provide call forwarding services to a secondary electronic device, according to an embodiment of the present disclosure.
Figure 22B:
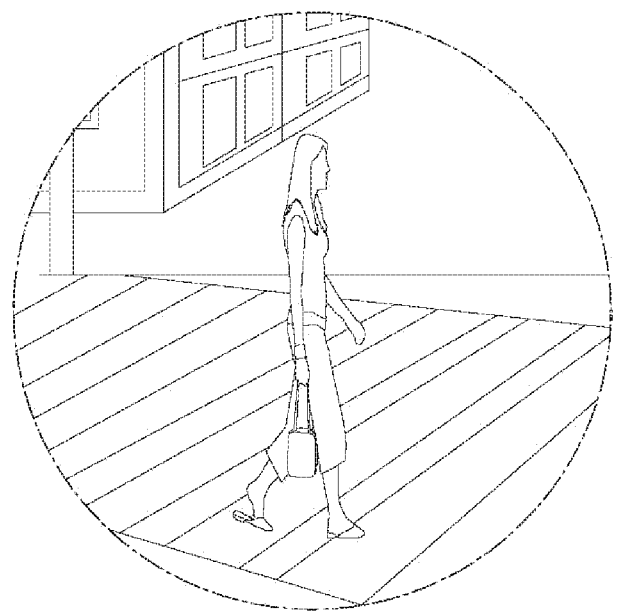
Figure 22C:

FIGS. 22A to 22C are illustrations of an example scenario in which the battery crisis unit 106 is configured to provide call forwarding services to a secondary electronic device, according to an embodiment of the present disclosure.

Referring to FIGS. 22A-22C, the battery crisis unit 106 may be configured to automatically transfer a forward call to a last paired wearable device (e.g., a smart watch) (as illustrated in FIG. 22A) when the electronic device 1000 switches-off due to loss of power (battery). For example, when a user is carrying the electronic device 1000 in a pocket (as illustrated in FIG. 22B) and the electronic device 1000 gets switched-off due to zero battery/loss of power, then the battery crisis unit 106 may be configured to check if it is paired with the wearable device. When the battery crisis unit 106 detects the connected wearable device, all incoming calls may be automatically forwarded to the wearable device (as illustrated in FIG. 22C).

Figure 23:
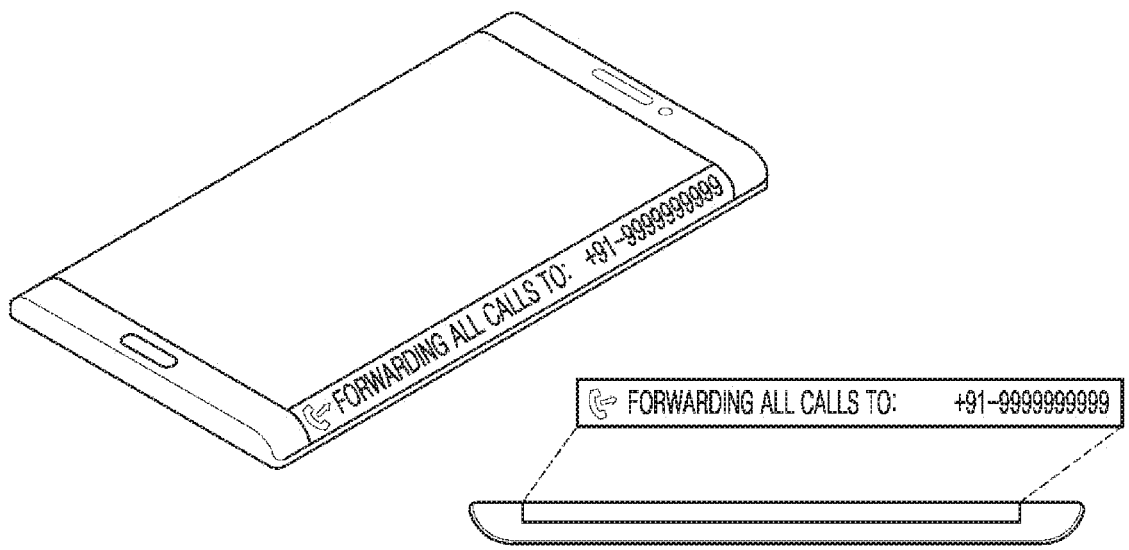
FIG. 23 is an illustration of an example in which a battery crisis unit is configured to provide a call forwarding notification to an edge screen display, according to an embodiment of the present disclosure.

FIG. 23 is an illustration of an example in which the battery crisis unit 106 is configured to provide a call forwarding notification to an edge screen display of an electronic device, according to an embodiment of the present disclosure.

Referring to FIG. 23, the battery crisis unit 106 may be configured to provide details of call forwarding services to the edge screen (bendable/edge screen devices) in order to save the display portion of a main screen. The details include the contact number/contact name with respect to whom the call forwarding is set-up. For example, when the electronic device 1000 is switched off due to zero battery/loss of power and calls are forwarded to a secondary device/remote device, call forwarding information is displayed on an edge screen of the electronic device 1000.

Figure 24:
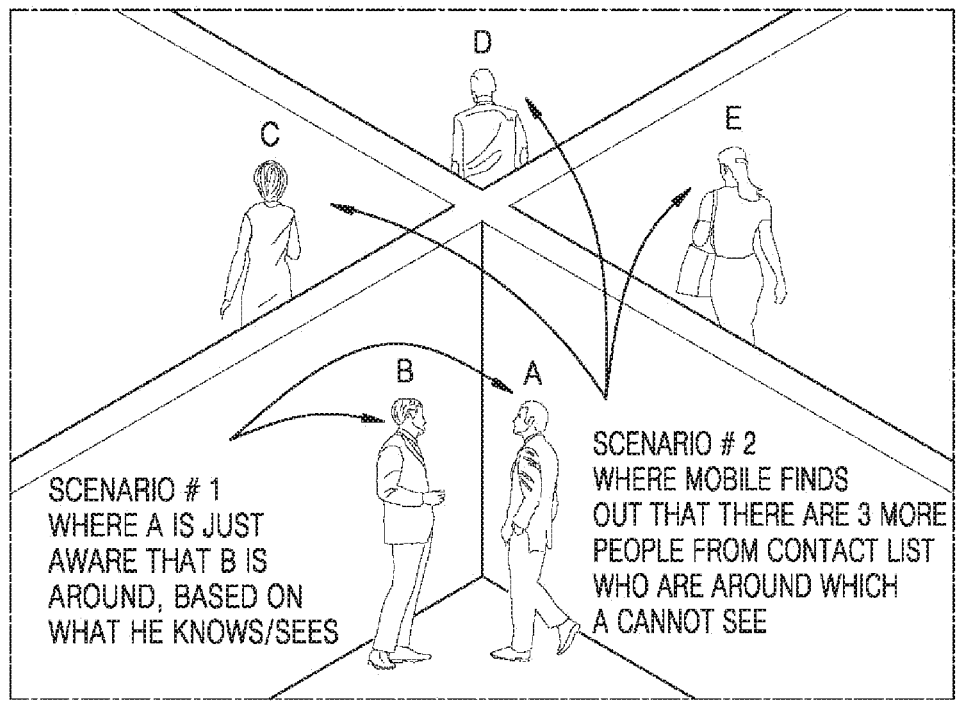
FIG. 24 is an illustrations of an example in which a battery crisis unit forwards a call to nearby secondary electronic devices, according to an embodiment of the present disclosure.

FIG. 24 is an illustration of an example in which the battery crisis unit 106 forwards a call to nearby secondary electronic devices, according to an embodiment of the present disclosure.

Referring to FIG. 24, in scenario 1, User A (with a depleting battery) may be aware of another acquaintance B's presence in the vicinity and asks for B's help in receiving his/her forwarded call. Further, in scenario 2, User A (with a depleted battery) may not be aware of another known people (such as, C, D and E) who may also be present nearby and may support in receiving the forwarded call. In such a scenario, the battery crisis unit 106 may be configured to first determine A's location and, on that basis, scans his/her contact list to plot who on the list are present in the vicinity and later proposes their names for call forwarding.

In an embodiment of scenario-1, User A (with the depleted battery) may be aware of another acquaintance B's presence in the vicinity and asks for B's help in receiving his/her forwarded call without using the service provider's network but with an established local connection that is free of any call forwarding charges. The electronic device 1000 (with depleting battery capacity) remains in a sleep mode and uses a local established connection for forwarding the call.

Figure 25:
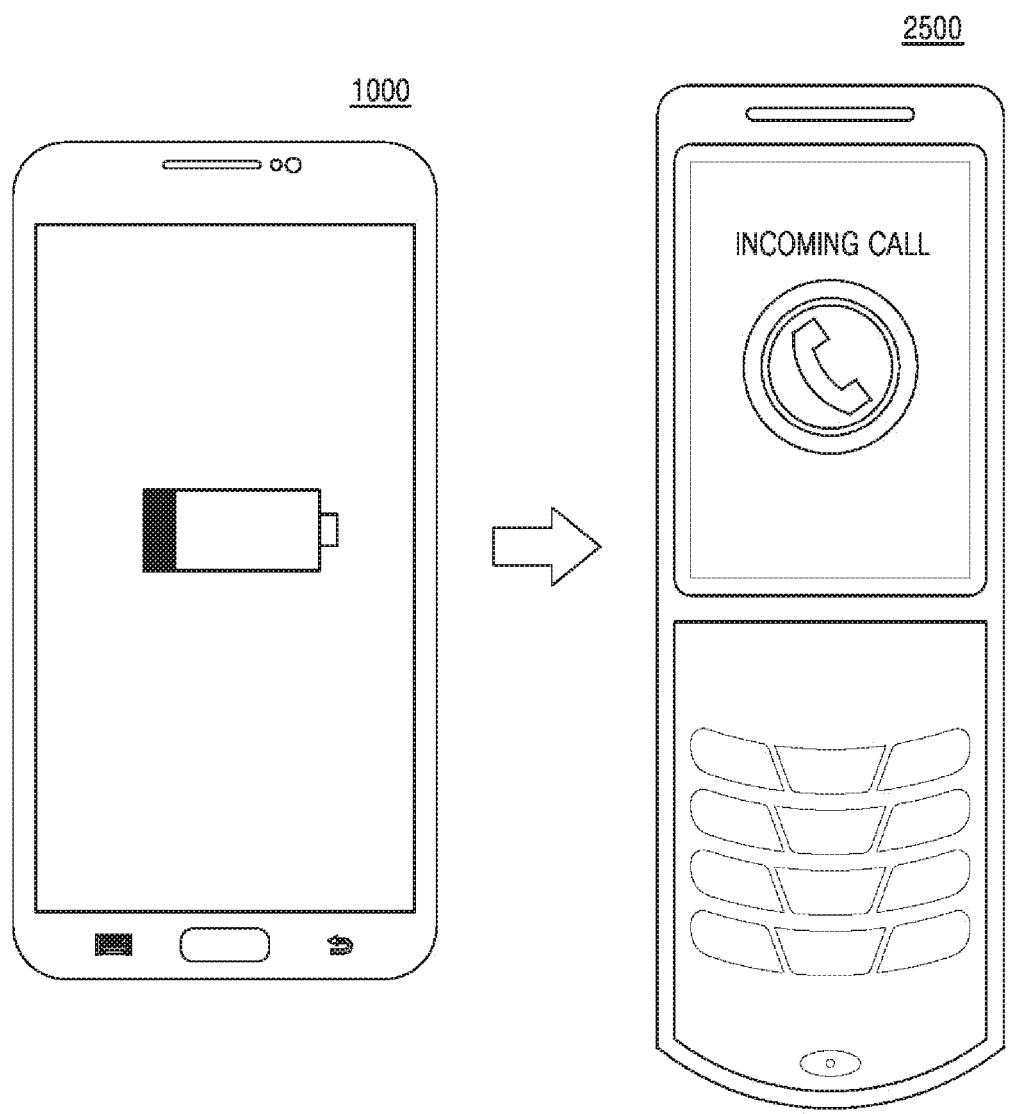
FIG. 25 is an illustration of various graphical elements in which a battery crisis unit forwards a call to an associated feature phone, according to an embodiment of the present disclosure.

FIG. 25 is an illustration of various graphical elements in which the battery crisis unit 106 forwards a call to an associated feature phone 2500, according to an embodiment of the present disclosure.

When the battery crisis unit 106 of an electronic device 1000 detects a low battery event (e.g., a battery management event), the battery crisis unit 106 may be configured to have a function of transferring all calls and messages to the feature phone 2500. Further, the battery crisis unit 106 may be configured to split the function between the electronic device 1000 and the feature phone 2500. Thus, the battery capacity of the feature phone 2500 may be utilized to receive the calls and messages of the user associated with the electronic device 1000, and the electronic device 1000 may be utilized for operating other applications.

Figure 26:
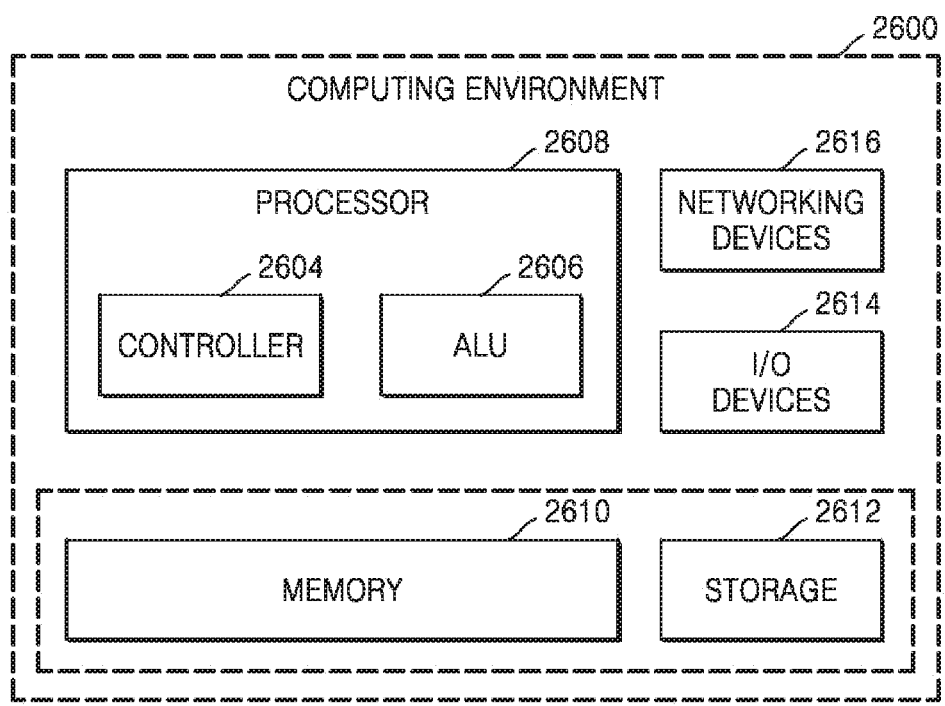
FIG. 26 is a block diagram of a computing environment implementing a method and electronic device thereof for managing battery usage, according to an embodiment of the present disclosure.

FIG. 26 is a block diagram of a computing environment 2600 implementing a method and an electronic device thereof for managing battery usage, according to an embodiment of the present disclosure.

Referring to FIG. 26, the computing environment 2600 includes at least one processor 2608 that is equipped with a controller 2604 and an arithmetic logic unit (ALU) 2606, a memory 2610, a storage device 2612, a plurality of networking devices 2616 and a plurality of input/output (I/O) devices 2614. The at least one processor 2608 is responsible for processing the instructions to perform the method. The at least one processor 2608 receives commands from a control unit in order to perform its processing. Further, any logical and arithmetic operations involved in the execution of the instructions are computed with the help of the ALU 2606.

The overall computing environment 2600 may be composed of multiple homogeneous and/or heterogeneous cores, multiple CPUs of different kinds, special media and other accelerators. The at least one processor 2608 is responsible for processing the instructions of the method. Further, the at least one processor 2608 may be located on a single integrated circuit (IC) or over multiple ICs.

The instructions and code required for an implementation may be stored in either the memory 2610, the storage device 2612, or both. At the time of execution, the instructions may be fetched from the corresponding memory 2610 or storage device 2612, and executed by the at least one processor 2608.

In the case of a hardware implementation, various networking devices 2616 or external I/O devices 2614 may be connected to the computing environment 2600 to support the implementation through a networking unit and the I/O devices 2614.

The embodiments disclosed herein may be implemented through at least one software program running on at least one hardware device and performing network management functions to control the elements. The elements shown in FIGS. 1 through 26 include blocks which may be at least one of a hardware device, or a combination of a hardware device and a software module.

Certain aspects of the present disclosure may also be embodied as computer-readable code on a non-transitory computer readable recording medium. A non-transitory computer readable recording medium is any data storage device that may store data which may be thereafter read by a computer system. Examples of a non-transitory computer-readable recording medium include a ROM, a RAM, CD-ROMs, magnetic tapes, floppy disks, and optical data storage devices. The non-transitory computer-readable recording medium may also be distributed over network-coupled computer systems so that the computer-readable code is stored and executed in a distributed fashion. In addition, functional programs, code, and code segments for accomplishing the present disclosure may be easily construed by programmers of ordinary skill in the art to which the present disclosure pertains.

The foregoing description of embodiments may so fully reveal the general nature of the embodiments herein that others may, by applying current knowledge, readily modify or adapt for various applications such embodiments without departing from the scope of the present disclosure, and, therefore, such adaptations and modifications are intended to be within the scope of the present disclosure.

It is to be understood that the terminology employed herein is for the purpose of description and not of limitation. Therefore, while the embodiments herein have been described in terms of preferred embodiments, those of ordinary skill in the art will recognize that the embodiments herein may be practiced with modifications within the scope of the present disclosure as defined by the appended claims and their equivalents.

What is claimed is:

1. A method of battery management of an electronic device, the method comprising:
  detecting, by the electronic device, that a battery management criterion is met by detecting that a battery discharging rate is higher than a predetermined rate;
  displaying, in response to the detecting of the battery discharging rate being higher than the predetermined rate, a notification panel comprising a current state of the battery representing a battery discharging rate and a plurality of battery extend levels each of which displays a corresponding estimated battery time duration;

obtaining a user selection of at least one battery extend level among the plurality of battery extend levels;

enabling at least one of a plurality of battery management functions, in response to the user selection of the at least one battery extend level; and performing at least one action corresponding to the enabled at least one of the plurality of the battery management functions, wherein performing the at least one action comprises detecting a user input of selecting a portion to be activated among an entire display area on the display and, in response to the user input of selecting the portion among the entire display area, deactivating an unselected portion among the entire display area, and wherein an entire area of the activated portion of the display is rectangular and is smaller than a size of the display.

2. The method of claim 1, wherein the plurality of the battery management functions comprise a battery reserve function, a battery extend function, and a battery crisis function.

3. The method of claim 2, wherein the battery extend function provides the plurality of battery extend levels, wherein the estimated battery time duration of each of the plurality of the battery extend levels is estimated based on at least one of an estimated time it takes to travel between a predetermined starting location of a user of the electronic device and a predetermined arriving location of the user of the electronic device, a context of the user of the electronic device, content displayed on the electronic device, a context of the electronic device, a device usage pattern, and the current state of the battery of the electronic device.

4. The method of claim 2, wherein the battery crisis function enables the electronic device to perform an action for forwarding a service associated with at least one data item of the electronic device to a secondary electronic device.

5. The method of claim 4, wherein the service comprises at least one of an incoming call and an incoming text message and the second electronic device is either paired with the electronic device or unpaired with the electronic device but pre-configured with a contact number associated with the second electronic device.

6. The method of claim 1, wherein the battery management criterion further comprises one of a battery reserve criterion, and a battery crisis criterion, wherein the battery reserve criterion comprises a battery level selected by a user of the electronic device to be reserved to perform the at least one action, and the battery crisis criterion comprises one of a completely discharged battery and a predetermined low level battery.

7. The method of claim 1, further comprising controlling to display an indication on a screen of the electronic device indicating a state of the enabled at least one of the plurality of the battery management functions.

8. The method of claim 1, wherein the battery management criterion comprises:

displaying at least one battery management function from among the plurality of battery management functions on a screen of the electronic device, wherein each of the at least one battery management function is displayed as at least one graphical element used to configure the battery management criterion; and configuring the battery management criterion based on an input performed on the at least one graphical element displayed on the screen of the electronic device.

9. The method of claim 1, wherein the battery management criterion being met further comprises that the battery management event occurs, and further comprising:

displaying at least one graphical element associated with at least one of the plurality of the battery management functions;

applying the battery management criterion to perform the at least one of the plurality of the battery management functions based on the at least one action.

10. An electronic device with a battery management function, the electronic device comprising:

a display; and a processor configured to:

detect that a battery management criterion is met by detecting that a battery discharging rate is higher than a predetermined rate;

control the display to display, in response to the detecting of the battery discharging rate being higher than the predetermined rate, a notification panel comprising a current state of the battery representing a battery discharging rate and a plurality of battery extend levels each of which displays a corresponding estimated battery time duration;

obtain a user selection of at least one battery extend level among the plurality of battery extend levels;

enable at least one of a plurality of battery management functions, in response to the user selection of the at least one battery extend level; and perform at least one action corresponding to the enabled at least one of the plurality of the battery management functions, wherein performing the at least one action comprises detecting a user input of selecting a portion to be activated among an entire display area of the display and, in response to the user input of selecting the portion among the entire display area, deactivating an unselected portion among the entire display area, and wherein an entire area of the activated portion of the display is rectangular and is smaller than a size of the display.

11. The electronic device of claim 10, wherein the plurality of the battery management functions comprises a battery reserve function, a battery extend function, and a battery crisis function.

12. The electronic device of claim 11, wherein, based on the battery extend function, the processor is further configured to provide the plurality of battery extend levels, wherein the estimated battery time duration of each of the plurality of the battery extend levels is estimated based on at least one of an estimated time it takes to travel between a predetermined starting location of a user of the electronic device and a predetermined arriving location of the user of the electronic device, a context of the user of the electronic device, content displayed on the electronic device, a context of the electronic device, a device usage pattern, and the current state of a battery of the electronic device.

13. The electronic device of claim 11, wherein, based on the battery crisis function, the processor is further configured to perform an action for forwarding a service associated with at least one data item of the electronic device to a secondary electronic device.

14. The electronic device of claim 13, wherein the service comprises at least one of an incoming call or an incoming text message and the second electronic device is either paired with the electronic device or unpaired with the electronic device but pre-configured with a contact number associated with the second device.

15. The electronic device of claim 10, wherein the battery management criterion further comprises one of a battery reserve criterion, and a battery crisis criterion, wherein the battery reserve criterion comprises a battery level selected by a user of the electronic device to be reserved to perform the at least one action, and the battery crisis criterion comprises one of a completely discharged battery and a predetermined low level battery.

16. The electronic device of claim 10, wherein the processor is further configured to control displaying an indication on a screen of the electronic device indicating a state of the enabled at least one of the plurality of the battery management functions.

17. The electronic device of claim 10, wherein the processor is further configured to define the battery management criterion and control to:
- display at least one battery management function from among the plurality of battery management functions on a screen of the electronic device, wherein each of the at least one battery management function is controlled to be displayed as at least one graphical element used to configure the battery management criterion; and
- configure the battery management criterion based on an input performed on the at least one graphical element displayed on the screen of the electronic device.

18. A non-transitory computer readable recording medium having recorded thereon a program for executing a method for battery management of an electronic device, the method comprising:

- detecting, by the electronic device, that a battery management criterion is met by detecting that a battery discharging rate is higher than a predetermined rate;
- displaying, in response to the detecting of the battery discharging rate being higher than the predetermined rate, a notification panel comprising a current state of the battery representing a battery discharging rate and a plurality of battery extend levels each of which displays a corresponding estimated battery time duration;
- obtaining a user selection of at least one battery extend level among the plurality of battery extend levels;
- enabling at least one of a plurality of battery management functions, in response to the user selection of the at least one battery extend level; and
- performing at least one action corresponding to the enabled at least one of the plurality of the battery management functions,
- wherein performing the at least one action comprises detecting a user input of selecting a portion to be activated among an entire display area on the display and, in response to the user input of selecting the portion among the entire display area, deactivating an unselected portion among the entire display area, and
- wherein an entire area of the activated portion of the display is rectangular and is smaller than a size of the display.

* * * * *